(12) United States Patent
Suzuki et al.

(10) Patent No.: US 10,599,739 B2
(45) Date of Patent: Mar. 24, 2020

(54) INFORMATION PROCESSING DEVICE AND INFORMATION PROCESSING METHOD

(71) Applicant: SONY CORPORATION, Tokyo (JP)

(72) Inventors: Shunsuke Suzuki, Tokyo (JP); Takanori Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 391 days.

(21) Appl. No.: 15/305,535

(22) PCT Filed: Apr. 14, 2015

(86) PCT No.: PCT/JP2015/061445
§ 371 (c)(1),
(2) Date: Oct. 20, 2016

(87) PCT Pub. No.: WO2015/182271
PCT Pub. Date: Dec. 3, 2015

(65) Prior Publication Data
US 2017/0046448 A1    Feb. 16, 2017

(30) Foreign Application Priority Data

May 27, 2014  (JP) .................................. 2014-109202

(51) Int. Cl.
G06F 17/30 (2006.01)
G06F 16/955 (2019.01)
G06F 16/904 (2019.01)
G06Q 50/00 (2012.01)

(52) U.S. Cl.
CPC .......... *G06F 16/955* (2019.01); *G06F 16/904* (2019.01); *G06Q 50/01* (2013.01)

(58) Field of Classification Search
CPC ....................................................... G06F 17/30

USPC .......................................................... 707/737
See application file for complete search history.

(56) References Cited

U.S. PATENT DOCUMENTS 8,909,641 B2 * 12/2014 Bullotta .................. H04L 43/08
707/736
8,943,071 B2 * 1/2015 Bishop ................ G06F 17/2705
707/748
8,949,237 B2 * 2/2015 Balcan ................... G06Q 10/10
707/737

(Continued)

FOREIGN PATENT DOCUMENTS

JP    2004-192355 A    7/2004
JP    2007-272390 A    10/2007
JP    2008-242639 A    10/2008

OTHER PUBLICATIONS

International Search Report dated May 26, 2015 in PCT/JP2015/061445 filed Apr. 14, 2015.

*Primary Examiner* — Kim T Nguyen
(74) *Attorney, Agent, or Firm* — Xsensus, LLP

(57) ABSTRACT

There is a demand for a technique capable of associating pieces of tag information with each other when the pieces of tag information are assigned to object information on a social network.

According to the present disclosure, there is provided an information processing device including a control unit configured to associate a plurality of pieces of tag information assigned to object information existing on a social network. Therefore, pieces of tag information can be associated with each other when the pieces of tag information are assigned to object information existing on a social network.

19 Claims, 53 Drawing Sheets

(56) References Cited

U.S. PATENT DOCUMENTS

| | | | |
|---|---|---|---|
| 9,858,298 B1 * | 1/2018 | Barak | G06F 16/5866 |
| 2011/0102458 A1 * | 5/2011 | Takiguchi | G06F 3/0483 |
| | | | 345/629 |
| 2011/0202531 A1 * | 8/2011 | Zuckerberg | G06Q 30/02 |
| | | | 707/737 |
| 2012/0191709 A1 * | 7/2012 | Morrison | G06F 16/58 |
| | | | 707/737 |
| 2013/0243342 A1 * | 9/2013 | Houjou | G06F 16/285 |
| | | | 382/224 |
| 2014/0081975 A1 * | 3/2014 | Wu | G11B 27/031 |
| | | | 707/737 |
| 2015/0052115 A1 * | 2/2015 | Sharifi | G06F 16/685 |
| | | | 707/722 |
| 2018/0095998 A1 * | 4/2018 | Barak | G06F 16/5866 |

* cited by examiner

FIG.10

| TAG ID | TAG CONTENT | CREATOR | USER | TAG RELEVANCE | COORDINATES(X,Y) | LAYER |
|---|---|---|---|---|---|---|
| 00001 | AAA | Suzuki | Suzuki, oba, ohtani | 00007, 00006, 00002(*), 00003 | (500, 700) | NONE |
| 00002 | BBB | Ohtani | Ohtani, suzuki | 00001(*), 00003, 00008 | (400, 800) | NONE |
| 00003 | CCC | Oba | oba, ohtani | 00001, 00002, 00004, 00005 | (700, 800) | NONE |
| 00004 | DDD | Suzuki | Suzuki, oba | 00003, 00005 | (600, 900) | NONE |
| 00005 | EEE | Oba | Oba | 00003 | (650, 900) | NONE |
| 00006 | FFF | Itou | Itou, oba, ohtani | 00007, 00001 | (250, 300) | NONE |
| 00007 | GGG | Ohtani | Ohtani | 00006, 00001 | (400, 300) | NONE |
| 00008 | HHH | Suzuki | Suzuki, oba, ohtani | 00002 | (200, 800) | NONE |

FIG. 11

| TAG ID | TAG CONTENT | CREATOR | USER | TAG RELEVANCE | COORDINATES(X,Y) | LAYER |
|---|---|---|---|---|---|---|
| 10001 | dog | Suzuki | Suzuki, oba, ohtani | 10004, 10005, 10006 | (500, 700) | NONE |
| 10002 | DOG | Ohtani | Ohtani, suzuki | 10005, 10004, 10006 | (400, 800) | NONE |
| 10003 | Dog | Oba | oba, ohtani | 10006, 10004, 10005 | (700, 800) | NONE |
| 10004 | KKK | Suzuki | Suzuki, ohtani, oba | 10001, 10002, 10003 | (600, 400) | NONE |
| 10005 | MMM | Ohtani | ohtani, oba | 10002, 10001, 10003 | (300, 400) | NONE |
| 10006 | NNN | Ohtani | Ohtani, suzuki | 10003, 10001, 10002 | (200, 500) | NONE |

FIG. 12

| TAG ID | TAG CONTENT | CREATOR | USER | TAG RELEVANCE | COORDINATES(X,Y) | LAYER |
|---|---|---|---|---|---|---|
| 10001 | dog | Suzuki | Suzuki, oba, ohtani | 10004/—, 10005/—, 10006/— | (500, 700) | 10007 |
| 10002 | DOG | Ohtani | Ohtani, suzuki | 10005/—, 10004/—, 10006/— | (400, 800) | 10007 |
| 10003 | Dog | Oba | oba, ohtani | 10006/—, 10004/—, 10005/— | (700, 800) | 10007 |
| 10004 | KKK | Suzuki | Suzuki, ohtani, oba | 10001, 10002, 10003, 10007 | (600, 400) | NONE |
| 10005 | MMM | Ohtani | ohtani, oba | 10002, 10001, 10003, 10007 | (300, 400) | NONE |
| 10006 | NNN | Ohtani | Ohtani, suzuki | 10003, 10001, 10002, 10007 | (200, 500) | NONE |
| 10007 | DOG(*) | Yano | Yano, Suzuki, oba, ohtani | 10004, 10005, 10006 | (150, 400) | NONE |

FIG. 13

| TAG ID | TAG CONTENT | CREATOR | USER | TAG RELEVANCE | COORDINATES(X,Y) | LAYER |
|---|---|---|---|---|---|---|
| 10001 | dog | Suzuki | Suzuki, oba, ohtani | 10004(N), 10005(N), 10006(N) | (500, 700) | 10007 |
| 10002 | DOG | Ohtani | Ohtani, suzuki | 10004(N), 10005(N), 10006(N) | (400, 800) | 10007 |
| 10003 | Dog | Oba | oba, ohtani | 10004(N), 10005(N), 10006(N) | (700, 800) | 10007 |
| 10004 | KKK | Suzuki | Suzuki, ohtani, oba | 10007, 10001(N), 10002(N), 10003(N) | (600, 400) | NONE |
| 10005 | MMM | Ohtani | ohtani, oba | 10007, 10001(N), 10002(N), 10003(N) | (300, 400) | NONE |
| 10006 | NNN | Ohtani | Ohtani, suzuki | 10007, 10001(N), 10002(N), 10003(N) | (200, 500) | NONE |
| 10007 | DOG(*)(N) | Yano | Yano, Suzuki, oba, ohtani | 10004, 10005, 10006 | (150, 400) | NONE |

FIG. 41

| TAG ID | TAG CONTENT | CREATOR ID | TAG RELEVANCE | LAYER |
|---|---|---|---|---|
| 00001 | CCC | 0022001376 | 00002 | 00003 |
| 00002 | BBB | 0022001376 | 00001 | 00003 |
| 00003 | GGG(*) | 0022001376 | | |
| 00004 | DDD | 0022001376 | | |
| 00005 | EEE | 0022001376 | | |
| 00006 | FFF | 0022001376 | | |
| 00007 | AAA | 0022001376 | | 00003 |
| 00008 | ... | 0022001376 | | |

FIG. 42

| TAG ID | TAG CONTENT | CREATOR ID | TAG RELEVANCE | LAYER |
|---|---|---|---|---|
| 00001 | CCC | 0022001376 | – | 00003 |
| 00002 | HHH | 0022001376 | – | 00003 |
| 00003 | GGG(*) | 0022001376 | – | – |

FIG. 43

| TAG ID | TAG CONTENT | CREATOR ID | TAG RELEVANCE | LAYER |
|---|---|---|---|---|
| 10001 | CCC | 0022001377 | – | 10003 |
| 10002 | HHH | 0022001377 | – | 10003 |
| 10003 | JJJ(*) | 0022001377 | – | – |

FIG. 44

| TAG ID | TAG CONTENT | CREATOR ID | TAG RELEVANCE | LAYER |
|---|---|---|---|---|
| 20001 | ... | 0022001378 | – | 20003 |
| 20002 | ... | 0022001378 | – | – |
| 20003 | GGG(*) | 0022001378 | – | – |

FIG. 45

| TAG ID | TAG CONTENT/ NUMBER OF CASES | TAG RELEVANCE/ NUMBER OF CASES | LAYER/ NUMBER OF CASES |
|---|---|---|---|
| G0001 | CCC/100 | – | G0002/20<br>G0003/3 |
| G0002 | HHH(*)/40 | – | G0003/12<br>G0006/40 |
| G0003 | JJJ(*)/5 | – | |
| G0004 | AAA/20 | – | G0006/40 |
| G0005 | I I I/30 | – | G0002/30 |
| G0006 | GGG(*)/30 | – | – |

FIG. 46

| TAG ID | TAG CONTENT | TAG RELEVANCE | LAYER |
|---|---|---|---|
| G0001 | CCC | – | G0002 |
| G0002 | HHH(*) | – | G0006 |
| G0004 | AAA | – | G0006 |
| G0005 | III | – | G0002 |
| G0006 | GGG(*) | – | – |

INFORMATION PROCESSING DEVICE AND INFORMATION PROCESSING METHOD

TECHNICAL FIELD

The present disclosure relates to an information processing device and an information processing method.

BACKGROUND ART

Patent Literature 1 discloses a technique of assigning tag information to resource information.

CITATION LIST

Patent Literature

Patent Literature 1: JP 2007-272390A

SUMMARY OF INVENTION

Technical Problem

However, in the technique disclosed in Patent Literature 1, when tag information is assigned to object information on a social network, it is difficult to associate pieces of the tag information with each other. Therefore, the tag information is not sufficiently used.

For this reason, when tag information is assigned to object information on a social network, there is a demand for a technique capable of associating pieces of tag information with each other.

Solution to Problem

According to the present disclosure, there is provided an information processing device including a control unit configured to associate a plurality of pieces of tag information assigned to object information existing on a social network.

According to the present disclosure, there is provided an information processing method including associating a plurality of pieces of tag information assigned to object information existing on a social network.

According to the present disclosure, pieces of tag information may be able to associated with each other when the pieces of tag information are assigned to object information existing on a social network.

Advantageous Effects of Invention

As described above, according to the present disclosure, it is possible to associate the pieces of tag information with each other when the tag information is assigned to the object information on the social network. A technology according to the present disclosure may have an effect described in this specification or any other effect.

BRIEF DESCRIPTION OF DRAWINGS

FIG. 10 is an explanatory diagram illustrating an example of tag relevance information.

FIG. 11 is an explanatory diagram illustrating an example of tag relevance information before a tag folder is created.

FIG. 12 is an explanatory diagram illustrating an example of tag relevance information after a tag folder is created.

FIG. 13 is an explanatory diagram illustrating an example of tag relevance information in which a browsing restriction is set.

FIG. 41 is an explanatory diagram illustrating an example of personal tag relevance information.

FIG. 42 is an explanatory diagram illustrating an example of personal tag relevance information.

FIG. 43 is an explanatory diagram illustrating an example of personal tag relevance information.

FIG. 44 is an explanatory diagram illustrating an example of personal tag relevance information.

FIG. 45 is an explanatory diagram illustrating an example of the tag aggregation information.

FIG. 46 is an explanatory diagram illustrating an example of global tag relevance information.

DESCRIPTION OF EMBODIMENT(S)

Figure 1:
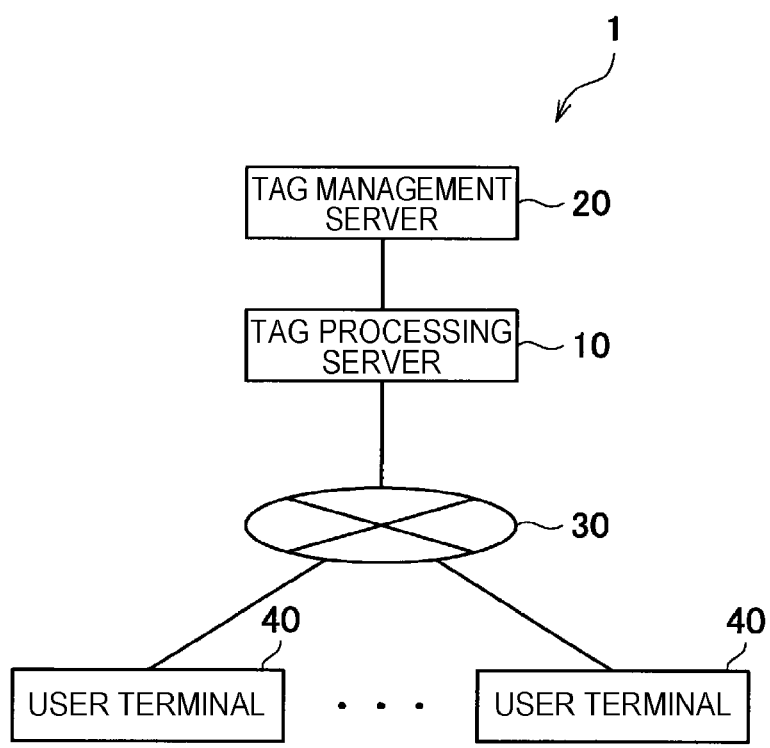
FIG. 1 is a block diagram illustrating an overall configuration of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.

1. First embodiment (tag relevance information is shared by a plurality of users)
  1-1. Overall configuration
  1-2. Configuration of tag processing server
  1-3. Configuration of tag management server
  1-4. Configuration of user terminal
  1-5. Tag relevance information creation process
  1-6. Maintenance process
  1-6-1. Overview of process
  1-6-2. Tag association process
  1-6-3. Folder management process
  1-6-4. Browsing restriction setting process
  1-6-5. Recommendation process
  1-7. Search process
  1-8. Other processes
  1-8-1. Tag creation using maintenance icon
  1-8-2. Maintenance-specialized user 2. Second embodiment (setting of personal tag information and global tag information)
  2-1. Overall configuration
  2-2. Configuration of SNS processing server
  2-3. Configuration of SNS management server
  2-4. Configuration of tag processing server
  2-5. Configuration of tag management server
  2-6. Configuration of user terminal
  2-7. Tag relevance information creation process
  2-8. Maintenance process
  2-9. Other processes
  2-10. Modified examples

1. First Embodiment

1-1. Overall Configuration

First, an overall configuration of an information processing system 1 according to the first embodiment will be described with reference to FIG. 1. The information processing system 1 includes a tag processing server (an information processing device) 10, an SNS management server 51, a network 30, and a plurality of user terminals 40. The tag processing server 10 and the user terminals 40 are connected via the network 30. The tag processing server 10 is a server that provides a social network service (SNS) to the user terminals 40 and associates pieces of tag information with each other. In the first embodiment, an SNS used in an organization such as an in-house SNS or an SNS for a specific purpose (a reading group) is assumed. Of course, the first embodiment may be applied to other forms of SNSs.

1-2. Configuration of the Tag Processing Server

Figure 2:
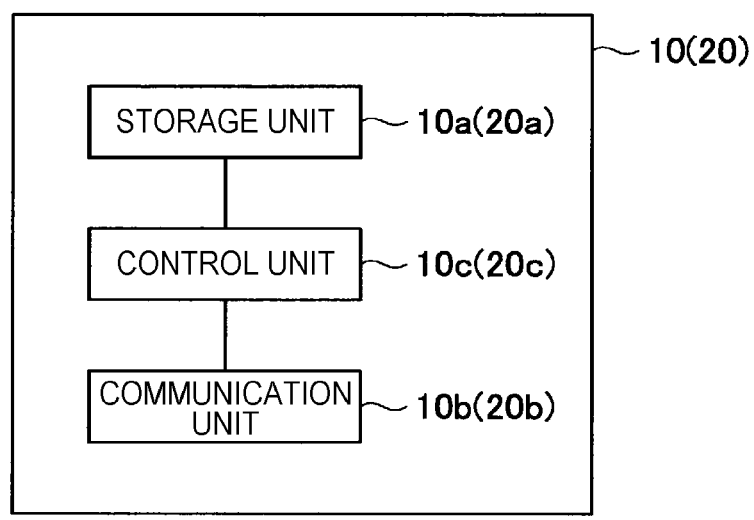
FIG. 2 is a block diagram illustrating an example of a tag processing server and a tag management server.
Figure 3:
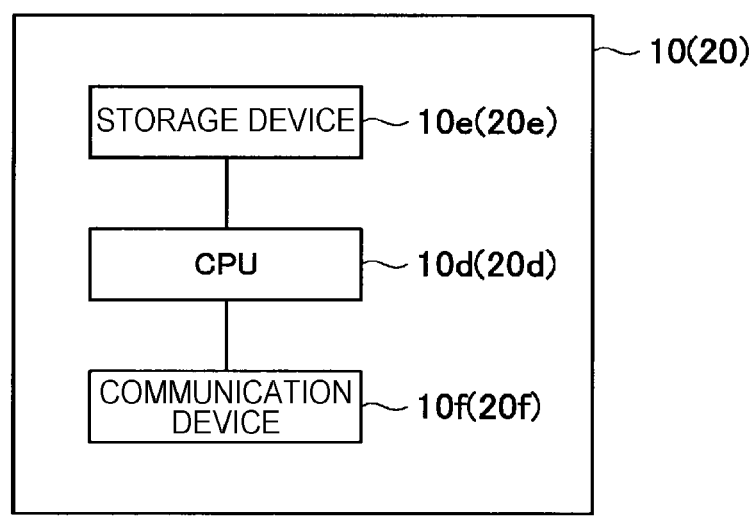
FIG. 3 is a hardware configuration diagram illustrating an example of a tag processing server and a tag management server.

Next, a configuration of the tag processing server 10 will be described with reference to FIGS. 2 and 3. The tag processing server 10 performs a process of providing an SNS to the user terminals 40 and a process of performing the maintenance of the tag information.

Figure 6:
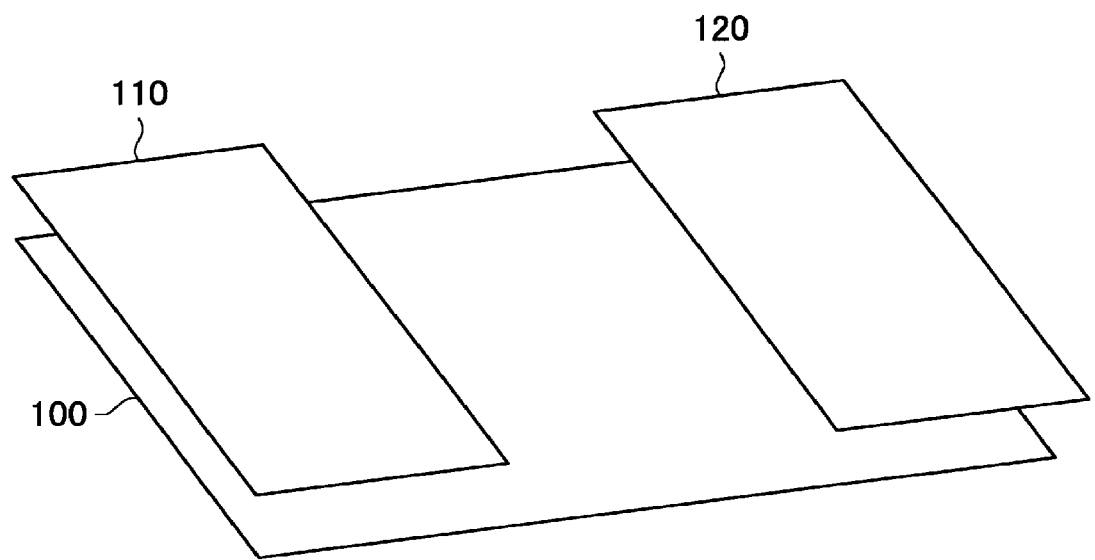
FIG. 6 is an explanatory diagram illustrating an example of a hierarchical structure of a program (software) according to the first embodiment.

The tag processing server 10 includes a storage unit 10a, a communication unit 10b, and a control unit 10c. The storage unit 10a stores a program necessary for a process performed by the tag processing server 10. For example, as such a program, there is a program causing the tag processing server 10 to implement the storage unit 10a, the communication unit 10b, and the control unit 10c. Examples of such a program include an SNS execution program for executing the SNS, a maintenance execution program for executing the maintenance of the tag information, and a tag management execution program for managing the tag information. FIG. 6 illustrates an example of a hierarchical structure of the programs. As illustrated in FIG. 6, there is a tag management execution program layer 100 on the bottom layer, and an SNS execution program layer 110 and a maintenance execution program layer 120 are above the tag management execution program layer 100. The hierarchical structure of the first embodiment is not limited to this example, and, for example, the maintenance execution program layer 120 may be included in the tag management execution program layer 100. Here, the tag management execution program creates a tag cloud by associating the pieces of tag information with each other. In other words, in the first embodiment, the SNS is on the tag cloud. The tag information input through the SNS is reflected in the tag cloud.

The communication unit 10b performs communication with the user terminal 40 and a tag management server 20.

The control unit 10c controls the respective units of the tag processing server 10, and performs, for example, the following process. In other words, the control unit 10c transmits SNS information to the user terminals 40. Here, examples of the SNS information include object information input by the user and face image information for identifying the user. Here, the object information may be any information as long as the information is input by the user. Examples of the object information include a comment, an image, a link, and the like. Information for identifying the user may be information other than the face image information. The user terminal 40 displays the SNS information. Thus, the object information posted by the user is shared with other users. In other words, the SNS is provided.

When the tag information is included in the object information, the control unit 10c performs a process of registering the tag information as tag relevance information. Here, the tag information is information that is assigned to the object information. For example, the tag information is used as a search word when the object information is searched for. The tag relevance information is information indicating relevance between the pieces of tag information or the like. The control unit 10c performs various kinds of maintenance processes related to the tag information. Examples of the maintenance process include a process of registering the tag information as the tag relevance information, a process of associating a plurality of pieces of tag information, and a process of hierarchizing the tag information (arranging the tag information in a folder). As another maintenance process, there are a process of displaying a candidate of hierarchization of the tag information and a process of setting a browsing restriction on the hierarchized tag information. The control unit 10c performs a search process of searching for the object information including a search word designated by the user. The control unit 10c causes the SNS information and the tag relevance information to be stored in the tag management server 20.

The tag processing server 10 includes a CPU 10d, a storage device 10e, and a communication device 10f as a hardware configuration. The tag processing server 10 implements the storage unit 10a, the communication unit 10b, and the control unit 10c through the hardware configuration. The hardware configuration is implemented through an electronic circuit or the like.

The CPU 10d reads and executes a program stored in the storage device 10e. Therefore, the CPU 10d is substantially the main operation entity of the tag processing server 10. The storage device 10e is configured with a ROM, a RAM, a hard disk, a non-volatile memory, or the like. The storage device 10e stores a program causing the tag processing server 10 to implement the storage unit 10a, the communication unit 10b, and the control unit 10c. The communication device 10f performs communication with the user terminal 40 and the tag management server 20.

1-3. Configuration of Tag Management Server

Next, a configuration of the tag management server 20 will be described with reference to FIGS. 2 and 3. The tag management server 20 performs a process of managing (storing) the SNS information and the tag relevance information.

The tag management server 20 includes a storage unit 20a, a communication unit 20b, and a control unit 20c. The storage unit 20a stores a program necessary for a process performed by the tag management server 20. As such a program, for example, there is a program causing the tag management server 20 to implement the storage unit 20a, the communication unit 20b, and the control unit 20c. The storage unit 20a stores the SNS information and the tag relevance information. The storage unit 20a associates face image information and name information of the user with a user ID to be stored. The communication unit 20b performs communication with the tag management server 20. The control unit 20c controls the respective units of the tag management server 20, and performs, for example, the following process. In other words, the control unit 20c causes the SNS information and the tag relevance information transmitted from the tag processing server 10 to be stored in the storage device 20e. The control unit 20c acquires the SNS information and the tag relevance information from the storage device 20e, and transmits the SNS information and the tag relevance information to the tag processing server 10.

The tag management server 20 includes a CPU 20d, the storage device 20e, and the communication device 20f as a hardware configuration. The tag management server 20 implements the storage unit 20a, the communication unit 20b, and the control unit 20c through the hardware configuration. The hardware configuration is implemented through an electronic circuit or the like.

The CPU 20d reads and executes a program stored in the storage device 20e. Therefore, the CPU 20d is a substantial main operation entity of the tag management server 20. The storage device 20e is configured with a ROM, a RAM, a hard disk, a non-volatile memory, or the like. The storage device 20e stores a program causing the tag management server 20 to implement the storage unit 20a, the communication unit 20b, and the control unit 20c. The communication device 20f performs communication with the tag processing server 10.

1-4. Configuration of User Terminal

Figure 4:
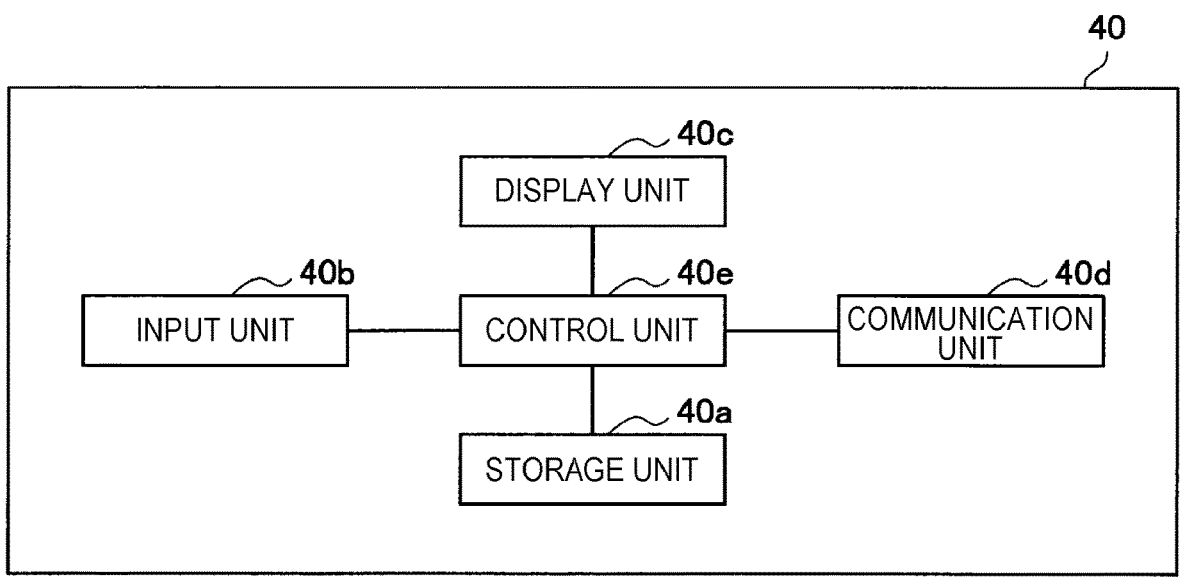
FIG. 4 is a block diagram illustrating an example of a user terminal.

Next, a configuration of the user terminal 40 will be described with reference to FIGS. 4 and 5. The user terminal 40 is a terminal on which an input operation is performed by the user of the SNS. In the first embodiment, the user terminal 40 is assumed to be a so-called tablet type terminal (a smart phone, a smart tablet, or the like). Of course, the user terminal 40 is not limited to a tablet type terminal. In other words, the user terminal 40 may be a tablet type personal computer (PC), a laptop PC, a mobile phone, or the like. In other words, the user terminal 40 may be any terminal as long as various functions which will be described later can be implemented.

The user terminal 40 includes a storage unit 40a, an input unit 40b, a display unit 40c, a communication unit 40d, and a control unit 40e. The storage unit 40a stores a program necessary for a process performed by the user terminal 40 and various kinds of information. For example, the storage unit 40a stores a program causing the user terminal 40 to implement the storage unit 40a, the input unit 40b, the display unit 40c, the communication unit 40d, and the control unit 40e as the program. The storage unit 40a stores the user ID for identifying the user who uses the user terminal.

The input unit 40b receives various kinds of input operations performed by the user and is, for example, a touch panel. The display unit 40c displays various kinds of images. A display area of the display unit 40c is divided into, for example, an SNS display area 200 and a tag relevance information display area 300 as illustrated in FIG. 10.

The SNS information assigned by the tag processing server 10 is displayed in the SNS display area 200. Here, the SNS information is transmitted from the tag processing server 10 to the user terminals 40. Therefore, content common to the user terminals 40 is basically displayed in the SNS display area 200. However, when the search process is performed according to a request transmitted from any one of the user terminals 40, the tag processing server 10 transmits the SNS information including the search word to the user terminal 40. Therefore, the SNS information including the search word is displayed in the SNS display area 200 of the user terminal 40 that has requested the search process. Only the object information designated by the user (for example, the object information of a specific user) may be displayed in the SNS display area 200. The SNS display area 200 will be described later in detail.

Figure 15:
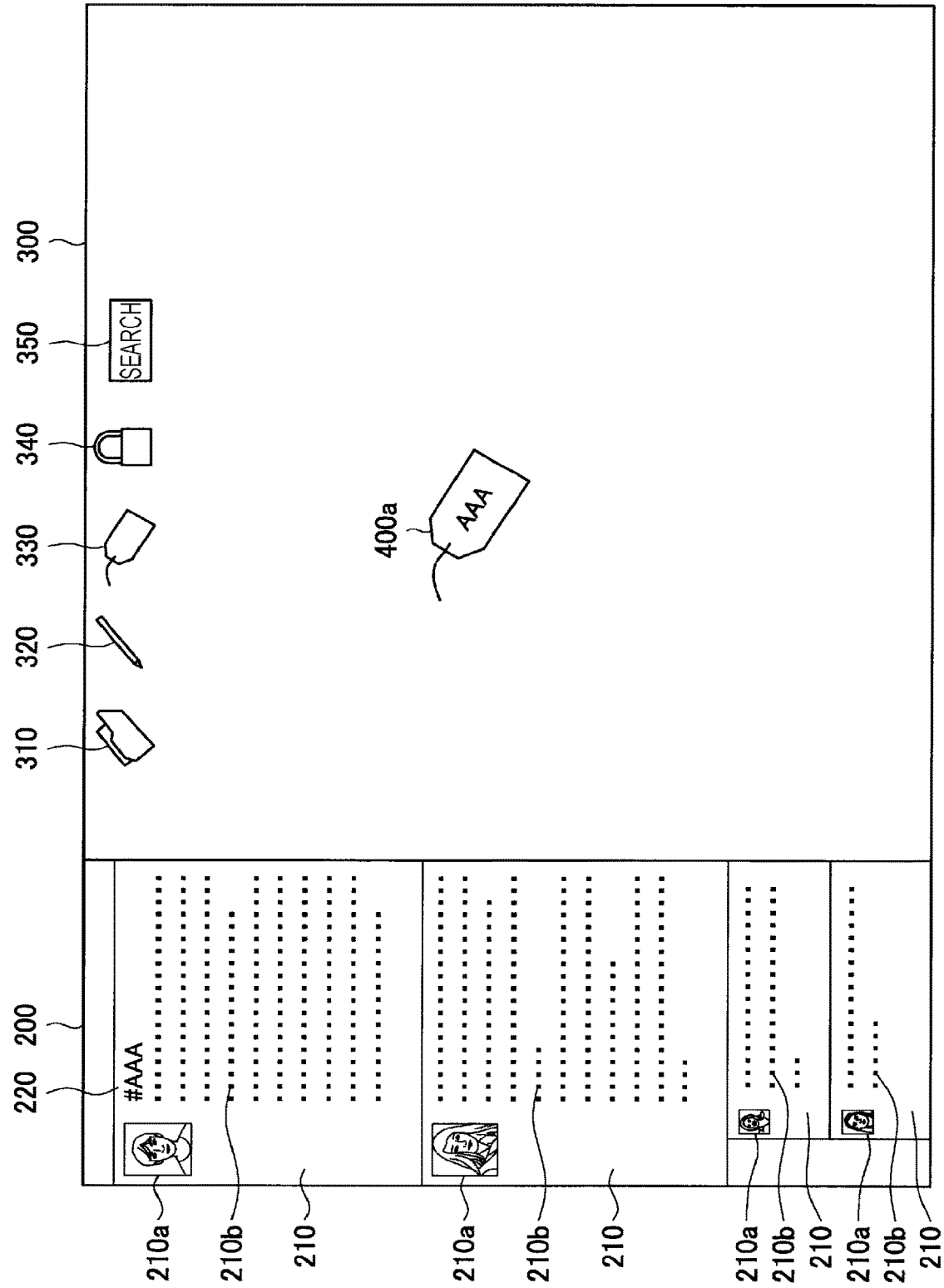
FIG. 15 is an explanatory diagram illustrating an example of a screen displayed on a user terminal.
Figure 17:
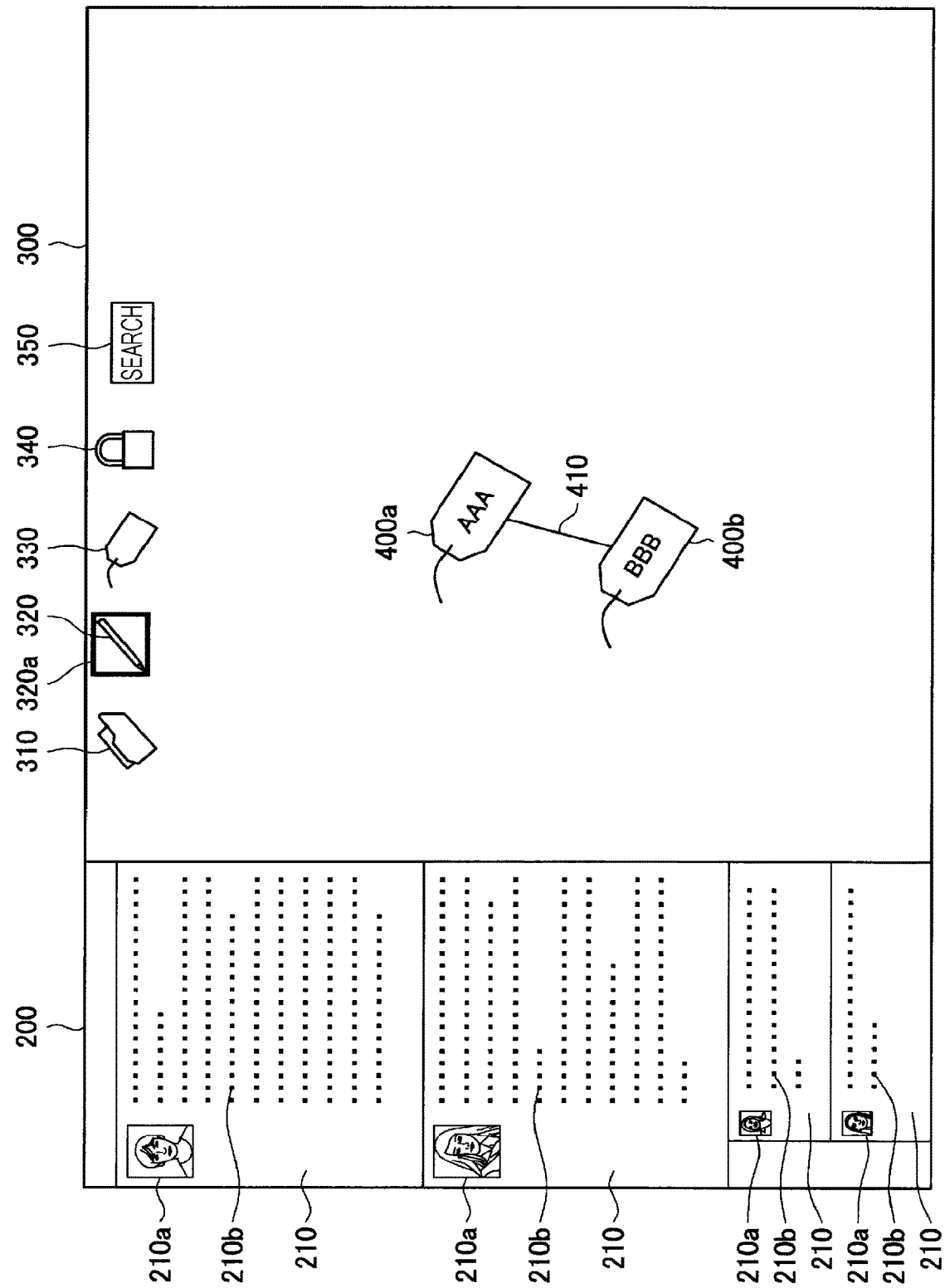
FIG. 17 is an explanatory diagram illustrating an example of a screen displayed on a user terminal.
Figure 24:
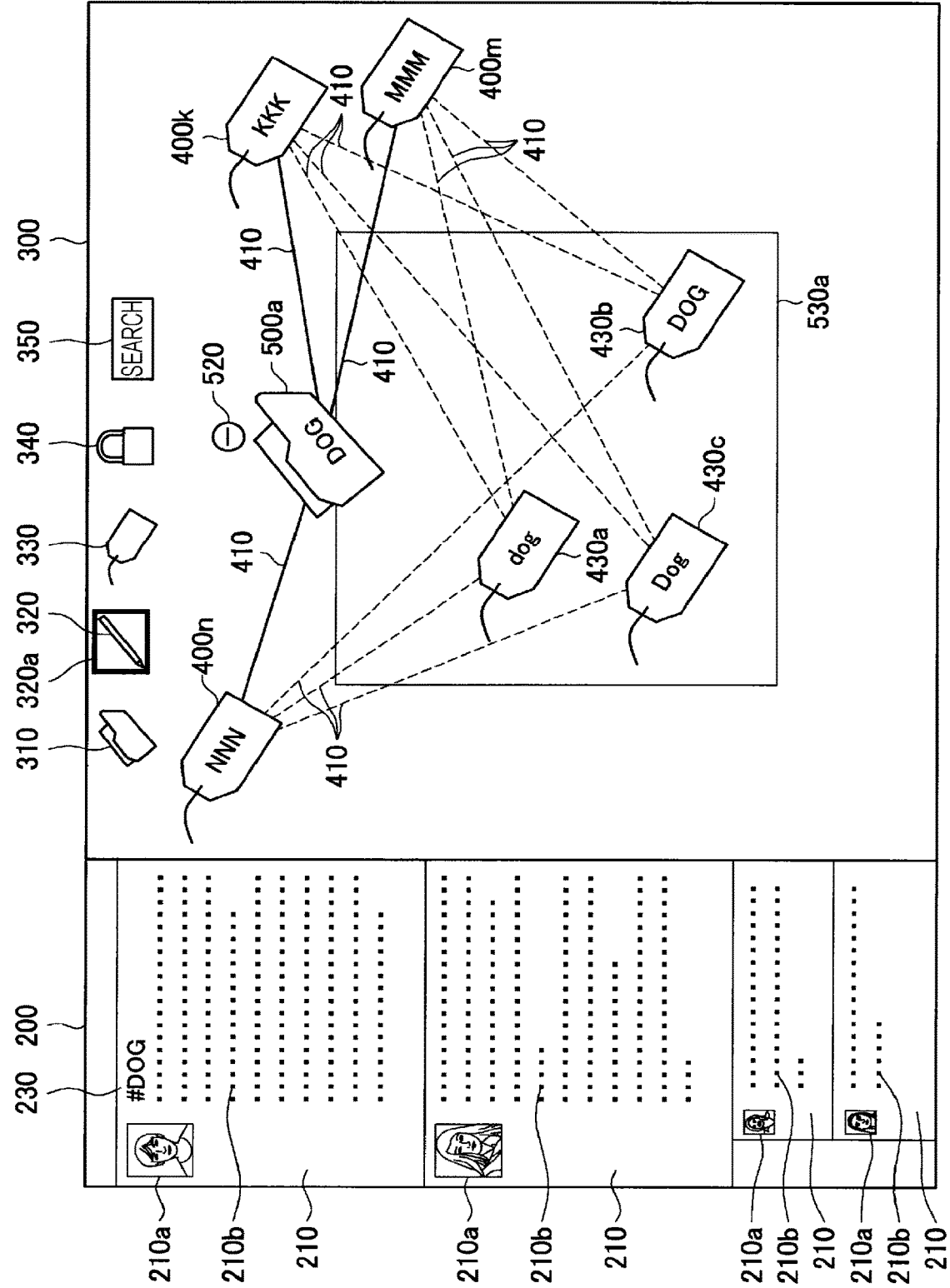
FIG. 24 is an explanatory diagram illustrating an example of a screen displayed on a user terminal.
Figure 25:
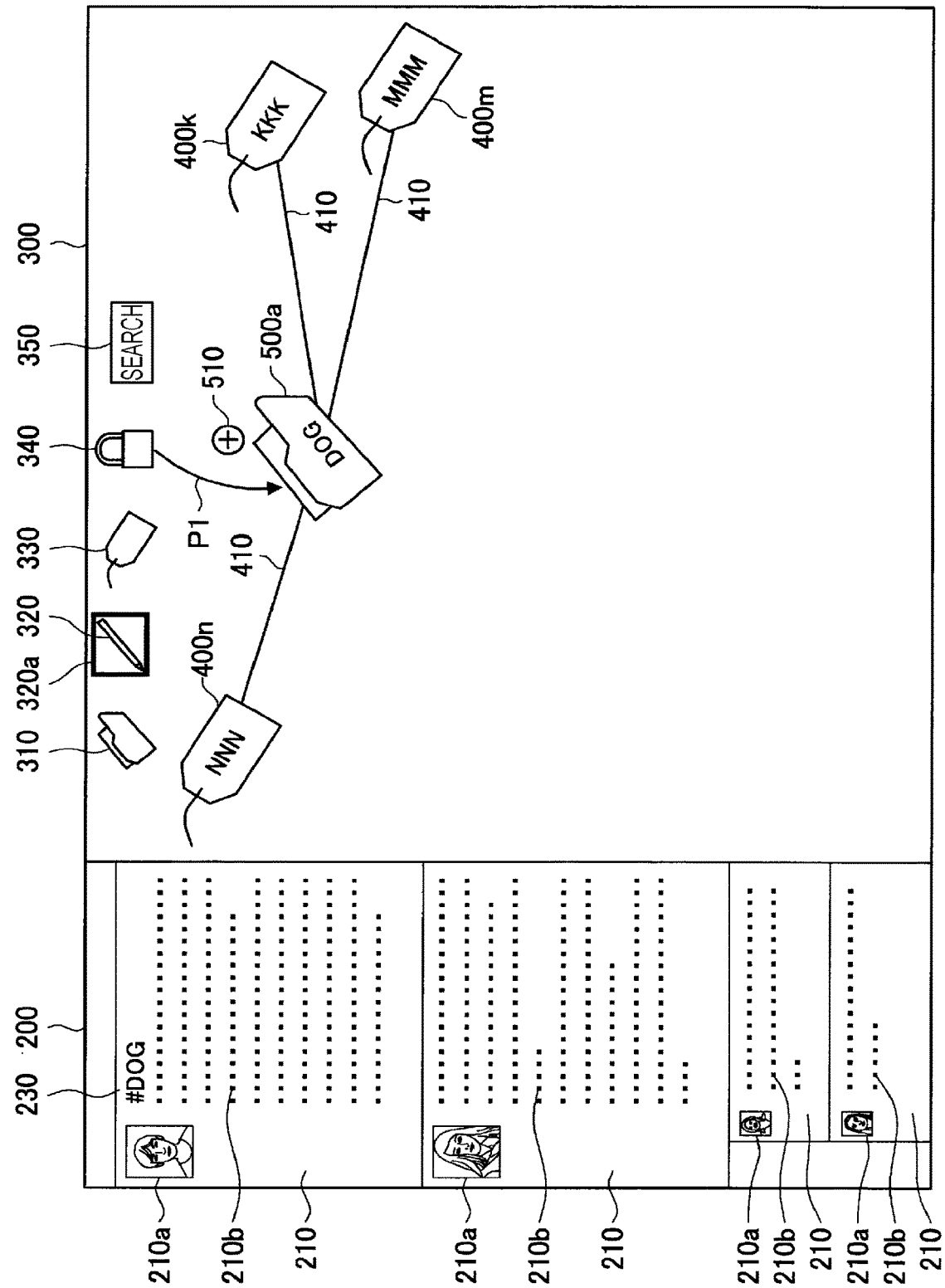
FIG. 25 is an explanatory diagram illustrating an example of a screen displayed on a user terminal.
Figure 26:
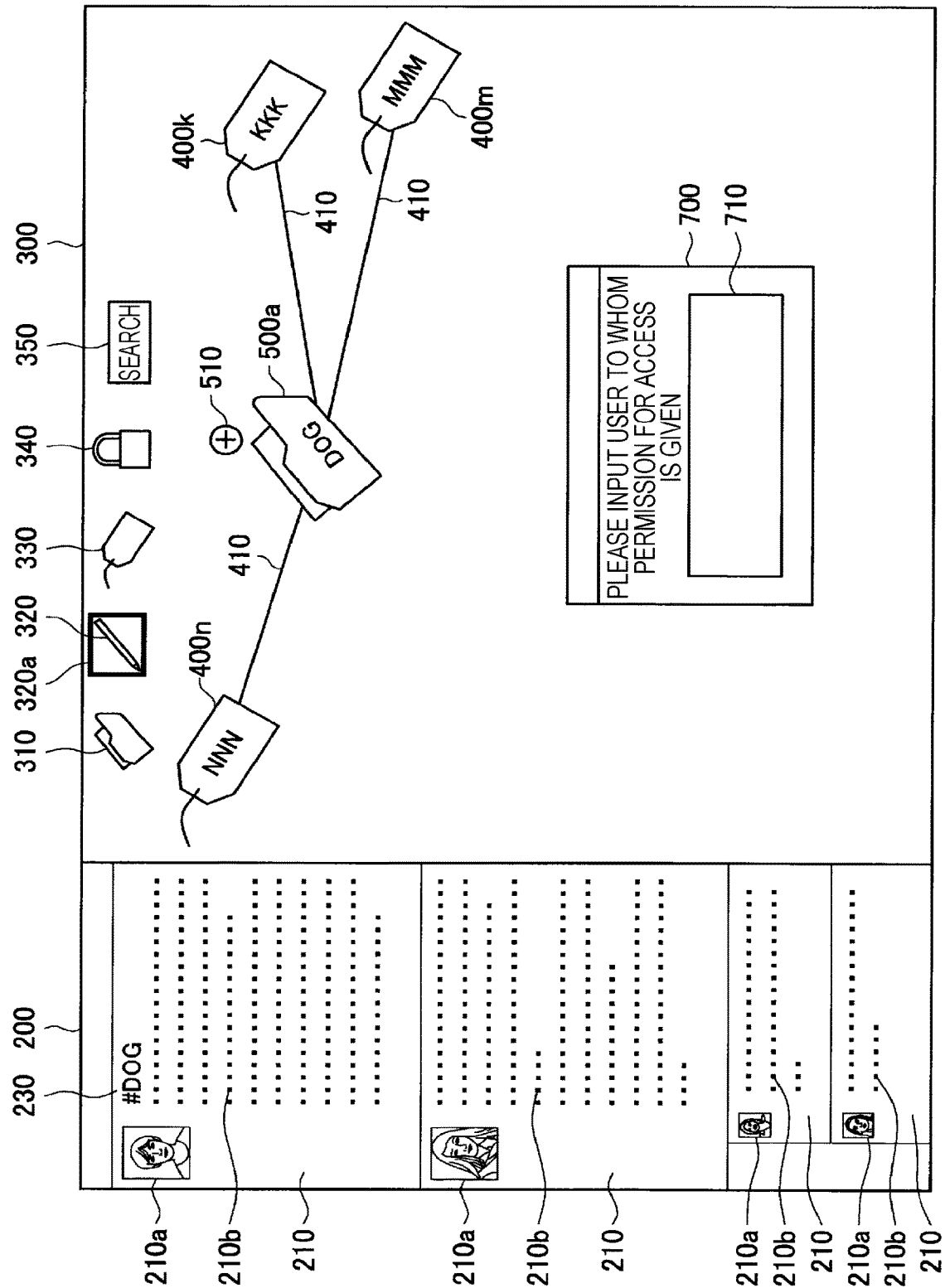
FIG. 26 is an explanatory diagram illustrating an example of a screen displayed on a user terminal.
Figure 27:
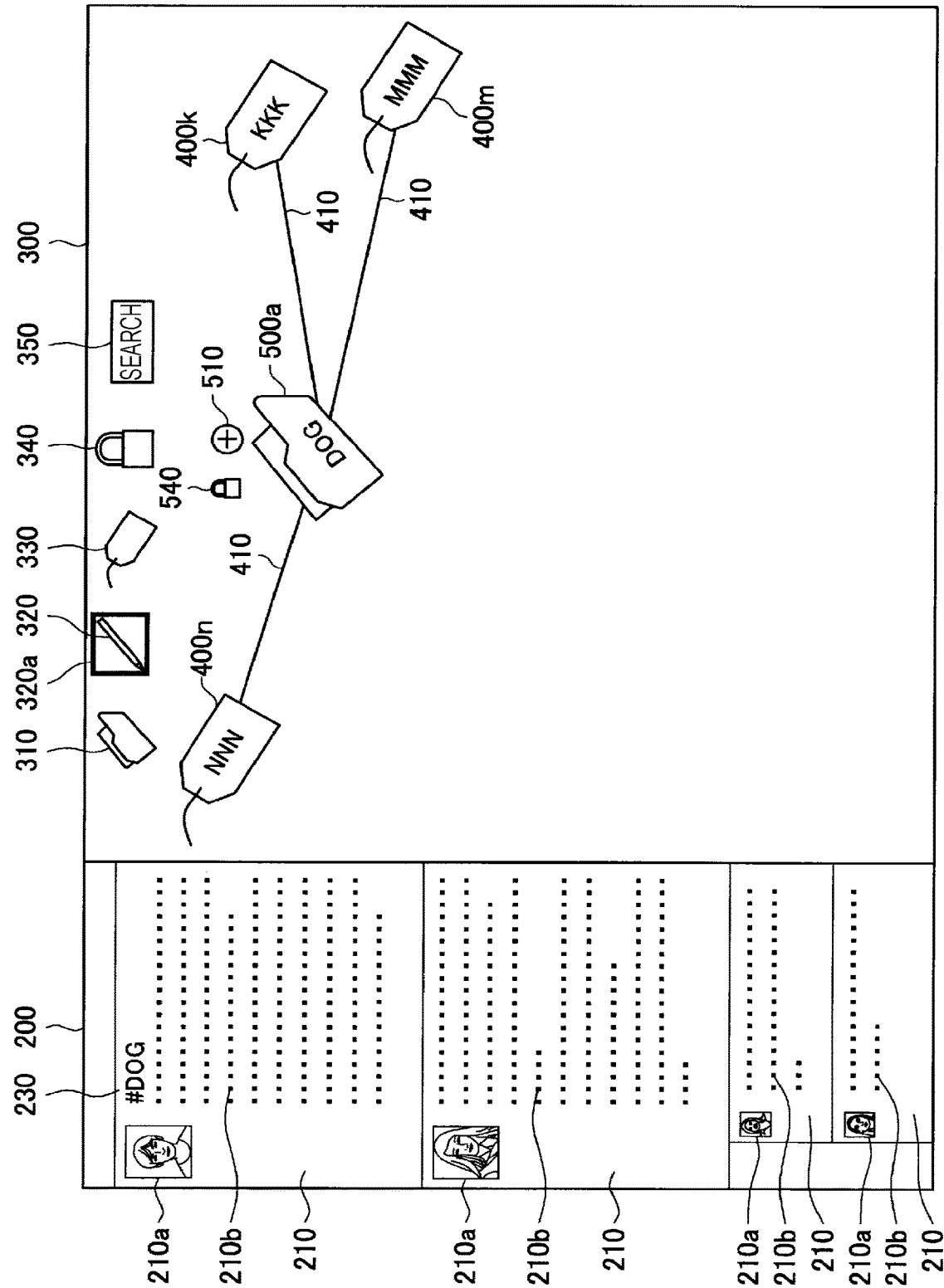
FIG. 27 is an explanatory diagram illustrating an example of a screen displayed on a user terminal.
Figure 28:
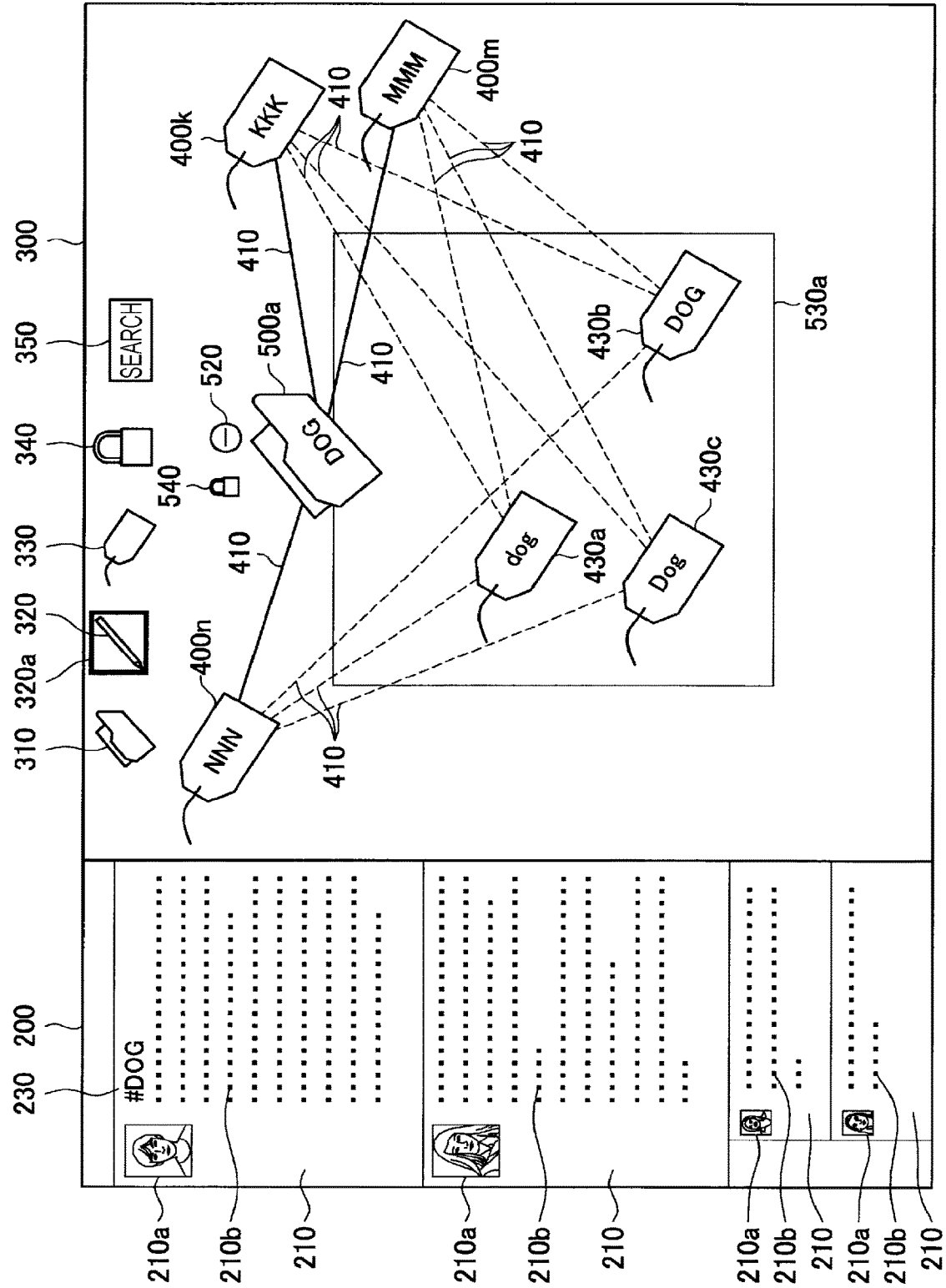
FIG. 28 is an explanatory diagram illustrating an example of a screen displayed on a user terminal.
Figure 30:
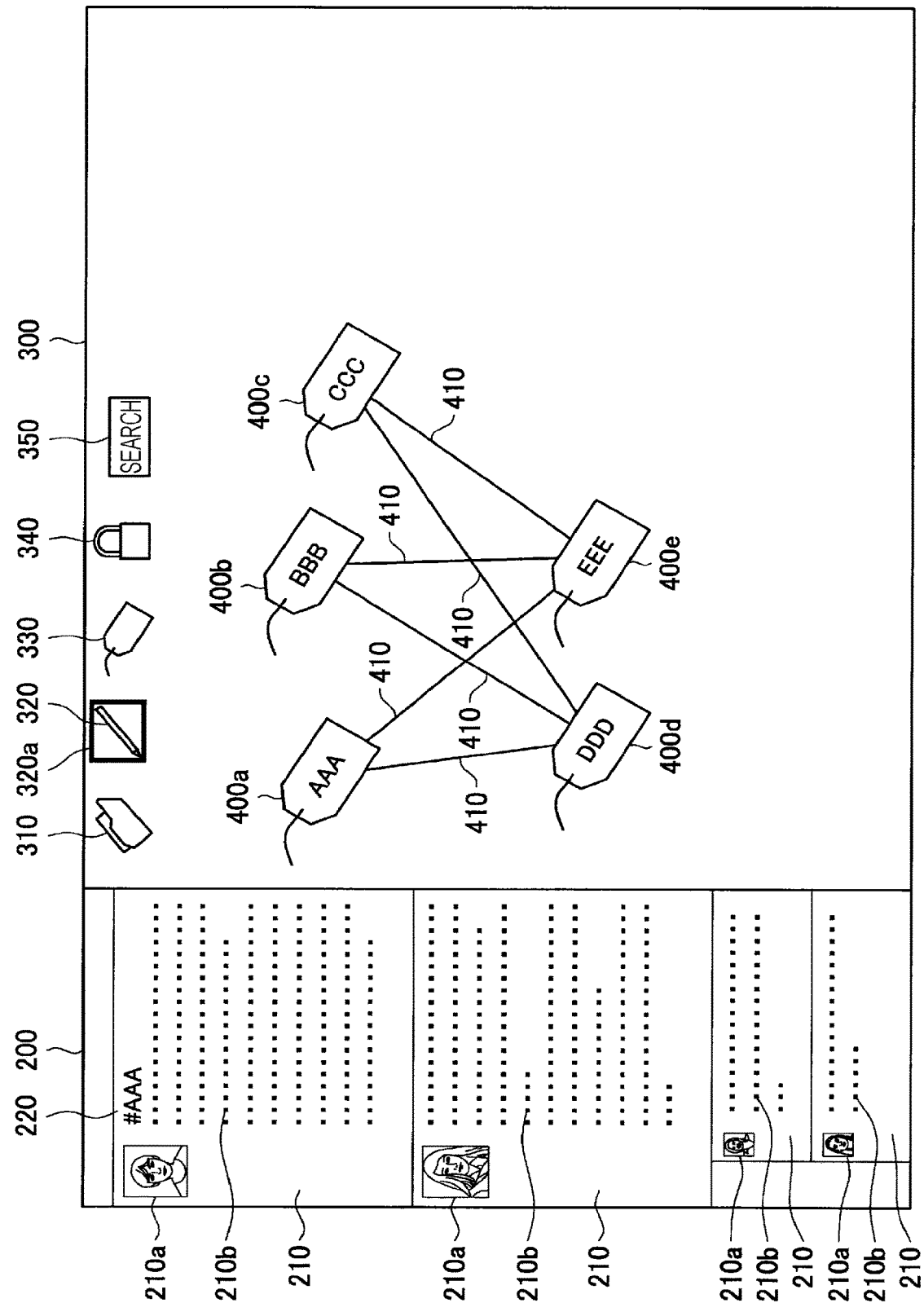
FIG. 30 is an explanatory diagram illustrating an example of a screen displayed on a user terminal.

The relevance between the tag information is displayed in the tag relevance information display area 300. For example, as illustrated in FIG. 15, tag information 400a is displayed in the tag relevance information display area 300. For example, as illustrated in FIG. 17, when the pieces of tag information 400a and 400b are associated, connection information 410 connecting the tag information 400a and 400b is displayed. The tag information may be hierarchized. In this case, for example, as illustrated in FIG. 24, a tag folder 500a is displayed. The tag folder is a sort of tag information. One or more pieces of tag information are stored in the tag folder. For example, tag information 430a to 430c is stored in the tag folder 500a. The tag information stored in the tag folder belongs to a layer just below the tag folder. The tag folder is associated with the tag information in the tag folder. In other words, in the first embodiment, the pieces of tag information can be associated with each other by connecting the pieces of tag information to each other, or the pieces of tag information (here, the tag folder and the tag information) can be associated with each other by storing the tag information in the tag folder. For example, as illustrated in FIGS. 25 to 27, the hierarchized tag information may be subject to a browsing restriction. For example, as illustrated in FIG. 28, a recommendation area 600 may be set in the tag relevance information display area 300. The tag folder serving as a hierarchization candidate is displayed in the recommendation area 600. In an example illustrated in FIG. 28, tag folders 610a and 610b are displayed. For example, as illustrated in FIG. 30, at the time of the search process, the tag information (including the tag folder) serving as the search word is highlighted. In an example illustrated in FIG. 30, the tag folder 500a and the tag information 430a to 430c are highlighted. Further, maintenance icons 310 to 340 and a search button 350 are also displayed in the tag relevance information display area 300. The maintenance icon 310 has a folder form, and the maintenance icon 320 has a pen form. The maintenance icon 330 has a tag shape, and the maintenance icon 340 is a key shape. The tag relevance information display area 300 will be described later in detail.

The communication unit 40d performs communication with the tag processing server 10. The control unit 40e controls the respective units of the user terminal 40, and performs a process of transmitting various kinds of information to the tag processing server 10 and a process of causing information assigned by the tag processing server 10 to be displayed on the display unit 40c.

Figure 5:
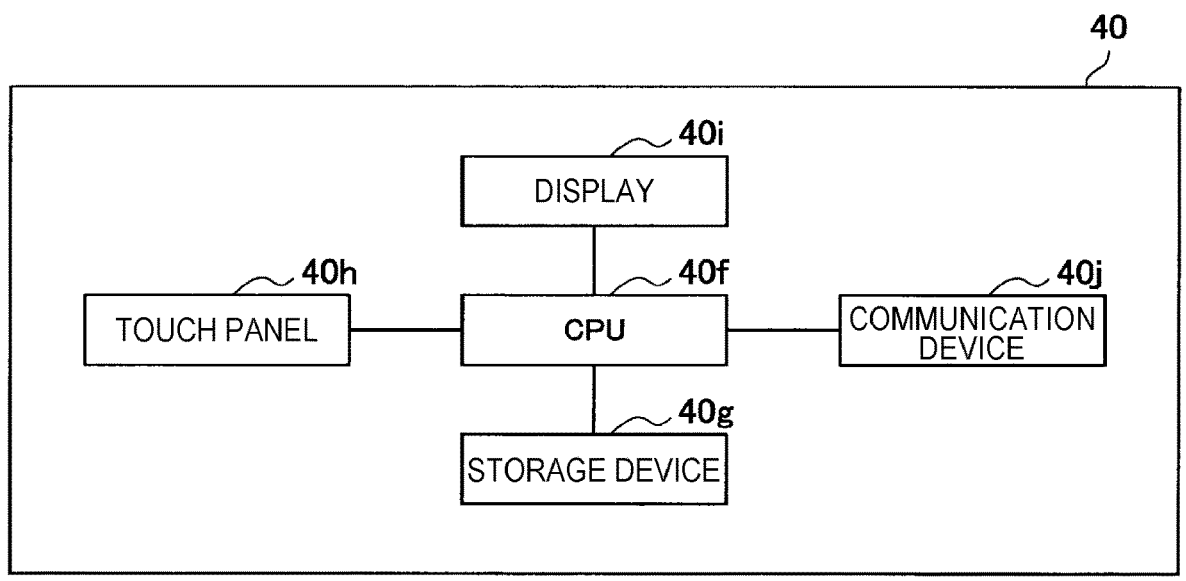
FIG. 5 is a hardware configuration diagram illustrating an example of a user terminal.

As illustrated in FIG. 5, the user terminal 40 includes a CPU 40f, a storage device 40g, a touch panel 40h, a display 40i, and a communication device 40j as a hardware configuration. The user terminal 40 implements the storage unit 40a, the input unit 40b, the display unit 40c, the communication unit 40d, and the control unit 40e through the hardware configuration. The hardware configuration is implemented through an electronic circuit or the like.

The CPU 40f reads and executes a program stored in the storage device 40g. Therefore, the CPU 40f is substantially the main operation entity of the user terminal 40. The storage device 40g is configured with a ROM, a RAM, a non-volatile memory, or the like. The storage device 40g stores a program causing the user terminal 40 to implement the storage unit 40a, the input unit 40b, the display unit 40c, the communication unit 40d, and the control unit 40e and various kinds of information. The storage device 40g is also used as a work area by the CPU 40f. The touch panel 40h is installed on the surface of the display 40i and receives an input operation performed by the user. The display 40i displays various kinds of information such as the SNS information and the tag information. In other words, the display area of the display 40i is divided into at least the SNS display area 200 and the tag relevance information display area 300, and the above-described information is displayed in each area. The communication device 40j performs communication with the tag processing server 10.

1-5. Tag Relevance Information Creation Process

Figure 7:
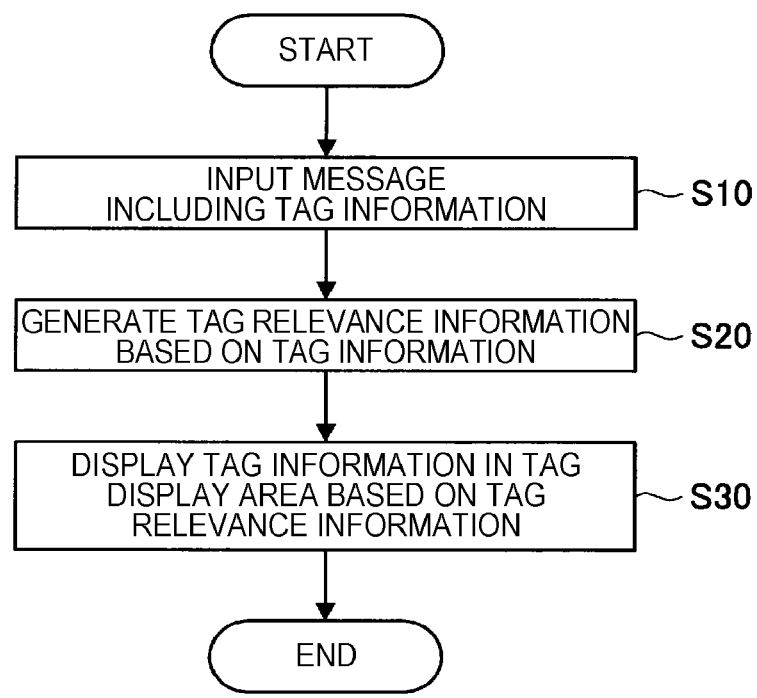
FIG. 7 is a flowchart illustrating a procedure of a process performed in an information processing system.

Next, a process performed by the information processing system 1 will be described. First, the tag relevance information generation process will be described with reference to a flowchart illustrated in FIG. 7. The tag relevance information generation process is a process of generating the tag relevance information.

In step S10, the user of any one of the user terminals 40 inputs the object information including the tag information to the user terminal 40. For example, the user inputs the object information including the tag information such as "# AAA." Further, when the tag information is an abbreviation, there are cases in which there are a plurality of formal names for the tag information. For example, there are cases in which the tag information is an English abbreviation. For example, when the tag information is "WTO," the tag information has meanings such as "World Trade Organization" or "Warsaw Treaty Organization." In this case, the tag information that is not intended by the user is likely to be associated with the tag information. In this regard, the user may input sub name information indicating a formal name of the tag information when the tag information is input. Further, when the tag information is displayed in the tag relevance information display area 300, the user may set the tag information as the tag information of the object information by dragging the tag information and dropping it in the SNS display area 200. Various kinds of information including the object information are input using the input unit 40b.

The input unit 40b outputs the object information to the control unit 40e. The control unit 40e assigns the user ID to the object information and generates posting information. Then, the control unit 40e outputs the posting information to the communication unit 40d. The communication unit 40d transmits the posting information to the tag processing server 10. The communication unit 10b of the tag processing server 10 receives the posting information and outputs the posting information to the control unit 10c. The control unit 10c extracts the user ID from the posting information. Then, the control unit 10c acquires the face image information and the name information corresponding to the user ID from the tag management server 20. Specifically, the control unit 10c transmits request information including the user ID to the tag management server 20. The communication unit 20*b* of the tag management server 20 receives the request information, and outputs the request information to the control unit 20*c*. The control unit 20*c* acquires the face image information and the name information corresponding to the user ID from the storage unit 20*a*, and outputs the face image information and the name information to the communication unit 20*b*. The communication unit 20*b* transmits the face image information and the name information to the tag processing server 10. The communication unit 10*b* of the tag processing server 10 receives the face image information and the name information, and outputs the face image information and the name information to the control unit 10*c*.

Figure 14:
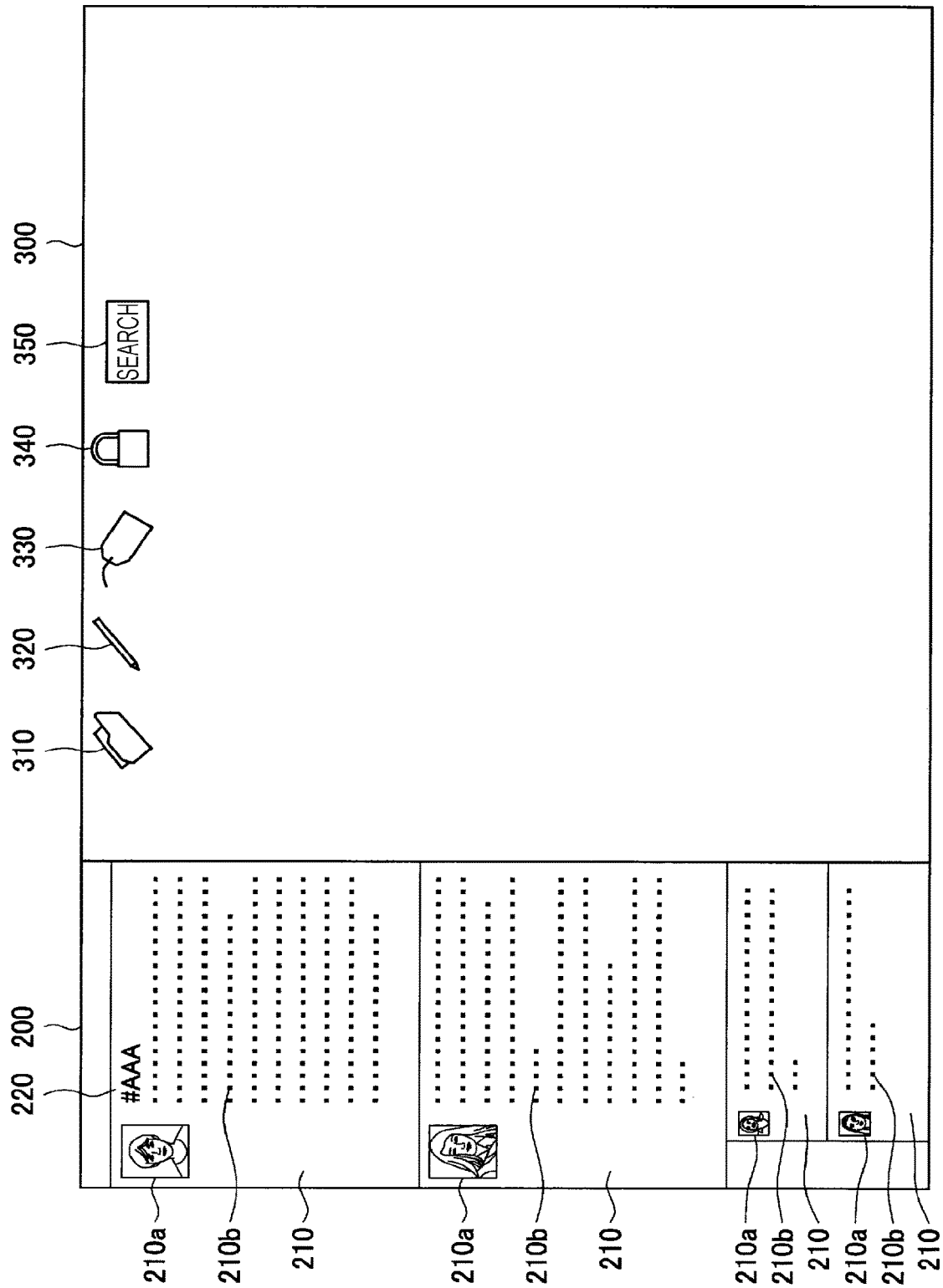
FIG. 14 is an explanatory diagram illustrating an example of a screen displayed on a user terminal.

Then, the control unit 10*c* generates the SNS information including the object information and the face image information. Then, the control unit 10*c* outputs the SNS information to the communication unit 10*b*. The communication unit 10*b* transmits the SNS information to the user terminals 40. The communication unit 40*d* of the user terminal 40 outputs the SNS information to the control unit 40*e*, and the control unit 40*e* causes the SNS information to be displayed in the SNS display area 200. As a result, the object information posted by the user is shared with other users. FIG. 14 illustrates a display example. As illustrated in FIG. 14, the SNS display area 200 includes a plurality of unit display areas 210. The control unit 40*e* causes the SNS information to be displayed in each unit display area 210. Specifically, the unit display area 210 is divided into a face image display area 210*a* and an object information display area 210*b*. The control unit 40*e* causes the face image information to be displayed in the face image display area 210*a*, and causes the object information (including the tag information) to be displayed in the object information display area 210*b*. The control unit 40*e* causes the SNS information to be chronologically displayed. In other words, the control unit 40*e* causes the latest SNS information to be displayed in the unit display area 210 at the top. Tag information 220 written as "# AAA" is included in the object information displayed in the unit display area 210 at the top. In this example, nothing is displayed in the tag relevance information display area 300. In other words, no tag information is registered in the tag relevance information.

In step S20, the control unit 10*c* generates (updates) the tag relevance information based on the tag information. In other words, the control unit 10*c* requests the tag management server 20 to transmit the tag relevance information. Specifically, the control unit 10*c* transmits tag relevance request information to the tag management server 20. The communication unit 20*b* of the tag management server 20 receives the tag relevance request information, and outputs the tag relevance request information to the control unit 20*c*. The control unit 20*c* acquires the tag relevance information from the storage unit 20*a*, and outputs the tag relevance information to the communication unit 20*b*. The communication unit 20*b* transmits the tag relevance information to the tag processing server 10. The communication unit 10*b* of the tag processing server 10 receives the tag relevance information, and outputs the tag relevance information to the control unit 10*c*.

Here, FIG. 10 illustrates an example of the tag relevance information. As illustrated in FIG. 10, the tag relevance information is information of a table form and configured with a tag ID field, a tag content field, a creator field, a user field, a tag relevance field, a coordinates field, and a layer field. A tag ID for identifying the tag information is stored in the tag ID field. Tag content, specifically, the tag information, is stored in the tag content field. The sub name information is also stored in the tag content field. A name of the user, that is, a creator who has created the tag information, is stored in the creator field. A user ID of the creator may be stored in the creator field. A name of the user who has used the tag information is stored in the user field. A user ID of the user may be stored in the user field. A tag ID of the tag information associated with the tag information is stored in the tag relevance field. Tag content may be stored in the tag relevance field. The relevance between the tag information is designated by the user. Display coordinates of the tag information in the tag relevance information display area 300 are stored in the coordinates field. The display coordinates are default values. In other words, after the tag information is displayed in the tag relevance information display area 300, the user can change a display position of the tag information according to his/her preference. A tag ID of the tag folder in which the tag information is stored is stored in the layer field.

The control unit 10*c* determines whether or not the tag information assigned in step S10 is registered in the tag relevance information. Specifically, the control unit 10*c* compares the tag information assigned in step S10 with the tag information stored in the tag content field. The comparison is also performed for the sub name information.

As a result, when both the tag information and the sub name information are identical, the control unit 10*c* determines that the tag information assigned in step S10 is registered. On the other hand, when at least one of the tag information and the sub name information is different, the control unit 10*c* determines that the tag information assigned in step S10 has not been registered. As described above, the control unit 10*c* can recognize that the tag information having the same notation but different formal names is different tag information.

When the tag information assigned in step S10 is not registered in the tag relevance information, the control unit 10*c* adds a new line to the tag relevance information and stores the tag information in the line. The control unit 10*c* stores a newly generated tag ID in the tag ID field. The control unit 10*c* stores the name information acquired in step S10 in the creator field and the user field. The control unit 10*c* causes the tag relevance field to be blank, and causes display coordinates that do not overlap the display coordinates of other tag information to be stored in the coordinates field. The control unit 10*c* causes the layer field to be blank. On the other hand, when the tag information is registered, the control unit 10*c* adds the name information acquired in step S10 to the user field corresponding to the tag information. In other words, the control unit 10*c* adds the user who has input the tag information to the user field. The tag relevance information is information common to all the users.

In step S30, the control unit 10*c* outputs the tag relevance information to the communication unit 10*b*. The communication unit 10*b* transmits the tag relevance information to the tag management server 10 and the user terminals 40. The communication unit 20*b* of the tag management server 20 receives the tag relevance information, and outputs the tag relevance information to the control unit 20*c*. The control unit 20*c* causes the tag relevance information to be stored in the storage unit 20*a*. On the other hand, the communication unit 40*d* of the user terminal 40 receives the tag relevance information, and outputs the tag relevance information to the control unit 40*e*. The control unit 40*e* causes the tag information to be displayed in the tag relevance information display area 300 based on the tag relevance information.

FIG. 15 illustrates a display example. In this example, the tag information 400a written as "AAA" is displayed in the tag relevance information display area 300.

Thereafter, the user can arbitrarily change the display position of the tag information. For example, the user drags the tag information 400a illustrated in FIG. 15 to a desired position and drops it. Accordingly, the control unit 40e causes the tag information 400a to move to the position at which the user has dropped it. Thereafter, the information processing system 1 ends the tag relevance information generation process.

1-6. Maintenance Process

The information processing system 1 can perform the maintenance of the tag relevance information (specifically, the tag information displayed in the tag relevance information display area 300) based on maintenance request information input from the user.

(1-6-1. Overview of Process)

Figure 8:
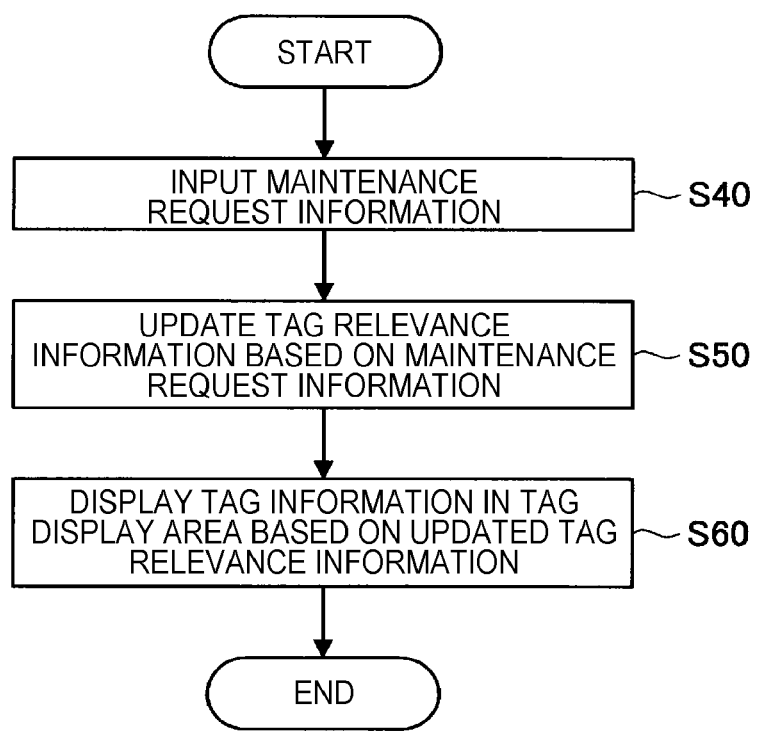
FIG. 8 is a flowchart illustrating a procedure of a process performed in an information processing system.

In this regard, first, an overview of the maintenance process will be described with reference to a flowchart illustrated in FIG. 8. In step S40, the user performs an input operation indicating that the maintenance is requested. Accordingly, the control unit 40e generates maintenance request information, and outputs the maintenance request information to the communication unit 40d. The communication unit 40d transmits the maintenance request information to the tag processing server 10. The communication unit 10b of the tag processing server 10 receives the maintenance request information, and outputs the maintenance request information to the control unit 10c.

In step S50, the control unit 10c acquires the tag relevance information from the tag management server 20, and updates the tag relevance information based on the maintenance request information. In step S60, the control unit 10c outputs the updated tag relevance information to the communication unit 10b. The communication unit 10b transmits the tag relevance information to the tag management server 20 and the user terminals 40. The tag management server 20 stores the tag relevance information. On the other hand, the user terminals 40 causes the tag information to be displayed in the tag relevance information display area 300 based on the updated tag relevance information. Thereafter, the information processing system 1 ends the present process. As described above, when any one user performs the maintenance process, the result can be shared with other users. A specific example of the maintenance process will be described.

(1-6-2. Tag Association Process)

Figure 16:
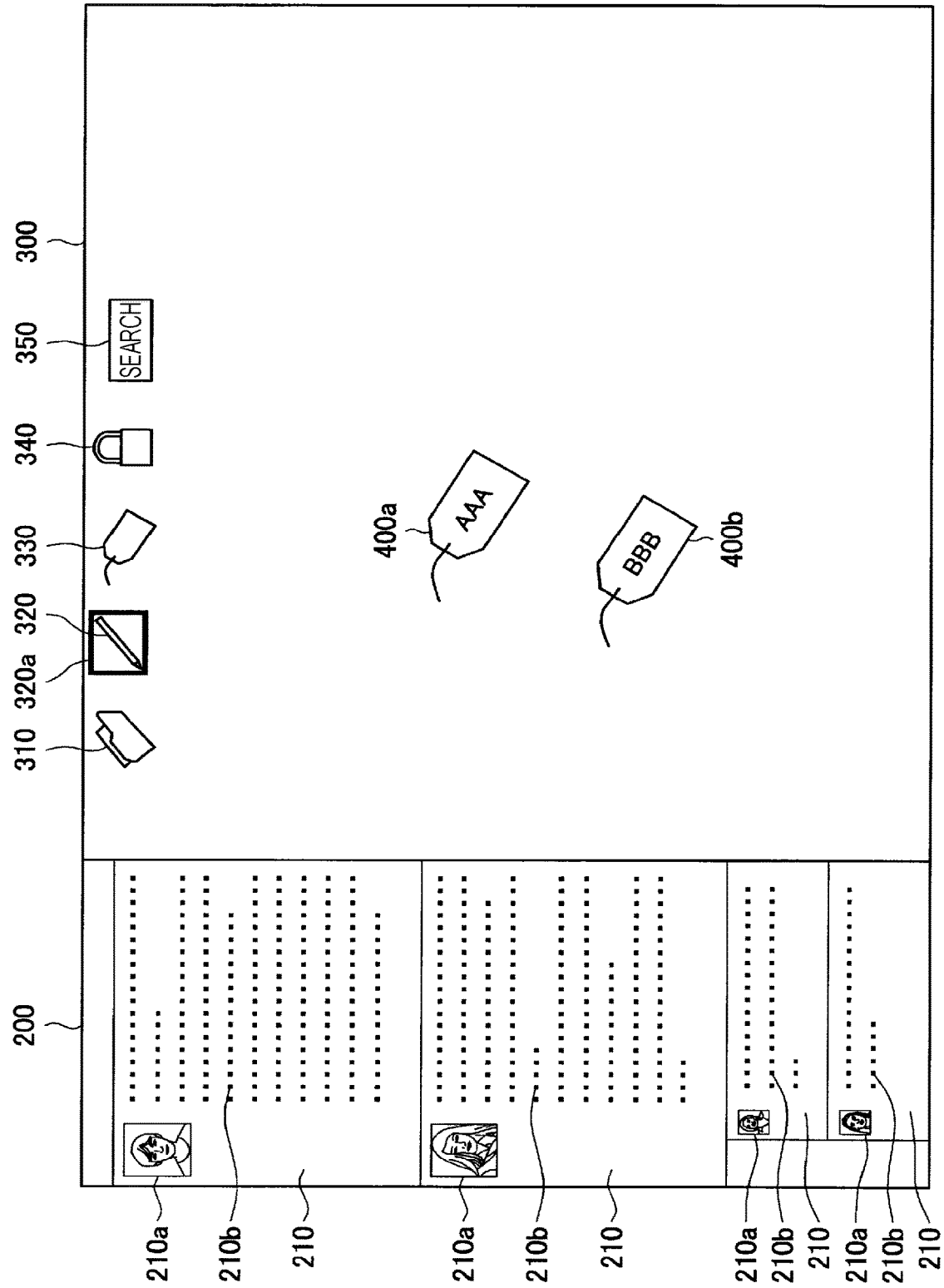
FIG. 16 is an explanatory diagram illustrating an example of a screen displayed on a user terminal.

When a plurality of pieces of tag information are displayed in the tag relevance information display area 300, the user can associate the tag information. For example, when the tag information 400a and 400b is displayed in the tag relevance information display area 300 as illustrated in FIG. 16, the user can associate the tag information 400a and 400b. The tag information 400b indicates tag information "BBB."

Specifically, the user taps the maintenance icon 320 illustrated in FIG. 16. The maintenance icon 320 is a pen type icon. Accordingly, the control unit 40e causes the maintenance icon 320 to be highlighted. For example, the control unit 40e causes the maintenance icon 320 to be surrounded by a frame image 320a. Of course, the highlighting is not limited to this example. As another example of the highlighting, there are an enlarged display, a display of a different color, a blinking display, and the like. Then, the user drags a finger from one tag information to the other tag information among a plurality of pieces of tag information that are desired to be associated. For example, when the tag information 400a and the tag information 400b are desired to be associated, the user taps the tag information 400a (or the tag information 400b), and then drags the finger up to the tag information 400b (or the tag information 400a). Accordingly, the control unit 40e generates the maintenance request information indicating that a plurality of pieces of tag information designated by the user are associated. Then, the control unit 40e outputs the maintenance request information to the communication unit 40d, and the communication unit 40d transmits the maintenance request information to the tag processing server 10.

The communication unit 10b of the tag processing server 10 receives the maintenance request information, and outputs the maintenance request information to the control unit 10c. The control unit 10c acquires the tag relevance information from the tag management server 20. Then, the control unit 10c updates the tag relevance information based on the maintenance request information. Specifically, the control unit 10c specifies a plurality of pieces of tag information that are requested to be associated. Then, the control unit 10c stores the tag ID of the other tag information in the tag relevance field corresponding to one tag information. Similarly, the control unit 10c stores the tag ID of one tag information in the tag relevance field corresponding to the other tag information. For example, the control unit 10c causes the tag ID of the tag information 400b to be stored in the tag relevance field corresponding to the tag information 400a, and causes the tag ID of the tag information 400a to be stored in the tag relevance field corresponding to the tag information 400b. Then, the control unit 10c outputs the updated tag relevance information to the communication unit 10b. The communication unit 10b transmits the tag relevance information to the tag management server 20 and the user terminals 40.

The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Here, the control unit 40e causes the connection information to be displayed based on the tag ID of the tag relevance field. The connection information is line information that connecting the tag information that is associated with each other. FIG. 17 illustrates a display example. In this example, the tag information 400a and 400b are connected through the connection information 410.

Figure 19:
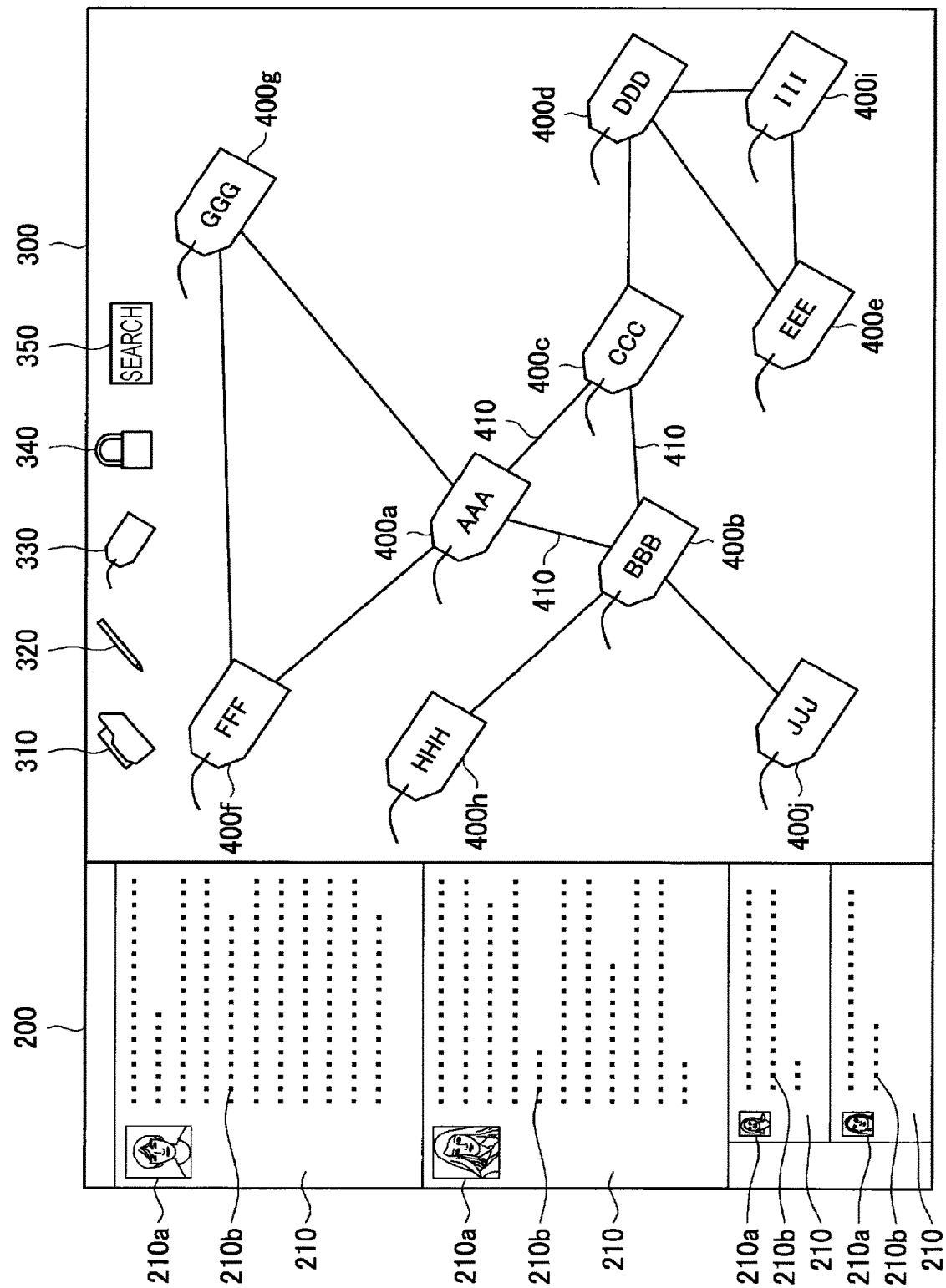
FIG. 19 is an explanatory diagram illustrating an example of a screen displayed on a user terminal.
Figure 20:
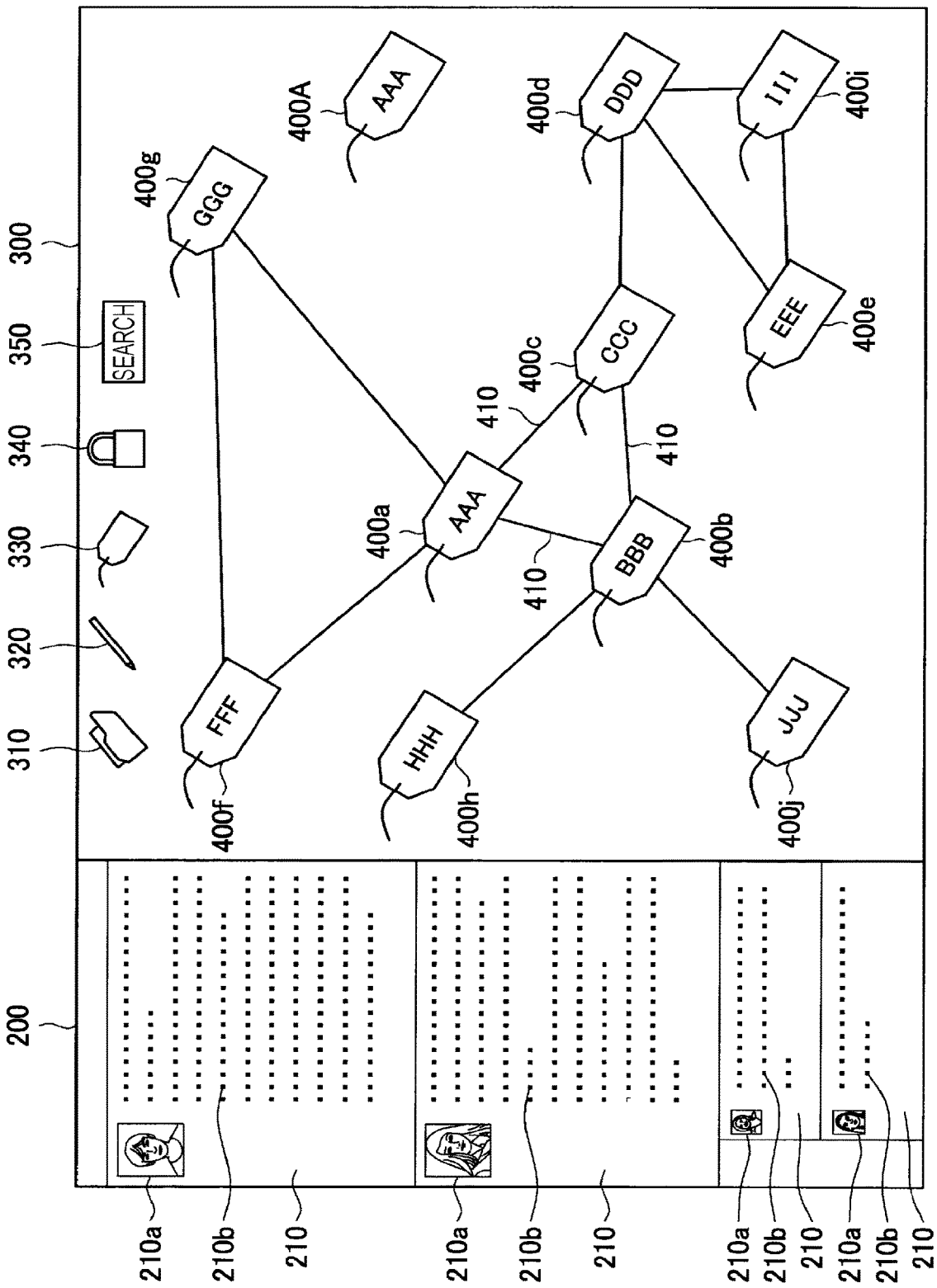
FIG. 20 is an explanatory diagram illustrating an example of a screen displayed on a user terminal.

The information processing system 1 can cause a plurality of pieces of tag information to be displayed in the tag relevance information display area 300 and associate the tag information with one another by repeatedly performing the tag relevance information generation process and the tag association process. FIGS. 19 and 20 illustrate examples in which a plurality of pieces of tag information is displayed in the tag relevance information display area 300. In FIG. 19, a plurality of pieces of tag information 400a to 400j are displayed in the tag relevance information display area 300, and the tag information that is associated with each other among the tag information 400a to 400j is connected through the connection information 410. The tag information 400c to 400j is tag information "CCC" to "JJJ." In FIG. 20, a plurality of pieces of tag information 400a to 400j and 400A are displayed in the tag relevance information display area 300. The tag information 400A indicates character information such as "AAA," similarly to the tag information 400a. However, the sub name information is different. Thus, the tag information 400a and 400A are different tag information. According to the tag association process, a plurality of users associate a plurality of pieces of tag information, and thus each user can refer to associations performed by other users. As a result, each user can have a new idea about the relevance between the tag information.

When a plurality of pieces of tag information is displayed in the tag relevance information display area 300 as illustrated in FIGS. 19 and 20, the user may feel cumbersome. In this regard, the control unit 40e may cause only tag information input by the user and tag information associated with the tag information to be displayed in the tag relevance information display area 300. Here, when a plurality of pieces of tag information are connected through the connection information using the tag information input by the user as a basic point, the control unit 10c may cause all of the tag information to be displayed. For example, when the user inputs the tag information 400a illustrated in FIG. 19, the control unit 10c may cause the tag information 400b to 400j connected with one another using the tag information 400a as the basic point to be displayed in the tag relevance information display area 300. Further, even when the user is inputting the tag information, the control unit 40e may perform predictive conversion on the tag information and cause only the tag information that has undergone the predictive conversion and tag information associated with the tag information to be displayed in the tag relevance information display area 300.

The control unit 40e may cause the frequency of use of the tag information by the user to be stored in the storage unit 40a and change the display position of the tag information based on the frequency of use of the tag information. For example, the control unit 40e may cause the display position of the tag information to get closer to the center of the tag relevance information display area 300 as the frequency of use of the tag information by the user increases. The control unit 10c of the tag processing server 10 may collect the frequency of use of the tag information by all the users and change a value of the coordinates field in the tag relevance information according to the result. For example, the control unit 10c causes the display position of the tag information to get closer to the center of the tag relevance information display area 300 as the frequency of use of the tag information by all the users increases.

The information processing system 1 may adjust a degree of relevance between the tag information based on the input operation from the user. For example, when the user desires to adjust a degree of relevance between the tag information, the user taps the connection information connecting the tag information with each other. For example, when the user desires to adjust the relevance of the tag information 400a and 400b illustrated in FIG. 17, the user taps the connection information 410 connecting the tag information 400a and 400b. Accordingly, the control unit 10c generates maintenance request information indicating that the relevance of the tag information is highlighted. The control unit 10c outputs the maintenance request information to the communication unit 40d. The communication unit 40d transmits the maintenance request information to the tag processing server 10.

The communication unit 10b of the tag processing server 10 receives the maintenance request information, and outputs the maintenance request information to the control unit 10c. The control unit 10c acquires the tag relevance information from the tag management server 20. Then, the control unit 10c updates the tag relevance information based on the maintenance request information. Specifically, the control unit 10c specifies the tag ID of the tag information whose association is requested to be highlighted. Then, the control unit 10c assigns highlighting information to the specified tag ID in the tag relevance field. FIG. 10 illustrates an example of the highlighting information. In this example, the relevance of the tag information 400a and 400b is highlighted. The highlighting information is indicated by a mark *. Then, the control unit 10c outputs the updated tag relevance information to the communication unit 10b. The communication unit 10b transmits the tag relevance information to the tag management server 20 and the user terminals 40.

Figure 18:
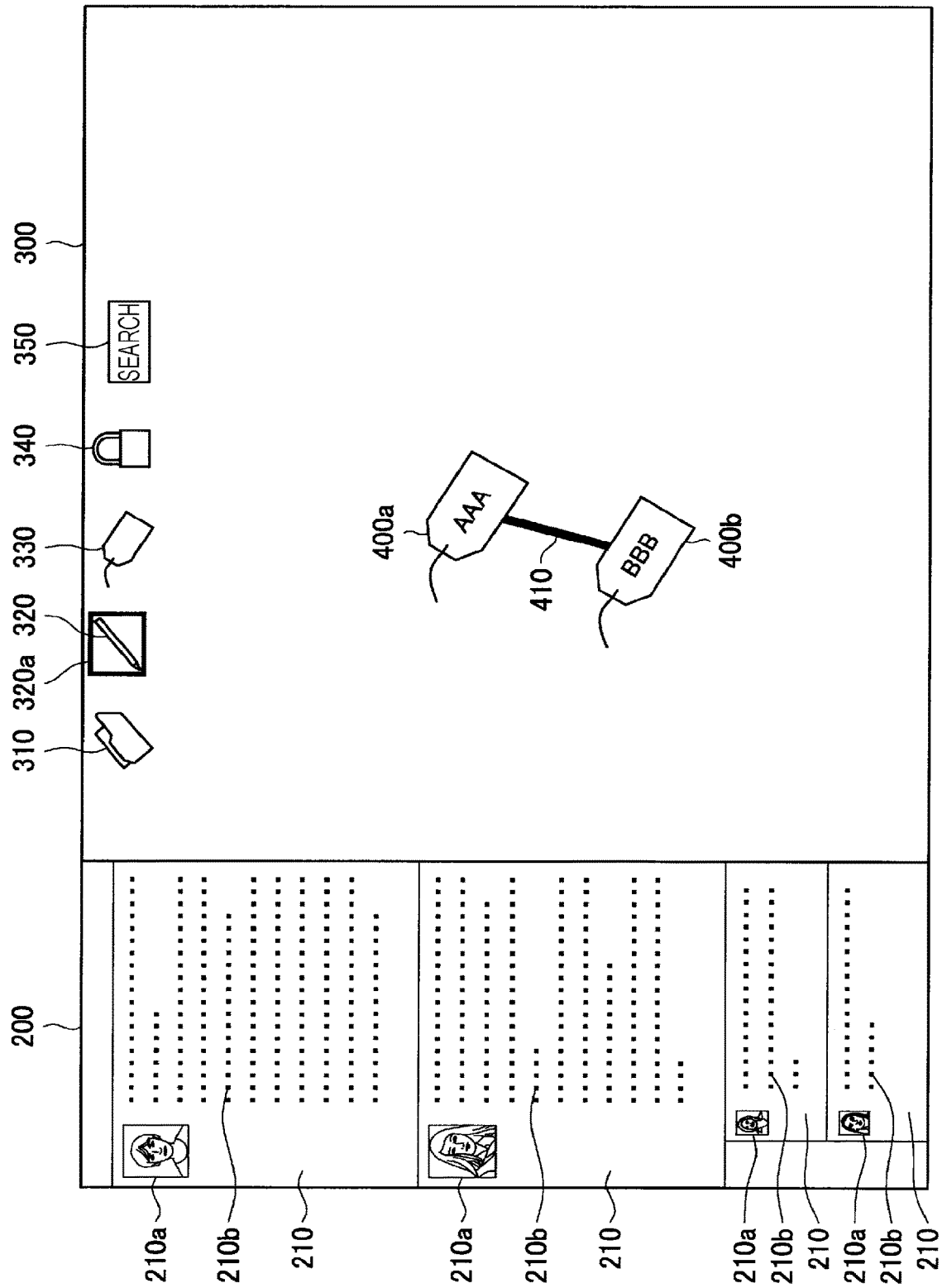
FIG. 18 is an explanatory diagram illustrating an example of a screen displayed on a user terminal.

The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Here, the control unit 40e causes the connection information to be displayed based on the tag ID in the tag relevance field. Further, when the highlighting information is assigned to the tag ID in the tag relevance field, the control unit 40e causes the connection information corresponding to the highlighting information to be highlighted. For example, when the highlighting information is assigned to the relevance of the tag information 400a and 400b illustrated in FIG. 16, the control unit 40e causes the connection information 410 connecting the tag information 400a and 400b to be highlighted as illustrated in FIG. 18. For example, the control unit 40e causes the connection information 410 to be displayed with a heavy line. The example of the highlighting is not limited thereto. For example, the control unit 40e may cause the connection information 410 to be displayed in a different color from that of other connection information 410. The control unit 40e may cause the connection information 410 indicating specific relevance to be displayed in a specific color. The control unit 10c of the tag processing server 10 may adjust the degree of the relevance, for example, according to the number of taps of the user on the connection information. In this case, the control unit 40e of the user terminal 40 may adjust a degree of the highlighting according to the degree of the relevance. A priority of the user may be set. For example, when the first embodiment is applied to an SNS in a hospital, a priority of doctors may be set to be higher than a priority of patients. The control unit 40e may cause the connection information generated according to the maintenance request information transmitted from the user having a high priority to be more highlighted than the connection information generated according to the maintenance request information transmitted from the user having a low priority. In this case, the tag ID and the priority of the user who has requested the relevance are associated and stored in the relevance field of the tag relevance information.

(1-6-3. Folder Management Process)

Figure 21:
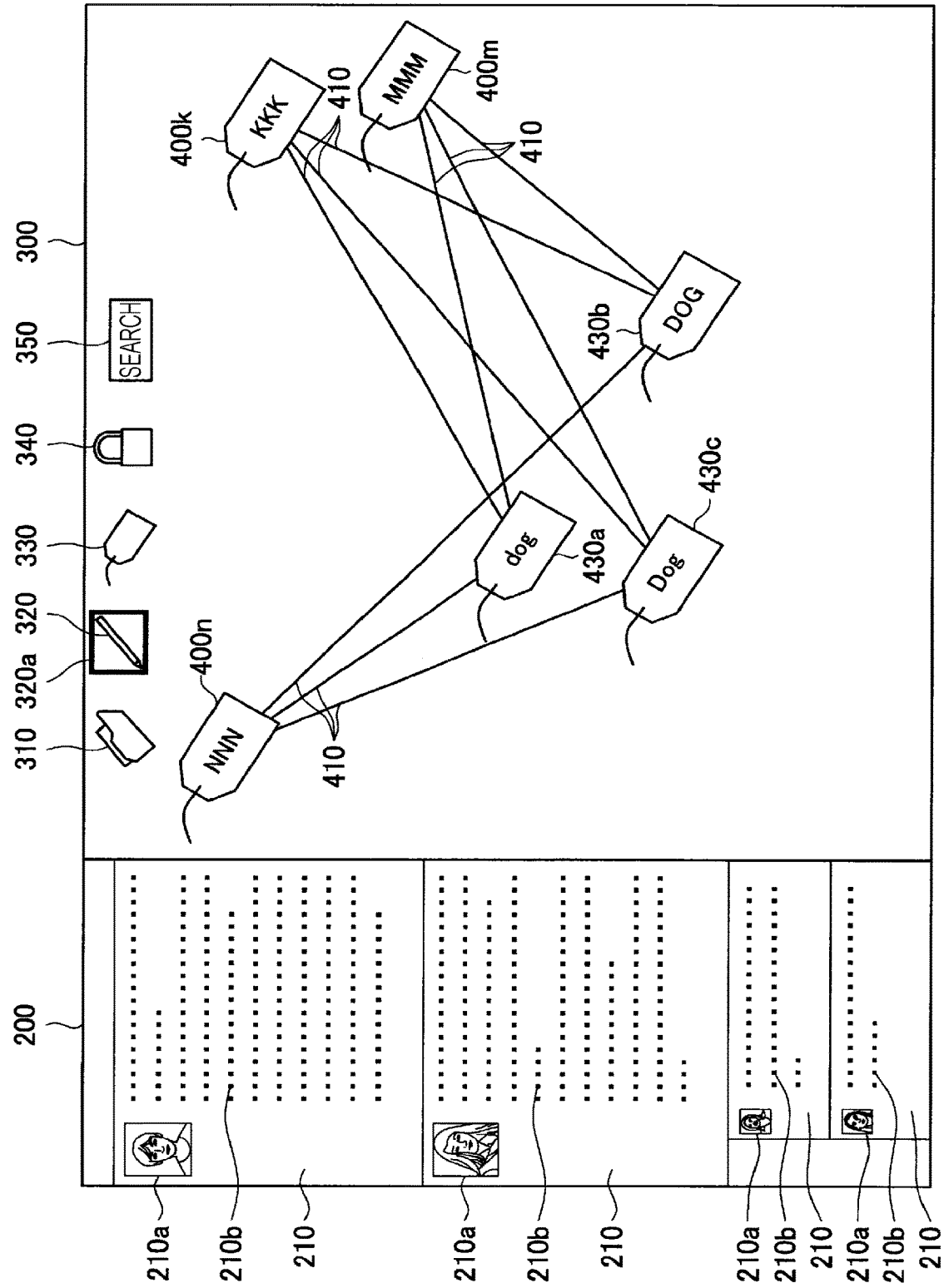
FIG. 21 is an explanatory diagram illustrating an example of a screen displayed on a user terminal.

When one or more pieces of tag information are displayed in the tag relevance information display area 300, the user can store the tag information in the tag folder. For example, when tag information 400k to 400n and 430a to 430c are displayed in the tag relevance information display area 300 as illustrated in FIG. 21, the user can arrange the tag information 430a to 430c in the tag folder. Here, the tag information 400k to 400n is tag information indicating "KKK" to "NNN." The tag information 430a is tag information indicating "dog," the tag information 430b is tag information indicating "DOG" and the tag information 430c is tag information indicating "Dog." The tag information has the same meaning and is all associated with the tag information 400k to 400n. FIG. 11 illustrates an example of the tag relevance information corresponding to the display example of FIG. 21.

Therefore, since the tag information is arranged in one tag folder (that is, hierarchized), they can be dealt with as the same meaning at the time of the search process. In other words, the accuracy of the search process is improved. There is a merit in that the tag information of the tag relevance information display area 300 is organized.

Specifically, the user inputs the object information including arbitrary tag information (preferably, the tag information serving as a generic term of the tag information that is desired to be arranged in the tag folder. Hereinafter, the tag information is also referred to as "tag folder creation tag information") to the user terminal 40. Accordingly, the information processing system 1 performs the tag relevance information generation process, registers the tag folder creation tag information input by the user in the tag relevance information, and the tag folder creation tag information to be displayed in the tag relevance information display area 300. Then, the user drags the tag folder creation tag information in the tag relevance information display area 300 and drops it on the maintenance icon 310. The user may drag the maintenance icon 310 and drop it on the tag folder creation tag information.

Accordingly, the control unit 40e generates maintenance request information indicating that the tag folder is requested to be created, and outputs the maintenance request information to the communication unit 40d. The communication unit 40d transmits the maintenance request information to the tag processing server 10. The communication unit 10b of the tag processing server 10 outputs the maintenance request information to the control unit 10c. The control unit 10c acquires the tag relevance information from the tag management server 20. Then, the control unit 10c causes the tag folder information to be stored in the tag content field corresponding to the tag folder creation tag information among the tag relevance information. The tag folder information is information indicating that the tag information is the tag folder. FIG. 12 illustrates an example of the tag folder information. FIG. 12 is an example of the tag relevance information, and tag information corresponding to the tag ID 10007 is the tag folder. In the tag content field corresponding to the tag ID 10007, the tag folder information is indicated by a mark *.

Then, the control unit 10c outputs the updated tag relevance information to the communication unit 10b. The communication unit 10b transmits the tag relevance information to the tag management server 20 and the user terminals 40. The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Here, the control unit 40e converts the tag information included in the tag folder information in the tag content field into the tag folder.

Figure 22:
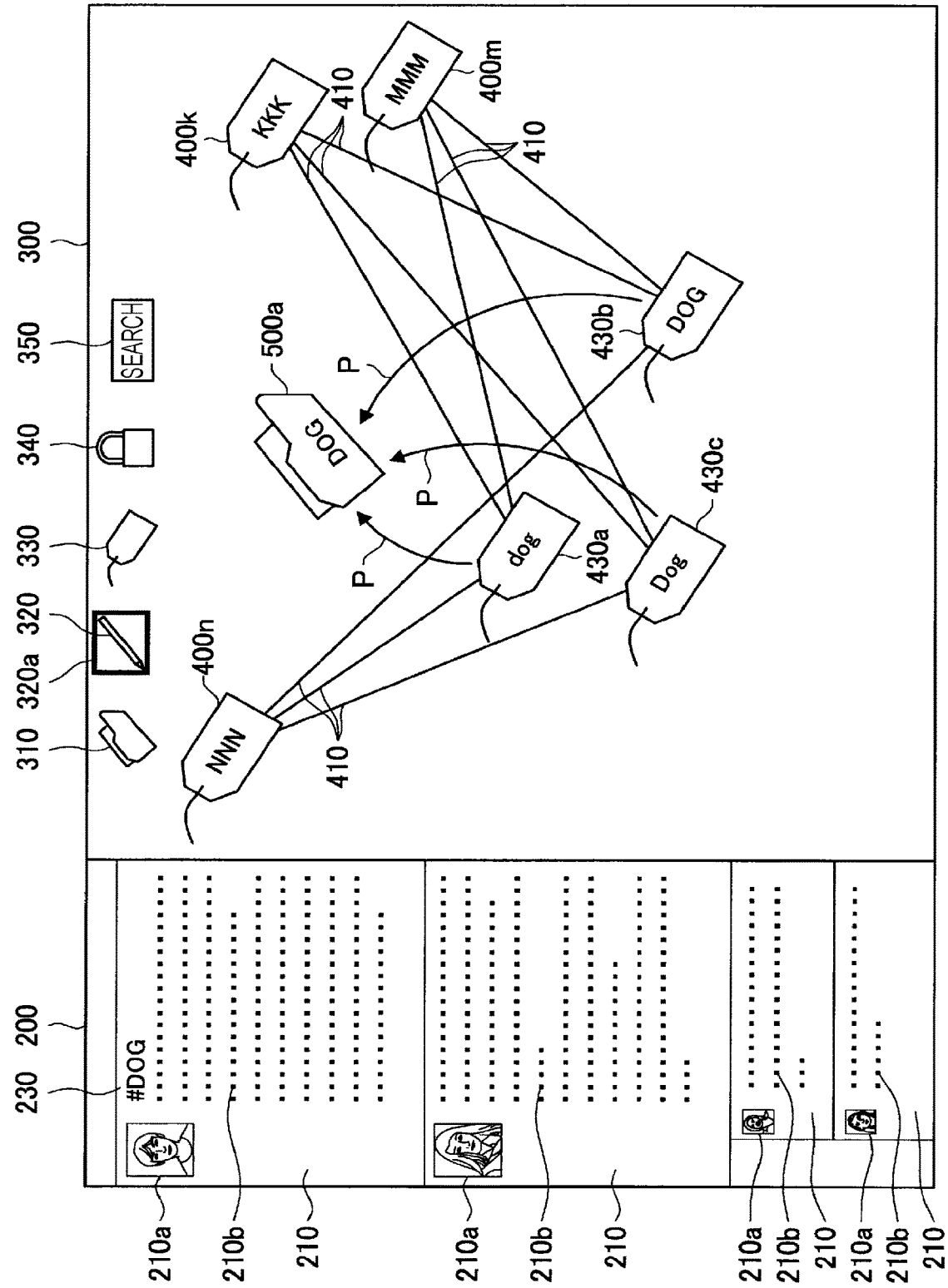
FIG. 22 is an explanatory diagram illustrating an example of a screen displayed on a user terminal.

For example, when the user creates the tag folder 500a indicating "DOG" as illustrated in FIG. 22, the object information including tag information 230 indicating "# DOG" is input to the user terminal 40. Accordingly, the information processing system 1 causes the tag folder creation tag information written as "DOG" to be displayed in the tag relevance information display area 300. Thereafter, the user drags the tag folder creation tag information and drops it on the maintenance icon 310. Accordingly, the information processing system 1 converts the tag folder creation tag information into the tag folder 500a.

Then, the user stores desired tag information in the tag folder. Specifically, the user drags desired tag information and drops it in the tag folder. For example, when the user desires to store the tag information 430a to 430c in the tag folder 500a in the example illustrated in FIG. 22, the user drags the tag information 430a to 430c and drops it in the tag folder 500a as indicated by an arrow P. Accordingly, the control unit 40e generates maintenance request information indicating that the tag information is requested to be stored in the tag folder, and outputs the maintenance request information to the communication unit 40d. The maintenance request information indicates the tag information designated by the user and a tag folder in which the tag information is stored.

The communication unit 40d transmits the maintenance request information to the tag processing server 10. The communication unit 10b of the tag processing server 10 outputs the maintenance request information to the control unit 10c. The control unit 10c acquires the tag relevance information from the tag management server 20. Then, the control unit 10c specifies the tag information and the tag folder indicated by the maintenance request information among the tag relevance information. Then, the control unit 10c causes the tag ID of the specified tag folder to be stored in the layer field of the specified tag information. As a result, the tag information designated by the user is stored in the tag folder (that is, the tag information is arranged in a layer lower than the tag folder). Information stored in the layer field may be tag content of the tag folder. FIG. 12 illustrates an example. In this example, tag information (that is, the tag information 430a to 430c) of tag IDs 10001 to 10003 is stored in the tag folder (that is, the tag folder 500a) of the tag ID 10007.

Further, when the tag information stored in the tag folder is associated with other tag information, the control unit 10c determines the tag folder to be also associated with the tag information. The control unit 10c causes the tag ID of the tag information associated with the tag folder to be stored in the tag relevance field corresponding to the tag folder. FIG. 12 illustrates an example. In this example, the tag information 430a to 430c is stored in the tag folder 500a, but the tag information 430a to 430c is associated with the tag information (that is, the tag information 400k to 400n) of the tag IDs 10004 to 10006. Therefore, the tag IDs 10004 to 10004 are stored in the tag relevance field of the tag folder 500a. The tag IDs 10004 to 10006 are stored in the tag relevance fields of the tag information 430a to 430c. A character "-" is added to the end of the tag IDs 10004 to 10006. This character indicates, for example, that the connection information indicating the tag relevance may be omitted. Then, the control unit 10c outputs the updated tag relevance information to the communication unit 10b. The communication unit 10b transmits the tag relevance information to the tag management server 20 and the user terminals 40.

Figure 23:
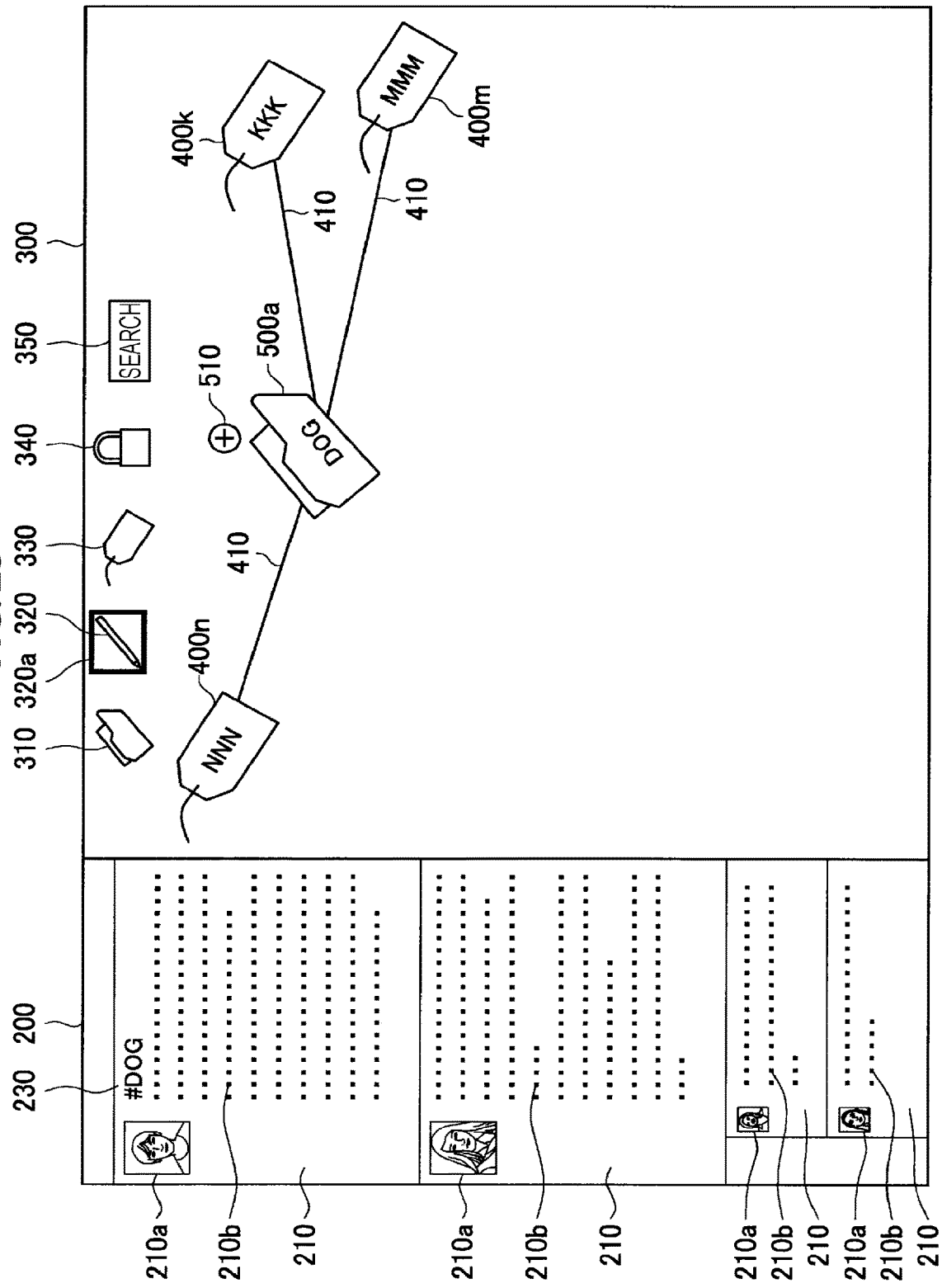
FIG. 23 is an explanatory diagram illustrating an example of a screen displayed on a user terminal.

The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Here, the control unit 40e causes the tag information in which the tag folder information is stored in the tag content field to be displayed as the tag folder. The control unit 40e causes the tag information to be stored in the tag folder with reference to the layer field. When the tag relevance information illustrated in FIG. 12 is assigned, the control unit 40e creates the tag folder 500a and causes the tag information 430a to 430c to be stored in the tag folder 500a as illustrated in FIG. 23. Further, the control unit 40e associates the tag folder with other tag information with reference to the tag relevance field of the tag folder. In the tag relevance information illustrated in FIG. 12, since the tag IDs 10004 to 10006 (that is, the tag information 400k to 400n) are stored in the tag relevance field corresponding to the tag folder 500a, the control unit 40e associates the tag folder 500a with the tag information 400k to 400n. Specifically, the control unit 40e connects the tag folder 500a with the tag information 400k to 400n using the connection information 410. The control unit 40e causes an open designation icon 510 to be arranged nearby the tag folder 500a.

When the user taps the open designation icon 510, the control unit 40e opens the tag folder 500a and causes the tag information 430a to 430c in the tag folder 500a to be displayed as illustrated in FIG. 24. Specifically, the control unit 40e causes a tag folder display area 530a to be set below a tag folder 530, and causes the tag information 430a to 430c to be displayed in the tag folder display area 530a. As a result, the control unit 40e can display the tag folder 500a and the tag information 430a to 430c to be associated. Here, the control unit 40e may connect the tag information 430a to 430c with the tag information 400k to 400n associated with the tag information 430a to 430c using the connection information 410. The connection information 410 may be omitted. As illustrated in FIG. 24, the connection information 410 may be displayed in a form (for example, a broken line or the like) that is less noticeable than the connection information 410 extending from the tag folder 500a.

The control unit 40e causes a close designation icon 520 to be displayed nearby the tag folder 500a while the tag folder 500a is being opened. The control unit 40e closes the tag folder 500a when the user taps the close designation icon 520. Specifically, the control unit 40e causes an image illustrated in FIG. 23 to be displayed.

In the above example, only the tag information is stored in the tag folder, but the tag folder may be further stored in the tag folder. Here, when a certain tag folder is not stored in another tag folder, the tag folder is the top tag folder. The tag information stored in the top tag folder and the tag folder are tag information and a tag folder in a first layer. The tag information stored in the tag folder in the first layer and the tag folder are tag information and a tag folder in a second layer. Thereafter, counting is performed through the same process.

In the above example, the tag information having the same meaning but different notations is arranged in one tag folder, but it will be appreciated that the use of the tag folder is not limited thereto. For example, the user may create a tag folder indicating a project name and sequentially store tag information generated in the project in the tag folder. In this case, for example, when the project name is changed, the user preferably changes a name of the tag folder to a new project name. Then, the user preferably stores tag information generated after the project name is changed in the same tag folder as well. As a result, the tag information before and after the project name is changed is stored in the same tag folder. Then, for example, in the search process, the information processing system 1 can use both of the tag information before the change and the tag information after the change as the search word. Further, there is a merit in that the tag information of the tag relevance information display area 300 is organized. The user can determine that the tag information before the project is changed and the tag information after the project is changed belong to the same project.

Further, when the user is developing a product, the user may create a tag folder indicating a development code and stores tag information that is generated during the development in the tag folder. In this case, for example, when a product name is decided, the user preferably change a name of the tag folder from the development code to the product name. Then, the user preferably stores tag information generated after the product name is decided in the same tag folder as well. As a result, the tag information corresponding to the development code and the tag information corresponding to the product name are stored in the same tag folder. Then, for example, in the search process, the information processing system 1 can use both of the tag information corresponding to the development code and the tag information corresponding to the product name as the search word. Further, there is a merit in that the tag information of the tag relevance information display area 300 is organized. The user can determine that the tag information corresponding to the development code and the tag information corresponding to the product name are associated with the same product.

The user may create the tag folder indicating the project name for each project. Then, when a plurality of projects are integrated into one project, the user may create a tag folder indicating a project name after the integration and store a plurality of tag folders before the integration in the tag folder. As a result, the tag information generated in each of the projects before the integration and the tag information generated in the project after the integration are stored in the same tag folder. Then, for example, in the search process, the information processing system 1 can use both of the tag information corresponding to the projects before the integration and the tag information corresponding to the project after the integration as the search word. Further, there is a merit in that the tag information of the tag relevance information display area 300 is organized. The user can determine that the tag information corresponding to the projects before the integration and the tag information corresponding to the project after the integration belong to the same project.

Further, when there are a plurality of names (for example, formal name, a nickname, or the like) as a name of a certain subject (for example, a person, a geographical name, a product name, or the like), the user may create a tag folder indicating a representative one of the names. Then, the user may store tag information indicating each name in the tag folder. In this case, for example, in the search process, the information processing system 1 can use various names as the search word together. Further, there is a merit in that the tag information of the tag relevance information display area 300 is organized. The user can determine that a plurality of pieces of tag information indicate the same subject.

(1-6-4. Browsing Restriction Setting Process)

The user may set a browsing restriction in the tag folder. For example, in the example illustrated in FIG. 23, the user may set the browsing restriction in the tag folder 500a. In this case, browsing of the tag information 430a to 430c stored in the tag folder 500a is restricted. As an example in which the browsing restriction is used, tag information related to a specific project is permitted to be browsed by a certain user involved in the project.

Specifically, the user drags the tag folder on which the browsing restriction is desired to be set and drops it on the maintenance icon 340. The user may drag the tag folder and drop it on the maintenance icon 340. For example, the user drags the tag folder 500a and drops it on the maintenance icon 340.

Accordingly, the control unit 40e asks the user about the user to whom a permission for browsing (access) is given. For example, the control unit 40e causes a message window 700 illustrated in FIG. 26 to be displayed. Character information for asking about the user to whom a permission for browsing is given and a user input field 710 are displayed on the message window 700. The user inputs the user to whom a permission for browsing is given to the user input field 710. For example, the user inputs the user ID of the user to whom a permission for browsing is given (which may be a mail address, a mailing list, a global ID, or the like).

Accordingly, the control unit 40e generates maintenance request information indicating that the browsing restriction is requested to be set, and outputs the maintenance request information to the communication unit 40d. The maintenance request information indicates a tag folder serving as a browsing restriction setting target (hereinafter, also referred to as a "browsing restriction tag folder") and the user ID of the user to whom a permission for browsing is given. The communication unit 40d transmits the maintenance request information to the tag processing server 10. The communication unit 10b of the tag processing server 10 outputs the maintenance request information to the control unit 10c. The control unit 10c acquires the tag relevance information from the tag management server 20. Then, the control unit 10c specifies the browsing restriction tag folder based on the maintenance request information.

Then, the control unit 10c assigns browsing restriction information to the tag content field of the browsing restriction tag folder. Further, the control unit 10c causes a name of the user who gets a permission for browsing to be stored in a user field of browsing restriction tag information. Further, the control unit 10c specifies the browsing restriction tag information stored in the tag folder (hereinafter, also referred to as "browsing restriction tag information") based on the tag relevance field of the browsing restriction tag folder. Further, the control unit 10c assigns the browsing restriction information to the tag ID stored in the tag relevance field of the browsing restriction tag information. Further, the control unit 10c assigns the browsing restriction information to the tag ID indicating the browsing restriction tag information among the tag IDs stored in the tag relevance fields of other tag information.

FIG. 13 illustrates a specific example. In this example, the tag folder indicated by the tag ID 10007 (that is, the tag folder 500a) is the browsing restriction tag folder. Thus, the control unit 10c assigns the browsing restriction information to the tag content field of the tag folder 500a. The browsing restriction information is indicated by a mark "N." Further, the control unit 10c causes the name of the user who gets a permission for browsing to be stored in the user field of the tag folder 500a. In this example, "Yano," "Suzuki," "oba," and "ohtani" are permitted for browsing.

Further, the tag information indicated by the tag IDs 10004 to 10006 (that is, the tag information 430a to 430c) is the browsing restriction tag information. In this regard, the control unit 10c assigns the browsing restriction information to the tag IDs stored in the tag relevance fields of the tag information 430a to 430c. The control unit 10c assigns the browsing restriction information to the tag IDs indicating the tag information 430a to 430c among the tag IDs stored in the tag relevance fields of other tag information (the tag information 400k to 400n).

Then, the control unit 10c outputs the updated tag relevance information to the communication unit 10b. The communication unit 10b transmits the tag relevance information to the tag management server 20 and the user terminals 40. The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Here, the control unit 40e causes the tag folder in which the browsing restriction information is stored in the tag content field to be displayed as the browsing restriction tag folder. For example, when the tag relevance information illustrated in FIG. 13 is assigned, the control unit 40e sets the tag folder 500a as the browsing restriction tag folder as illustrated in FIG. 27. Specifically, the control unit 40e causes a browsing restriction icon 540 to be displayed nearby the tag folder 500a.

Then, when the user taps the open designation icon 510 of the tag folder 500a, the control unit 40e determines whether or not the user is the user who gets a permission for browsing. Specifically, the control unit 40e acquires the user ID from the storage unit 40a, and determines whether or not the name corresponding to the user ID is stored in the user field of the tag folder 500a. When the name corresponding to the user ID is stored in the user field of the tag folder 500a, the control unit 40e determines the user to be the user who gets a permission for browsing. Otherwise, the control unit 40e determines the user not to get a permission for browsing.

Figure 29:
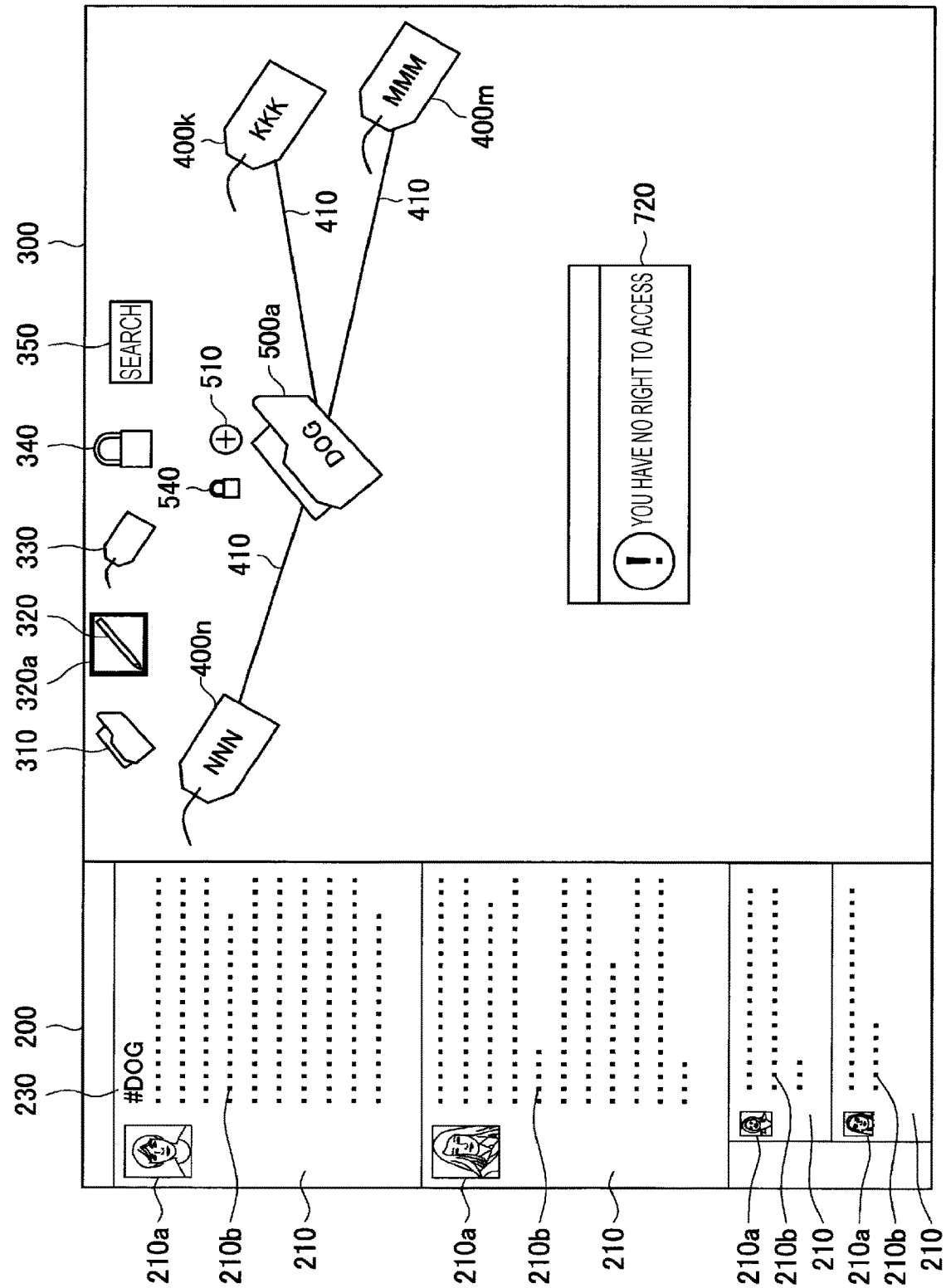
FIG. 29 is an explanatory diagram illustrating an example of a screen displayed on a user terminal.

For the user who gets a permission for browsing, the control unit 40e opens the tag folder 500a as illustrated in FIG. 28. The control unit 40e causes the connection information 410 connecting the browsing restriction tag information with other tag information to be displayed as well. On the other hand, for the user who does not get a permission for browsing, the control unit 40e does not open the tag folder 500a as illustrated in FIG. 29. Then, the control unit 40e causes a message window 720 indicating that the browsing is restricted to be displayed. As illustrated in FIG. 29, even for the user who does not get a permission for browsing, the control unit 40e causes the connection information 410 connecting the browsing restriction tag folder with the other tag information 400k to 400n to be displayed. Therefore, the user can recognize at least that the browsing restriction tag folder is associated with the other tag information 400k to 400n. As a result, when the user gets a permission for browsing later, the relevance between the browsing restriction tag information and other tag information can be easily understood.

The user can abolish the browsing restriction at an arbitrary timing. For example, the user holds down the browsing restriction tag folder. Accordingly, the control unit 40e generates maintenance request information indicating that the browsing restriction of the browsing restriction tag folder is requested to be abolished. Then, the control unit 40e outputs the maintenance request information to the communication unit 40d. The communication unit 40d transmits the maintenance request information to the tag processing server 10. The communication unit 10b of the tag processing server 10 receives the maintenance request information, and outputs the maintenance request information to the control unit 10c. The control unit 10c abolishes the browsing restriction of the browsing restriction tag folder based on the maintenance request information. Specifically, the control unit 10c deletes the browsing restriction information from the tag content field of the browsing restriction tag folder. The control unit 10c deletes the browsing restriction information from the tag relevance field of the browsing restriction tag information. Further, the control unit 10c deletes the browsing restriction information even from the tag relevance fields of other tag information. Then, the control unit 10c outputs the updated tag relevance information to the communication unit 10b. The communication unit 10b transmits the tag relevance information to the tag management server 20 and the user terminals 40. The tag management server 20 stores the tag relevance information. The communication unit 40d of the user terminal 40 receives the tag relevance information, and outputs the tag relevance information to the control unit 40e. The control unit 40e causes the tag information to be displayed based on the tag relevance information. Specifically, the control unit 40e returns the browsing restriction tag folder to a normal tag folder (without browsing restriction).

The information processing system 1 may receive a change in the user to whom a permission for browsing is given. In other words, when there is a predetermined operation (for example, an operation of tapping the browsing restriction tag folder twice or more), the control unit 40e may cause the message window 700 illustrated in FIG. 26 to be displayed. Thereafter, the information processing system 1 may change (reset) the user to whom a permission for browsing is given by performing the above-described process.

(1-6-5. Recommendation Process)

The tag processing server 10 causes a tag folder serving as a hierarchization candidate (hereinafter, also referred to as a "hierarchization candidate tag folder") to be displayed based on the tag relevance information. Specifically, the control unit 10c acquires the tag relevance information from the tag management server 20, and specifies a plurality of pieces of tag information associated with the same tag information based on the tag relevance information. Then, the control unit 10c creates the hierarchization candidate tag folder including the specified tag information.

Figure 31:
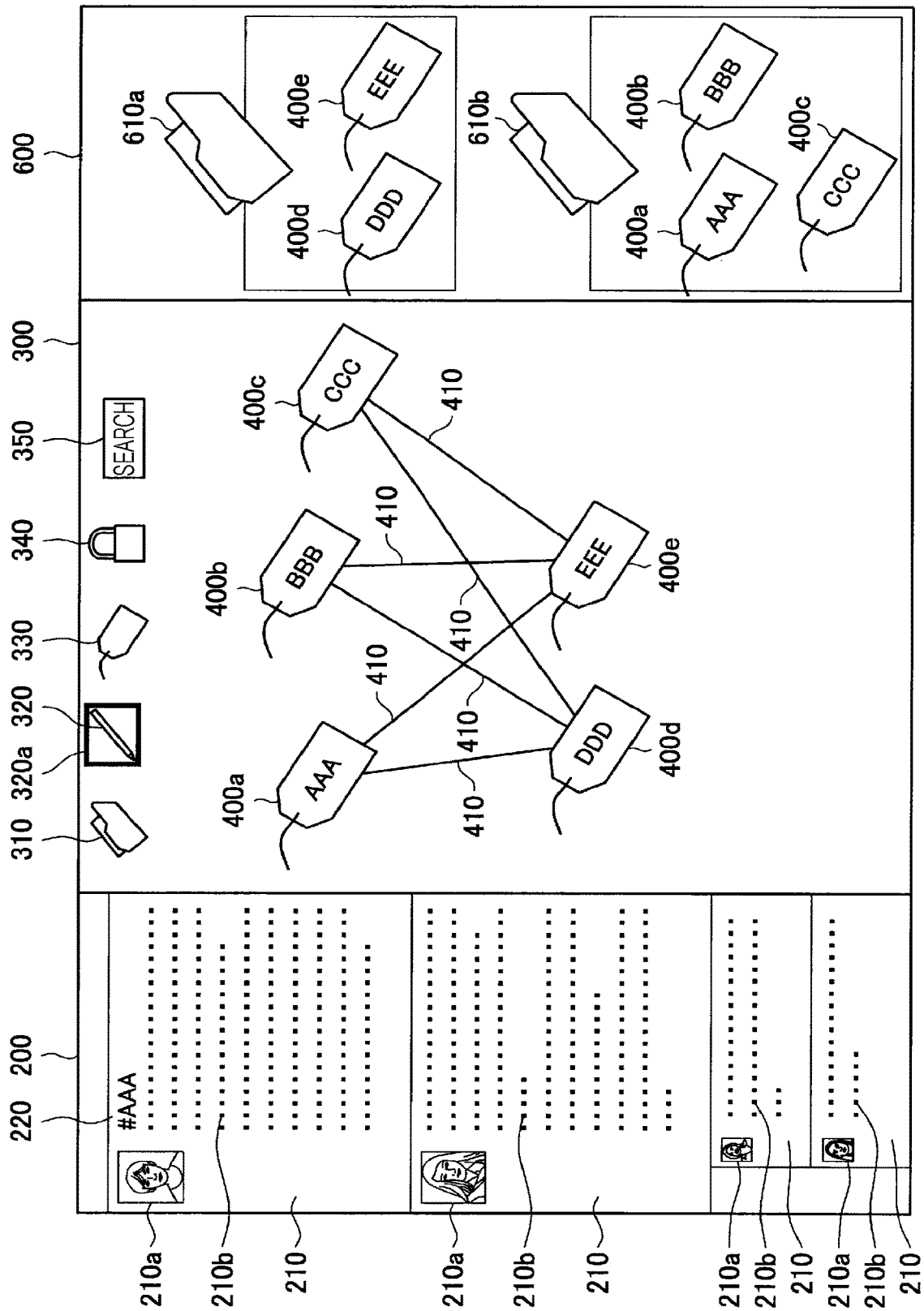
FIG. 31 is an explanatory diagram illustrating an example of a screen displayed on a user terminal.

FIG. 30 illustrates an example. In this example, a plurality of pieces of tag information 400a to 400c are associated with the same tag information 400d to 400e. Similarly, a plurality of pieces of tag information 400d to 400e are associated with the same tag information 400a to 400c. In this regard, the control unit 10c creates the hierarchization candidate tag folder 610a including a plurality of pieces of tag information 400d to 400e and the hierarchization candidate tag folder 610b including a plurality of pieces of tag information 400a to 400c as illustrated in FIG. 31.

Then, the control unit 10c outputs hierarchization candidate information associated with the hierarchization candidate tag folder to the communication unit 10b. The communication unit 10b transmits the hierarchization candidate information to the user terminals 40. The communication unit 40d of the user terminal 40 receives the hierarchization candidate information, and outputs the hierarchization candidate information to the control unit 40e. The control unit 40e sets the recommendation area 600 in the tag relevance information display area 300, and causes the hierarchization candidate tag folder to be displayed in the recommendation area 600 as illustrated in FIG. 31. The control unit 40e causes the tag information in the hierarchization candidate tag folder to be displayed as well when the hierarchization candidate tag folder is displayed. For example, the control unit 40e causes the hierarchization candidate tag folders 610a and 610b to be displayed in the recommendation area 600. Further, the control unit 40e causes the tag information 400d to 400e in the hierarchization candidate tag folder 610a to be displayed nearby the hierarchization candidate tag folder 610a. Further, the control unit 40e causes the tag information 400a to 400c in the hierarchization candidate tag folder 610b to be displayed nearby the hierarchization candidate tag folder 610b.

Then, the user taps any one hierarchization candidate tag folder and selects the hierarchization candidate tag folder. Further, the user inputs a name of the hierarchization candidate tag folder (the tag information of the tag folder itself). Accordingly, the control unit 40e generates maintenance request information indicating that the hierarchization candidate tag folder designated by the user is used as a formal tag folder. The maintenance request information indicates the hierarchization candidate tag folder designated by the user and the name. The maintenance request information includes the user ID. The control unit 40e outputs the maintenance request information to the communication unit 40d. The communication unit 40d transmits the maintenance request information to the tag processing server 10. The communication unit 10b of the tag processing server 10 receives the maintenance request information, and outputs the maintenance request information to the control unit 10c.

The control unit 10c acquires the tag relevance information from the tag management server 20. Then, a new line is added to the tag relevance information, and information related to the hierarchization candidate tag folder is stored in this line. Specifically, the control unit 10c causes a newly created tag ID to be stored in the tag ID field. The control unit 10c extracts the user ID from the maintenance request information, and acquires the name information corresponding to the user ID from the tag management server 20. Then, the control unit 10c causes the name information to be stored in the creator field and the user field. The control unit 10c specifies the tag information associated with the tag information included in the hierarchization candidate tag folder. Then, the control unit 10c causes the tag ID indicating the specified tag information to be stored in the relevance field. The control unit 10c causes the display coordinates that do not overlap the display coordinates of the other tag information to be stored in the coordinates field. The control unit 10c causes the layer field to be blank. Further, the control unit 10c specifies the tag information included in the hierarchization candidate tag folder, and causes the tag ID of the hierarchization candidate tag folder to be stored in the layer field of the tag information. As a result, the control unit 10c recognizes the hierarchization candidate tag folder as a formal tag folder, and registers the hierarchization candidate tag folder in the tag relevance information.

Figure 32:
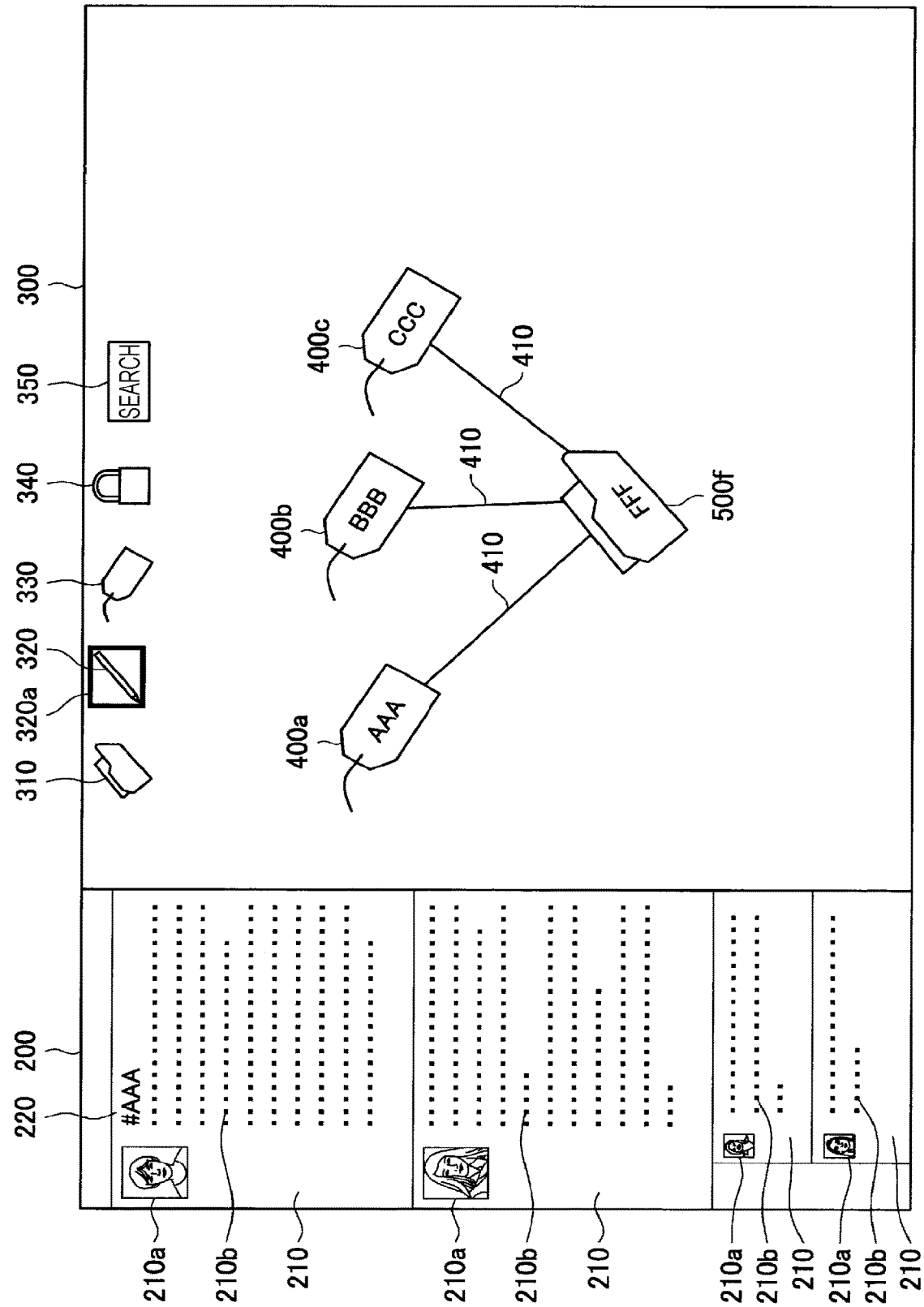
FIG. 32 is an explanatory diagram illustrating an example of a screen displayed on a user terminal.

Then, the control unit 10c outputs the updated tag relevance information to the communication unit 10b. The communication unit 10b transmits the tag relevance information to the tag management server 20 and the user terminals 40. The tag management server 20 stores the tag relevance information. The communication unit 40d of the user terminal 40 receives the tag relevance information, and outputs the tag relevance information to the control unit 40e. The control unit 40e causes the tag information to be displayed in the tag relevance information display area 300 based on the tag relevance information. FIG. 32 illustrates a specific example. In this example, the user selects the hierarchization candidate tag folder 610a, and a name thereof is "FFF." Therefore, the control unit 40e causes the tag folder 500f corresponding to the hierarchization candidate tag folder 610a to be displayed in the tag relevance information display area 300. The information processing system 1 may automatically select any one hierarchization candidate folder as a formal tag folder. For example, the information processing system 1 may automatically select a folder that is smallest (or largest) in the tag information included in the hierarchization candidate tag folder as a formal tag folder. In the information processing system 1, the hierarchization candidate tag folder may be displayed one by one, and a message window in which character information such as "Do you want to hierarchize?" is written may be displayed for each folder. A "YES" button and a "NO" button are displayed on the message window. In the information processing system 1, the hierarchization candidate tag folder may be selected as the formal tag folder when the user taps the "YES" button. Through this process, in the information processing system 1, a highly accurate recommendation can be given.

1-7. Search Process

Figure 9:
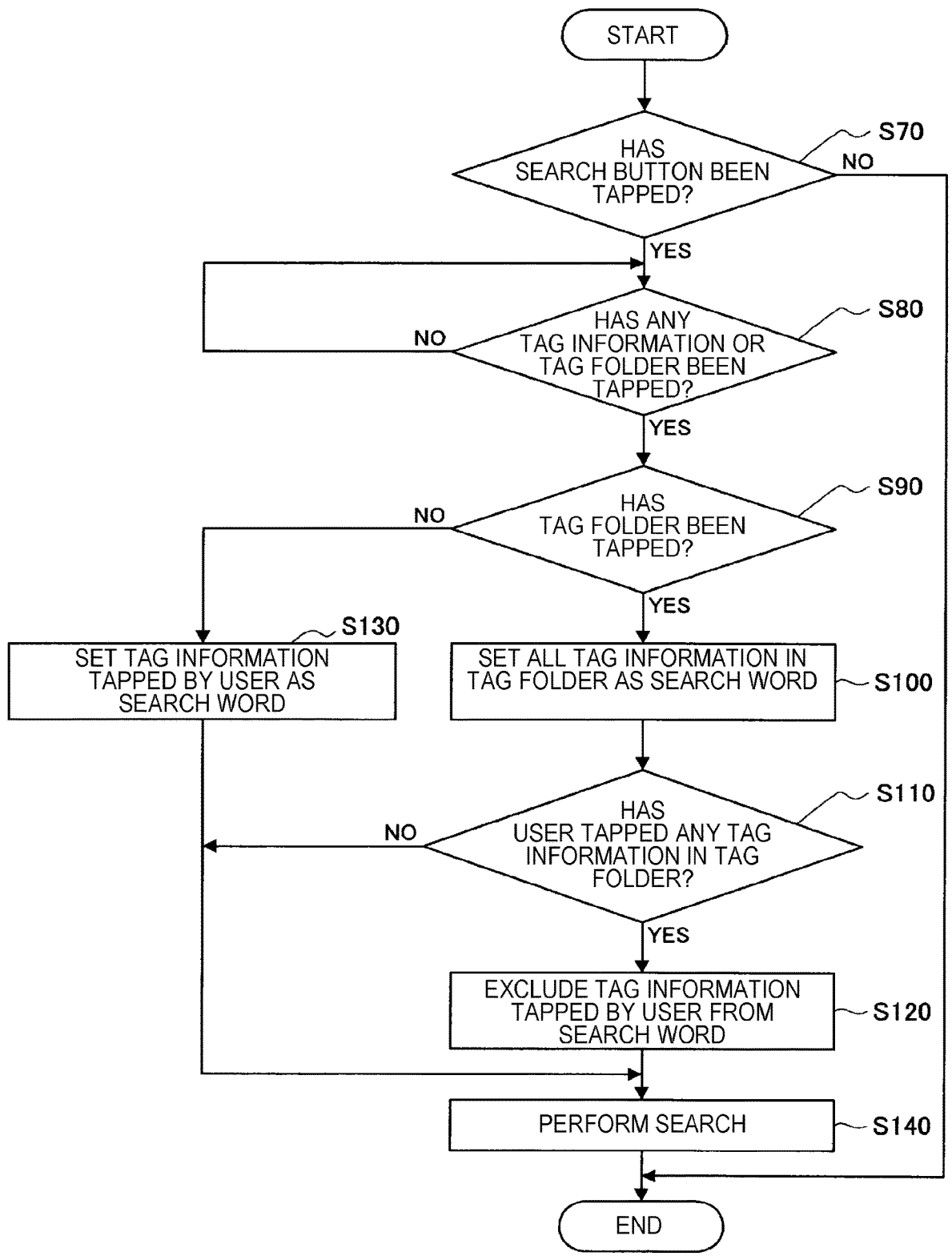
FIG. 9 is a flowchart illustrating a procedure of a process performed in an information processing system.
Figure 33:
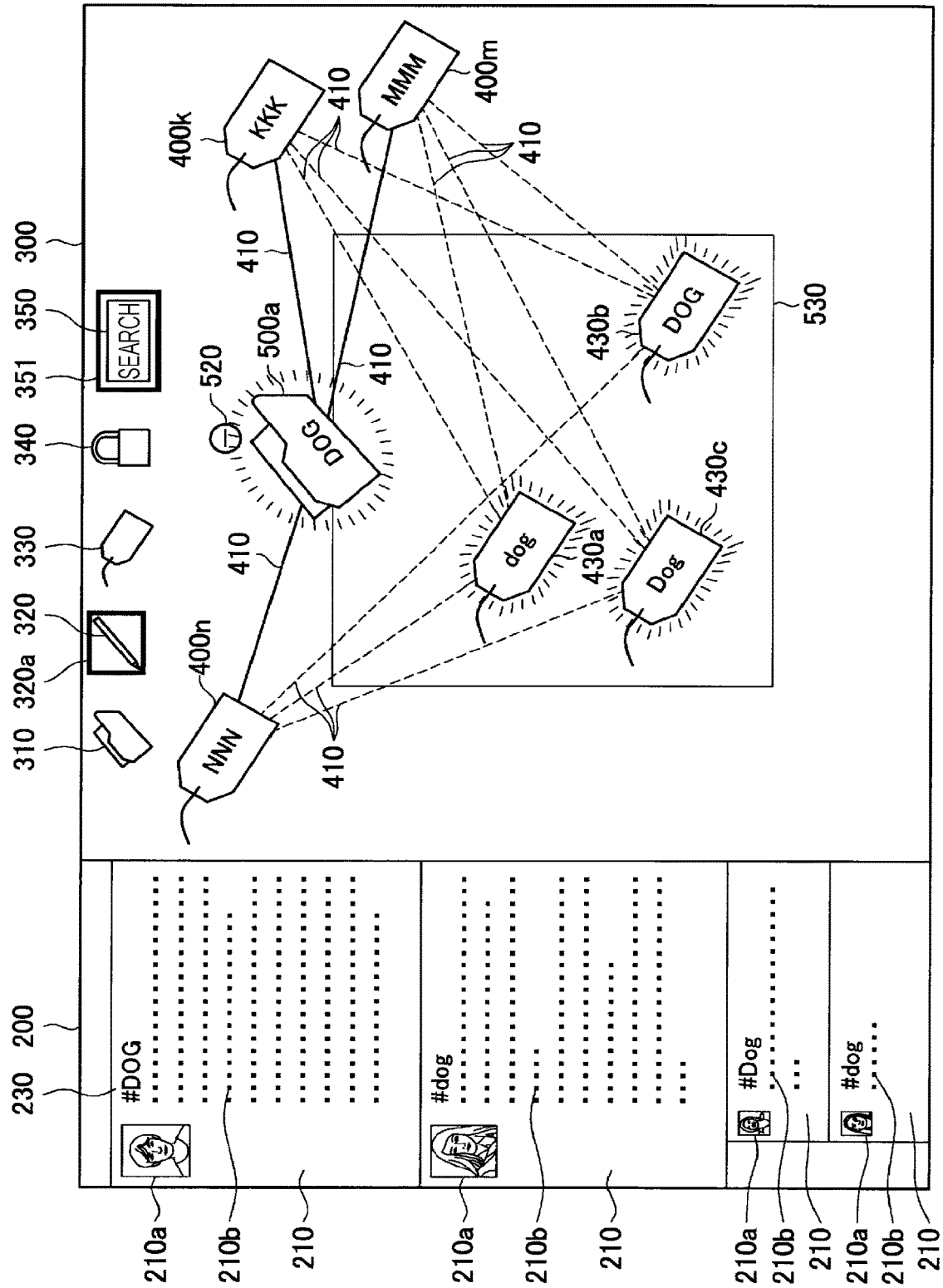
FIG. 33 is an explanatory diagram illustrating an example of a screen displayed on a user terminal.

In the information processing system 1, the efficient search process can be performed based on the tag relevance information that is generated and updated through the tag relevance information generation process and the maintenance process. The search process is performed for each user terminal 40. In other words, a result of performing the search process through the user using the user terminal 40 is not reflected in the other user terminals 40. Of course, the result of performing the search process through the user using the user terminal 40 may be reflected in the other user terminals 40. Content of the search process will be described below with reference to a flowchart illustrated in FIG. 9. Here, the search process will be described under the assumption that the tag information 430a to 430c and 400k to 400n and the tag folder 500a illustrated in FIG. 33 are displayed in the tag relevance information display area 300. At the time of the search process, the maintenance icons 310 to 340 may be erased.

In step S10, the control unit 40e of the user terminal 40 determines whether or not the user has tapped the search button 350. The control unit 40e causes the process to proceed to step S80 when the user is determined to have tapped the search button 350 and end the present process when the user is determined not to have tapped the search button 350.

In step S80, the control unit 40e causes the search button 350 to be highlighted. For example, the control unit 40e causes the search button 350 to be surrounded by a frame image 351 as illustrated in FIG. 33. Of course, the highlighting method is not limited to this example. As another example of highlighting the search button 350, there are a process of drawing the search button 350 with a heavy line, a process of blinking the search button 350, and a process of enlarging and displaying the search button 350. As another example, there is a process of displaying the search button 350 in a different color from that in a normal state (a non-tapped state).

Then, the control unit 40e is on standby until the user taps any tag information or the tag folder. When the user taps any tag information or the tag folder, the control unit 40e causes the process to proceed to step S90.

In step S90, the control unit 40e determines whether or not the tag folder has been tapped in step S80. The control unit 40e causes the process to proceed to step S100 when the tag folder has been tapped in step S80 and causes the process to proceed to step S130 when the tag information has been tapped in step S80.

In step S100, the control unit 40e sets the tag folder and all the tag information in the tag folder as the search word, and highlights the tag folder and all the tag information in the tag folder. For example, when the tag folder 500a illustrated in FIG. 33 has been tapped, the control unit 40e sets the tag folder 500a and all the tag information 430a to 430c in the tag folder 500a as the search word. Then, the control unit 40e highlights the tag folder 500a and the tag information 430a to 430c. In FIG. 33, the tag folder 500a and the tag information 430a to 430c are displayed to blink. Of course, the highlighting method is not limited to this example. As another example of highlighting the tag information or the like, there are a process of enlarging and displaying the tag information or the like, a process of displaying the tag information or the like in a different color from that in a normal state (a state in which it is not a search word), and a process of drawing the tag information or the like with a heavy line. The control unit 40e causes the tag information and the tag folder serving as the search word to be displayed near the center of the tag relevance information display area 300. When there is tag information having the same content as the tag folder, the tag information may be also displayed near the center of the tag relevance information display area 300.

In step S110, the control unit 40e determines whether or not the user has tapped any tag information in the tag folder. The control unit 40e causes the process to proceed to step S120 when the user has tapped any tag information in the tag folder and causes the process to proceed to step S140 when the user has not tapped any tag information in the tag folder.

Figure 34:
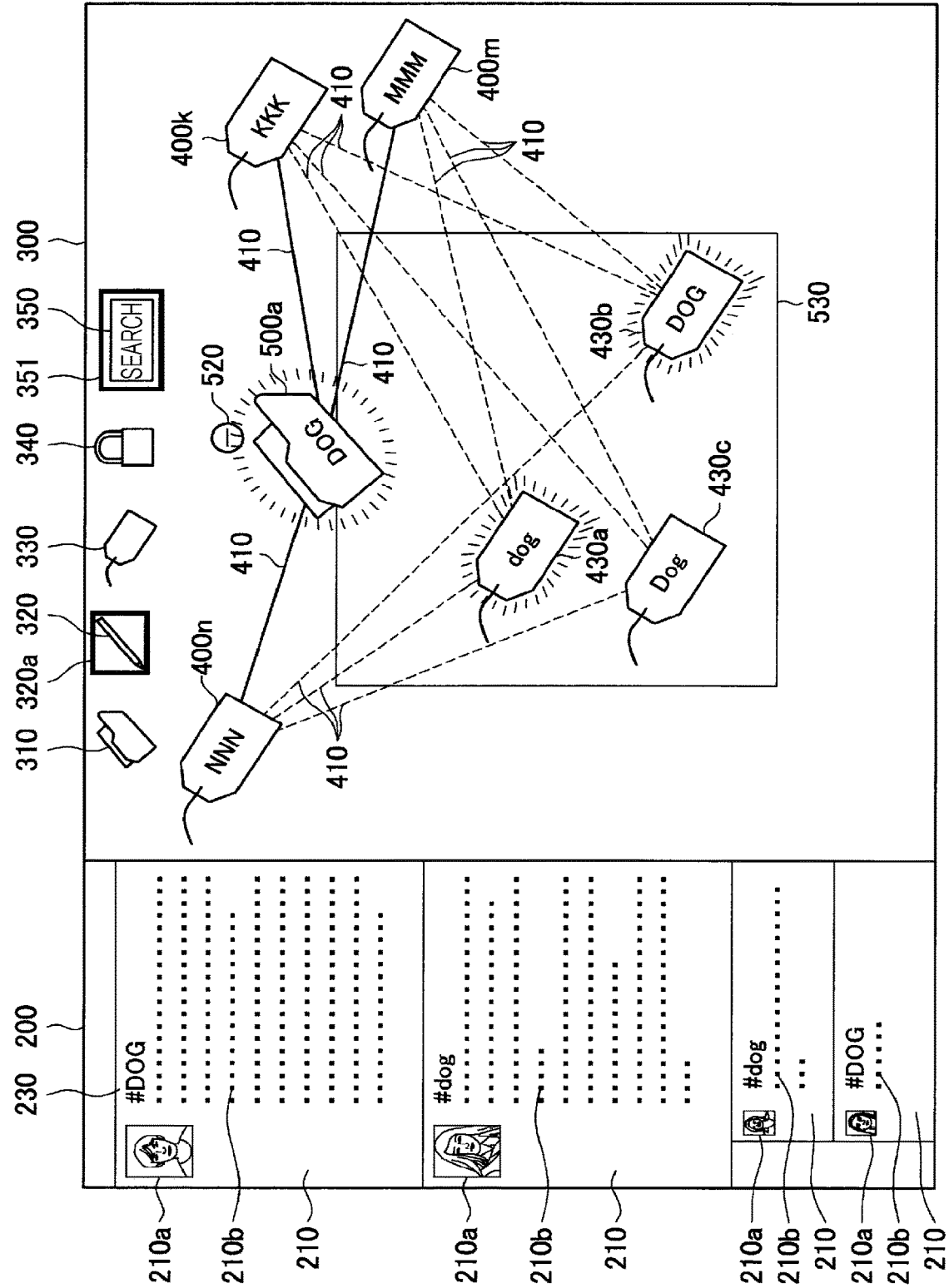
FIG. 34 is an explanatory diagram illustrating an example of a screen displayed on a user terminal.

In step S120, the control unit 40e excludes the tag information tapped by the user from the search word, and stops the tag information from being highlighted. For example, when the user has tapped the tag information 430c illustrated in FIG. 33, the control unit 40e excludes the tag information 430c from the search word. Further, the control unit 40e stops the tag information 430c from being highlighted as illustrated in FIG. 34. Thereafter, the control unit 40e causes the process to proceed to step S140.

In step S140, the control unit 40e generates search request information including the search word, and outputs the search request information to the communication unit 40d. Then, the communication unit 40d transmits the search request information to the tag processing server 10. The communication unit 10b of the tag processing server 10 receives the search request information, and outputs the search request information to the control unit 10c. The control unit 10c specifies the search word based on the search request information. Then, the control unit 10c acquires the SNS information including the tag information as the search word from the SNS information in the tag management server 20. Then, the control unit 10c outputs the acquired SNS information to the communication unit 10b. The communication unit 10b transmits the SNS information to the user terminal 40 that has made the search request. The communication unit 40d of the user terminal 40 receives the SNS information, and outputs the SNS information to the control unit 40e. The control unit 40e causes the SNS information to be displayed in the SNS display area 200. FIGS. 33 and 34 illustrate display examples. In the example illustrated in FIG. 33, since the tag folder 500a and the tag information 430a to 430c are set as the search word, the SNS information including the tag information as the search word is displayed in the SNS display area. In the example illustrated in FIG. 34, since the tag folder 500a and the tag information 430a to 430b are set as the search word, the SNS information including the tag information as the search word is displayed in the SNS display area. Thereafter, the information processing system 1 ends the present process.

1-8. Other Processes

(1-8-1. Tag Creation Using Maintenance Icon)

Next, other processes will be described. First, the tag creation using the maintenance icon 330 will be described. In the above-described process, in the information processing system 1, when the user inputs the object information including the tag information to the user terminal 40, the tag information is displayed in the tag relevance information display area 300. However, the user may directly create the tag information using the maintenance icon 330 instead of inputting the object information.

Specifically, the user taps the maintenance icon 330 illustrated in FIG. 14. Accordingly, the control unit 40e causes a message window indicating that the name of the tag information is requested to be input to be displayed. Accordingly, the user inputs the name of the tag information. Then, the control unit 40e creates maintenance request information indicating that the tag information is requested to be created, and outputs the maintenance request information to the communication unit 40d. The name of the tag information and the user ID are included in the maintenance request information. The communication unit 40d transmits the maintenance request information to the tag processing server 10. The communication unit 10b of the tag processing server 10 receives the maintenance request information, and outputs the maintenance request information to the control unit 10c. The control unit 10c performs the same process as the tag relevance information generation process, and registers the tag information in the tag relevance information. Then, the control unit 10c outputs the updated tag relevance information to the communication unit 10b. The communication unit 10b transmits the tag relevance information to the tag management server 20 and the user terminals 40. The tag management server 20 stores the tag relevance information. The communication unit 40d of the user terminal 40 receives the tag relevance information, and outputs the tag relevance information to the control unit 40e. The control unit 40e causes the tag information to be displayed in the tag relevance information display area 300 based on the tag relevance information. Therefore, the tag information input by the user is included in the tag relevance information display area 300. The tag information may not be associated with the object information in the SNS display area 200.

(1-8-2. Maintenance-Specialized User)

One of a plurality of user terminals 40 may be the user terminal 40 that is specialized in the maintenance. A user who uses such a user terminal 40 is a maintenance-specialized user. The tag processing server 10 may transmit only the tag relevance information to the user terminal 40 without transmitting the SNS information. Therefore, only the tag relevance information display area 300 and the recommendation area 600 are displayed on the maintenance-specialized user terminal 40. The maintenance-specialized user performs the maintenance process based on information displayed in the areas.

2. Second Embodiment

2-1. Overall Configuration

Figure 35:
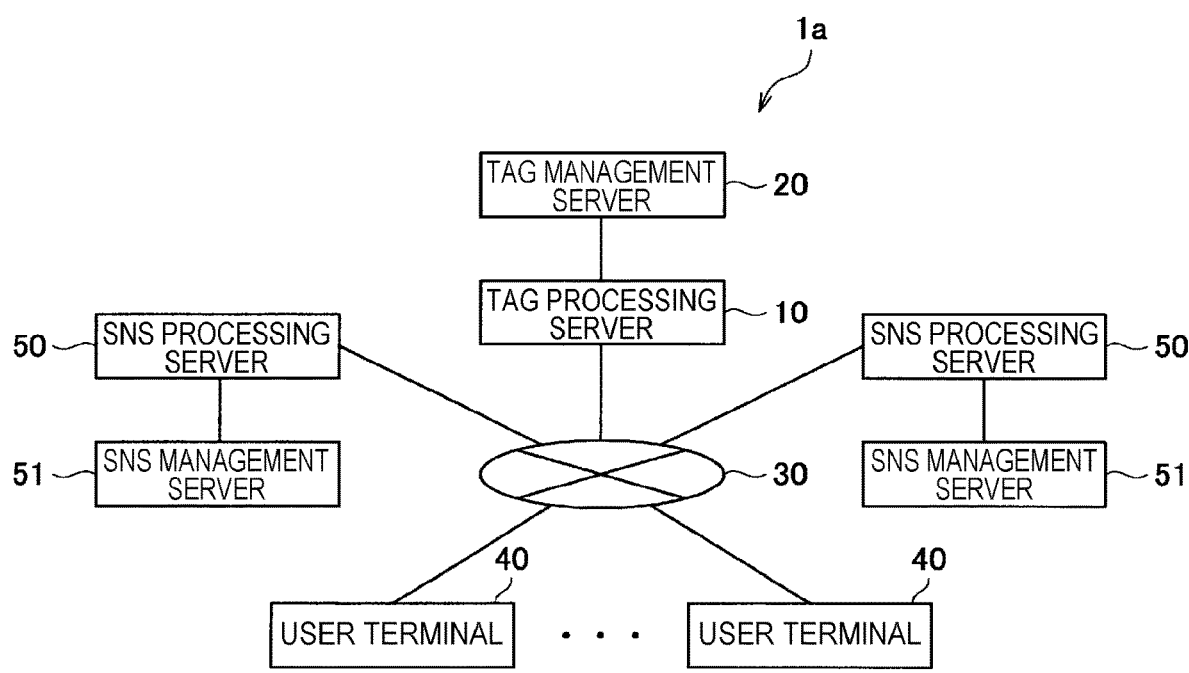
FIG. 35 is a block diagram illustrating an overall configuration of an information processing system according to a second embodiment of the present disclosure.

First, an overall configuration of an information processing system 1a according to second embodiment will be described with reference to FIG. 35. In the information processing system 1a, an SNS processing server 50 and an SNS management server 51 are added to the information processing system 1 according to the first embodiment. The SNS processing server 50 is connected to the network 30, and the SNS management server 51 is connected to the SNS processing server 50. The SNS processing server 50 is a server that provides an SNS. In the second embodiment, an SNS is assumed to be used by a wider range of users than in the first embodiment. Of course, the second embodiment may be applied to other forms of SNSs.

2-2. Configuration of SNS Processing Server

Figure 36:
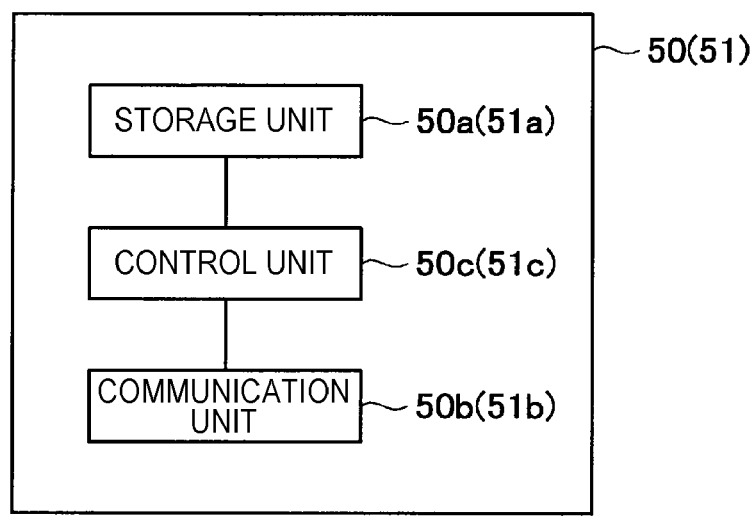
FIG. 36 is a block diagram illustrating an example of an SNS processing server and an SNS management server.
Figure 37:
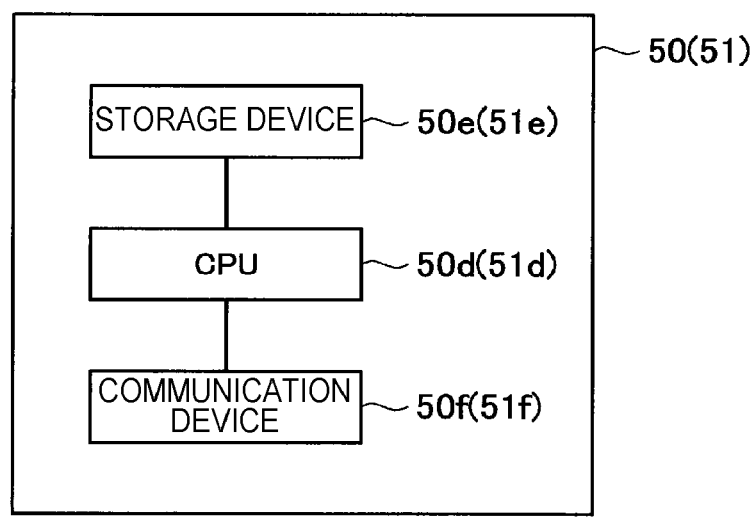
FIG. 37 is a hardware configuration diagram illustrating an example of an SNS processing server and an SNS management server.

Next, a configuration of the SNS processing server 50 will be described with reference to FIGS. 36 and 37. The SNS processing server 50 performs a process of performs the maintenance of the tag information in addition to the process of providing the SNS to the user terminals 40.

The SNS processing server 50 includes a storage unit 50a, a communication unit 50b, and a control unit 50c. The storage unit 50a stores a program necessary for a process performed by the SNS processing server 50. As such a program, for example, there is a program causing the SNS processing server 50 to implement the storage unit 50a, the communication unit 50b, and the control unit 50c. Such a program includes an SNS execution program for performing the SNS.

The communication unit 50b performs communication with the user terminal 40, the tag processing server 10, and the SNS management server 51. The control unit 50c controls the respective units of the SNS processing server 50, and performs, for example, the following process. In other words, the control unit 50c transmits the SNS information to the user terminals 40, the tag processing server 10, and the SNS management server 51. The user terminal 40 displays the SNS information. As a result, the object information posted by the user is shared with other users. In other words, the SNS is provided. The tag processing server 10 generates the personal tag relevance information and global tag relevance information based on the SNS information. The details will be described later. The SNS management server 51 stores the SNS information.

The SNS processing server 50 includes a CPU 50d, a storage device 50e, and a communication device 50f as a hardware configuration. The SNS processing server 50 implements the storage unit 50a, the communication unit 50b, and the control unit 50c through the hardware configuration. The hardware configuration is implemented through an electronic circuit or the like.

The CPU 50d reads and executes a program stored in the storage device 50e. Therefore, the CPU 50d is a substantial main operation entity of the SNS processing server 50. The storage device 50e is configured with a ROM, a RAM, a hard disk, a non-volatile memory, or the like. The storage device 50e stores a program causing the SNS processing server 50 to implement the storage unit 50a, the communication unit 50b, and the control unit 50c. The communication device 50f performs communication with the user terminals 40 the tag processing server 10, and the SNS management server 51.

2-3. Configuration of SNS Management Server

Next, a configuration of the SNS management server 51 will be described with reference to FIGS. 36 and 37. The SNS management server 51 performs, for example, a process of managing (storing) the SNS information.

The SNS management server 51 includes a storage unit 50a, a communication unit 50b, and a control unit 50c. The storage unit 50a stores a program necessary for a process performed by the SNS management server 51. As such a program, for example, there is a program causing the SNS management server 51 to implement the storage unit 50*a*, the communication unit 50*b*, and the control unit 50*c*. The storage unit 50*a* stores the SNS information and the tag relevance information. The storage unit 50*a* stores the face image information and the name information of the user and the user ID to be associated. The communication unit 50*b* performs communication with the SNS management server 51. The control unit 50*c* controls the respective units of the SNS management server 51, and performs, for example, the following process. In other words, the control unit 20*c* causes the SNS information transmitted from the SNS processing server 50 to be stored in the storage device 50*e*. The control unit 50*c* acquires the SNS information from the storage device 50*e*, and transmits the SNS information to the SNS processing server 50.

The SNS management server 51 includes a CPU 50*d*, a storage device 50*e*, and a communication device 50*f* as a hardware configuration. The SNS management server 51 implements the storage unit 50*a*, the communication unit 50*b*, and the control unit 50*c* through the hardware configuration. The hardware configuration is implemented through an electronic circuit or the like.

The CPU 50*d* reads and executes a program stored in the storage device 50*e*. Therefore, the CPU 50*d* is a substantial main operation entity of the SNS management server 51. The storage device 50*e* is configured with a ROM, a RAM, a hard disk, a non-volatile memory, or the like. The storage device 50*e* stores a program causing the SNS management server 51 to implement the storage unit 50*a*, the communication unit 50*b*, and the control unit 50*c*. The communication device 50*f* performs communication with the SNS processing server 50.

2-4. Configuration of Tag Processing Server

Next, a configuration of the tag processing server 10 will be described with reference to FIGS. 2 and 3. The tag processing server 10 has substantially the same configuration as in the first embodiment. The tag processing server 10 performs, for example, the process of performing the maintenance of the tag information.

The tag processing server 10 includes a storage unit 10*a*, a communication unit 10*b*, and a control unit 10*c*. The storage unit 10*a* stores a program necessary for a process performed by the tag processing server 10. As such a program, for example, there is a program causing the tag processing server 10 to implement the storage unit 10*a*, the communication unit 10*b*, and the control unit 10*c*. Such a program is roughly divided into a personal tag management execution program and a global tag management execution program. The personal tag management execution program is a program that manages (including the maintenance) the tag information according to each user and generates personal tag relevance information. The global tag management execution program is a program that aggregates the personal tag relevance information and generates global tag relevance information.

Figure 38:
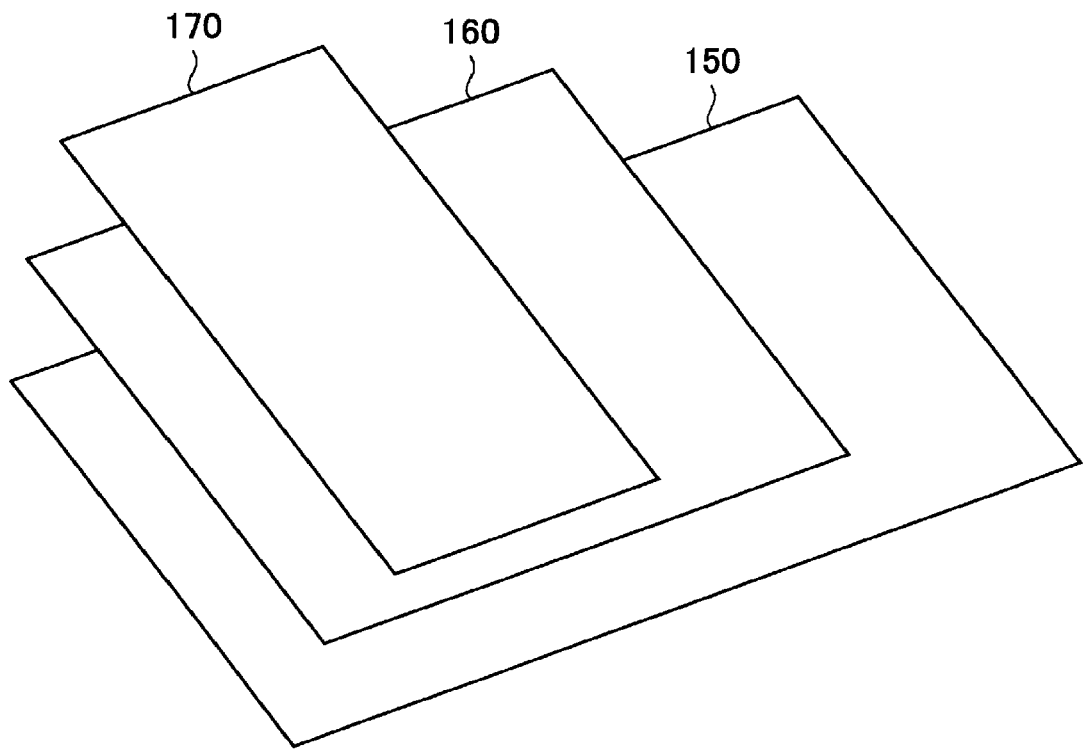
FIG. 38 is an explanatory diagram illustrating an example of a hierarchical structure of a program (software) according to the second embodiment.

FIG. 38 illustrates an example of a hierarchical structure of the programs. As illustrated in FIG. 38, a global tag management execution program layer 150 exists on the bottom layer, and a personal tag management execution program layer 160 exists on the global tag management execution program layer 150. An SNS execution program layer 170 exists on the personal tag management execution program layer 160. The hierarchical structure according to the second embodiment is not limited to this example.

The communication unit 10*b* performs communication with the user terminal 40, the SNS processing server 50 and the SNS management server 51. The control unit 10*c* controls the respective units of the tag processing server 10 and performs, for example, the following process. In other words, the control unit 10*c* acquires the SNS information from the SNS processing server 50, and acquires the tag information from the SNS information. Then, the control unit 10*c* performs the process of registering the tag information in the personal tag relevance information.

Here, the personal tag relevance information is the same as the tag information according to the first embodiment, but in the second embodiment, the control unit 10*c* generates the personal tag relevance information for each user. The control unit 10*c* performs various kinds of maintenance processes related to the tag information. Specific content of the maintenance process is the same as in the first embodiment, but in the second embodiment, the control unit 10*c* performs the maintenance process based on the personal tag relevance information. In other words, the control unit 10*c* performs the maintenance process for each user. Further, the control unit 10*c* aggregates the personal tag relevance information and generates the global tag relevance information. The control unit 10*c* causes the personal tag relevance information and the global tag relevance information to be stored in the tag management server 20.

The tag processing server 10 includes a CPU 10*d*, a storage device 10*e*, and a communication device 10*f* as a hardware configuration. The tag processing server 10 implements the storage unit 10*a*, the communication unit 10*b*, and the control unit 10*c* through the hardware configuration. The hardware configuration is implemented through an electronic circuit or the like.

The CPU 10*d* reads and executes a program stored in the storage device 10*e*. Therefore, the CPU 10*d* is a substantial main operation entity of the tag processing server 10. The storage device 10*e* is configured with a ROM, a RAM, a hard disk, a non-volatile memory, or the like. The storage device 10*e* stores a program causing the tag processing server 10 to implement the storage unit 10*a*, the communication unit 10*b*, and the control unit 10*c*. The communication device 10*f* performs communication with the user terminal 40, the tag management server 20, and the SNS processing server 50.

1-3. Configuration of Tag Management Server

Next, a configuration of the tag management server 20 will be described with reference to FIGS. 2 and 3. The tag management server 20 has substantially the same configuration as in the first embodiment. The tag management server 20 performs, for example, the process of managing (storing) the personal tag relevance information and the global tag relevance information.

The tag management server 20 includes a storage unit 20*a*, a communication unit 20*b*, and a control unit 20*c*. The storage unit 20*a* stores a program necessary for a process performed by the tag management server 20. As such a program, for example, there is a program causing the tag management server 20 to implement the storage unit 20*a*, the communication unit 20*b*, and the control unit 20*c*. The storage unit 20*a* stores the tag relevance information. The storage unit 20*a* stores the face image information and the name information of the user and the user ID to be associated. The communication unit 20*b* performs communication with the tag management server 20. The control unit 20c controls the respective units of the tag management server 20, and performs, for example, the following process. In other words, the control unit 20c causes the personal tag relevance information and the global tag relevance information transmitted from the tag processing server 10 to be stored in the storage device 20e. The control unit 20c acquires the personal tag relevance information and the global tag relevance information from the storage device 20e, and transmits the personal tag relevance information and the global tag relevance information to the tag processing server 10.

The tag management server 20 includes a CPU 20d, a storage device 20e, and a communication device 20f as a hardware configuration. The tag management server 20 implements the storage unit 20a, the communication unit 20b, and the control unit 20c through the hardware configuration. The hardware configuration is implemented through an electronic circuit or the like.

The CPU 20d reads and executes a program stored in the storage device 20e. Therefore, the CPU 20d is a substantial main operation entity of the tag management server 20. The storage device 20e is configured with a ROM, a RAM, a hard disk, a non-volatile memory, or the like. The storage device 20e stores a program causing the tag management server 20 to implement the storage unit 20a, the communication unit 20b, and the control unit 20c. The communication device 20f performs communication with the tag processing server 10.

1-4. Configuration of User Terminal

Next, a configuration of the user terminal 40 will be described with reference to FIGS. 4 and 5. The user terminal 40 has substantially the same configuration as the first embodiment. The user terminal 40 is a terminal in which an input operation is performed by the user of the SNS. In the second embodiment, the user terminal 40 is assumed to be a tablet type terminal (a smart phone, a smart tablet, or the like). Of course, the user terminal 40 is not limited to a tablet type terminal.

The user terminal 40 includes a storage unit 40a, an input unit 40b, a display unit 40c, a communication unit 40d, and a control unit 40e. The storage unit 40a stores a program necessary for a process performed by the user terminal 40 and various kinds of information. For example, the storage unit 40a stores a program causing the user terminal 40 to implement the storage unit 40a, the input unit 40b, the display unit 40c, the communication unit 40d, and the control unit 40e as the program. The storage unit 40a stores the user ID for identifying the user who uses the user terminal.

Figure 47:
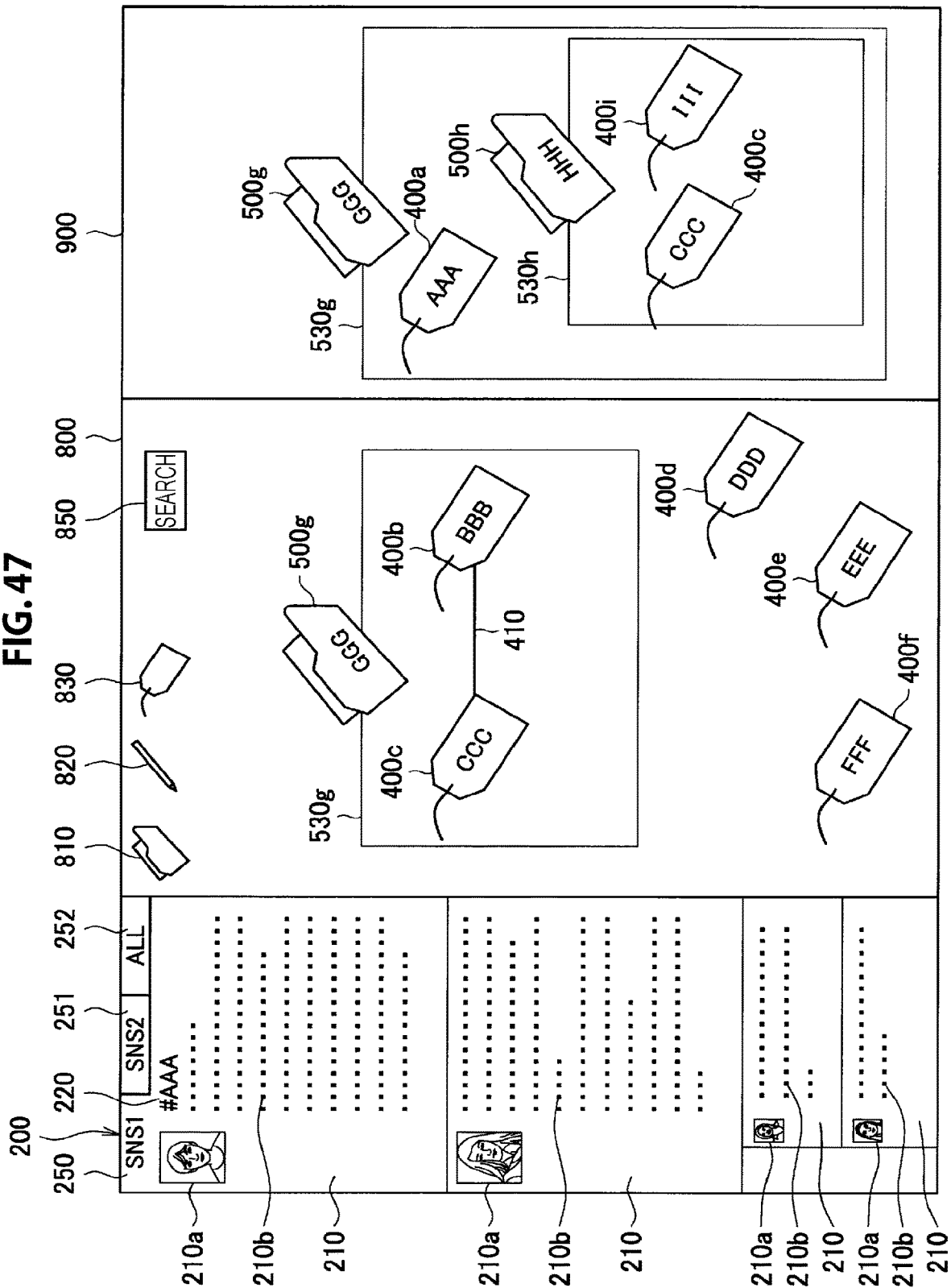
FIG. 47 is an explanatory diagram illustrating an example of a screen displayed on a user terminal.

The input unit 40b receives various kinds of input operations performed by the user and is, for example, a touch panel. The display unit 40c displays various kinds of images. A display area of the display unit 40c is divided into, for example, an SNS display area 200, a personal tag relevance information display area 800, and a global tag relevance information display area 900, as illustrated in FIG. 47.

The SNS information assigned by the SNS processing server 50 is displayed in the SNS display area 200. When the search process is performed, the SNS information including the search word is displayed in the SNS display area 200. Further, only the SNS information (for example, the SNS information of a specific user) designated by the user may be displayed in the SNS display area 200. The SNS display area 200 has a tab browser form. In other words, tabs 250, 251, and 252 are displayed in the SNS display area 200. The tabs 250 and 251 correspond to different SNSs. When the user taps one of the tabs 250 and 251, the control unit 40e causes an SNS corresponding to the tab to be displayed. When the user taps the tab 252, the control unit 40e causes all SNSs acquired by the user terminal 40 to be displayed.

Content of the personal tag relevance information is displayed in the personal tag relevance information display area 800. In other words, the relevance between the tag information is displayed for each user. Specific display content of the personal tag relevance information display area 800 is the same as the tag relevance information display area 300 according to the first embodiment. Further, maintenance icons 810 to 830 and the search button 850 are also displayed in the personal tag relevance information display area 800. Such functions are the same as the maintenance icons 310 to 330 and the search button 350 according to the first embodiment. In the second embodiment, an icon corresponding to the maintenance icon 340 is not displayed. It is because in the second embodiment, since the maintenance target is the personal tag relevance information for each user, it is unnecessary to restrict browsing of the tag information. Further, a case in which the user does not reflect, for example, his/her personal tag relevance information in the global tag relevance information is also assumed. In this case, an icon corresponding to the maintenance icon 340 may be prepared. The information processing system 1a may perform the same process as the browsing restriction setting process. The tag folder that is accordingly subject to the browsing restriction may be ignored when tag aggregation information is generated. Content of the global tag relevance information is displayed in the global tag relevance information display area 900. In other words, a result of aggregating the relevance between the tag information is displayed. Specific display content of the global tag relevance information display area 900 is the same as that of the tag relevance information display area 300 according to the first embodiment. The tag information may be shared through a plurality of SNSs.

The communication unit 40d performs communication with the tag processing server 10 and the SNS processing server 50. The control unit 40e controls the respective units of the user terminal 40, and performs a process of transmitting various kinds of information to the tag processing server 10 and a process of causing information assigned by the tag processing server 10 and the SNS processing server 50 to be displayed on the display unit 40c.

As illustrated in FIG. 5, the user terminal 40 includes a CPU 40f, a storage device 40g, a touch panel 40h, a display 40i, and a communication device 40j as a hardware configuration. The user terminal 40 implements the storage unit 40a, the input unit 40b, the display unit 40c, the communication unit 40d, and the control unit 40e through the hardware configuration. The hardware configuration is implemented through an electronic circuit or the like.

The CPU 40f reads and executes a program stored in the storage device 40g. Therefore, the CPU 40f is substantially the main operation entity of the user terminal 40. The storage device 40g is configured with a ROM, a RAM, a non-volatile memory, or the like. The storage device 40g stores a program causing the user terminal 40 to implement the storage unit 40a, the input unit 40b, the display unit 40c, the communication unit 40d, and the control unit 40e and various kinds of information. The storage device 40g is also used as a work area by the CPU 40f. The touch panel 40h is installed on the surface of the display 40i and receives an input operation performed by the user. The display 40i displays various kinds of information such as the SNS information and the tag information. In other words, the display area of the display 40*i* is divided into at least the SNS display area 200, the personal tag relevance information display area 800, and the global tag relevance information display area 900, and the above-described information is displayed in each area. The communication device 40*j* performs communication with the tag processing server 10 and the SNS processing server 50.

2-7. Tag Relevance Information Creation Process

Figure 39:
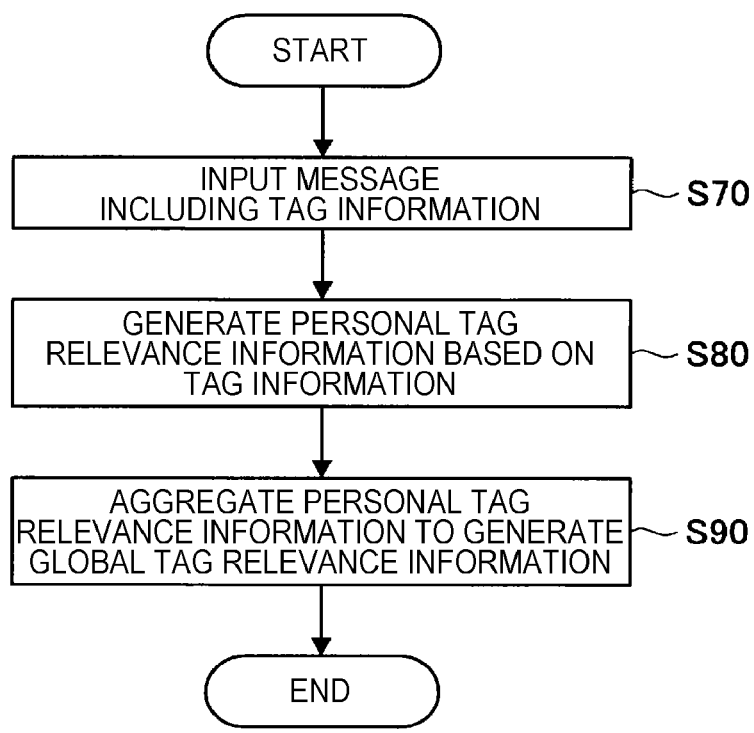
FIG. 39 is a flowchart illustrating a procedure of a process performed in an information processing system.

Next, a process performed by the information processing system 1*a* will be described. First, the tag relevance information generation process will be described with reference to a flowchart illustrated in FIG. 39. The tag relevance information generation process is a process of generating the personal tag relevance information and the global tag relevance information.

In step S70, the user of any one of the user terminals 40 inputs the object information including the tag information to the user terminal 40. For example, the user inputs the object information including the tag information such as "# AAA." The user may input sub name information indicating a formal name of the tag information when the tag information is input. Further, when the tag information is displayed in the personal tag relevance information display area 800 or the global tag relevance information display area 900, the user may set the tag information as the tag information of the object information by dragging the tag information and dropping it on the SNS display area 200. Various kinds of information including the object information are input using the input unit 40*b*.

The input unit 40*b* outputs the object information to the control unit 40*e*. The control unit 40*e* assigns the user ID to the object information and generates posting information. Then, the control unit 40*e* outputs the posting information to the communication unit 40*d*. The communication unit 40*d* transmits the posting information to the SNS processing server 50.

The communication unit 50*b* of the SNS processing server 50 receives the posting information, and outputs the posting information to the control unit 50*c*. The control unit 50*c* extracts the user ID from the posting information. Then, the control unit 50*c* acquires the face image information corresponding to the user ID from the tag management server 20. Then, the control unit 10*c* generates the SNS information including the object information and the face image information. Then, the control unit 10*c* outputs the SNS information to the communication unit 10*b*. The communication unit 10*b* transmits the SNS information to the user terminals 40 and the tag processing server 10. Here, the communication unit 10*b* assigns the user ID to the SNS information to be transmitted to the tag processing server 10.

The communication unit 40*d* of the user terminal 40 outputs the SNS information to the control unit 40*e*, and the control unit 40*e* causes the SNS information to be displayed in the SNS display area 200. As a result, the object information posted by the user is shared with other users. FIG. 47 illustrates a display example. Specific display content is the same as in the first embodiment. The control unit 40*e* causes tabs 250, 251, and 252 to be displayed. The control unit 40*e* causes an SNS corresponding to the tab to be displayed when the user taps one of the tabs 250 and 251. The control unit 40*e* causes all the SNS information acquired by the user terminal 40 to be displayed when the user taps the tab 252. In addition, the control unit 40*e* causes the latest SNS information to be displayed in the unit display area 210 at the top. Tag information 220 written as "# AAA" is included in the object information displayed in the unit display area 210 at the top.

In this example, tag information 400*b* to 400*f* and a tag folder 500*g* are displayed in the personal tag relevance information display area 800. The tag information 400*b* and 400*c* is stored in the tag folder 500*a*. In other words, the tag information 400*b* to 400*c* is displayed in a tag folder display area 530*g*. The tag information 400*b* and the tag information 400*c* are connected through the connection information 410. Therefore, the tag information 400*b* to 400*f* and the tag folder 500*g* are registered in the personal tag relevance information. On the other hand, the tag information 400*a* to 400*c* and 400*h* and the tag folders 500*g* and 500*h* are displayed in the global tag relevance information display area 900. The tag information 400*a* and the tag folder 500*h* are stored in the tag folder 500*g*. In other words, the tag information 400*a* and the tag folder 500*h* are displayed in the tag folder display area 530*g*. The tag information 400*c* and 400*h* are stored in the tag folder 500*h*. In other words, the tag information 400*c* and 400*h* are displayed in a tag folder display area 530*h*. Therefore, the tag information 400*a* to 400*c* and 400*h* and the tag folders 500*g* and 500*h* are registered in the personal tag relevance information.

In step S80, the communication unit 10*b* of the tag processing server 10 receives the SNS information, and outputs the SNS information to the control unit 10*c*. The control unit 10*c* extracts the tag information and the user ID from the SNS information. Then, the control unit 10*c* specifies a user (that is, a processing target user) who has posted the SNS information based on the user ID included in the SNS information.

Then, the control unit 10*c* acquires the personal tag relevance information corresponding to the processing target user from the tag management server 20. Here, FIG. 41 illustrates an example of the personal tag relevance information. As illustrated in FIG. 41, the personal tag relevance information is substantially the same information as the tag relevance information according to the first embodiment. Specifically, the personal tag relevance information is configured with a tag ID field, a tag content field, a creator ID field, a tag relevance field, and a layer field.

The same information as in the first embodiment is stored in the tag ID field, the tag content field, the tag relevance field, and the tag layer field. The user ID of the creator is stored in the creator ID field in the creator field. The creator ID field may be the creator field, similarly to the first embodiment. The coordinates field may be included in the personal tag relevance information, similarly to the first embodiment.

The control unit 10*c* determines whether or not the tag information assigned in step S0 has been registered in the personal tag relevance information. Specifically, the control unit 10*c* compares the tag information extracted in step S80 with the tag information stored in the tag content field. A specific determination method is the same as in the first embodiment.

When the tag information extracted in step S80 has not been registered in the tag relevance information, the control unit 10*c* adds a new line to the tag relevance information and causes the tag information to be stored in the line. The control unit 10*c* causes a newly created tag ID to be stored in the tag ID field. The control unit 10*c* causes the user ID acquired in step S80 to be stored in the creator ID field. The control unit 10*c* causes the tag relevance field and the layer field to be blank. On the other hand, the control unit 10*c* may not perform a particular process when the tag information has been registered. The personal tag relevance information is generated for each user as described above. Another example of the personal tag relevance information is illustrated in FIGS. 42 to 44.

Figure 48:
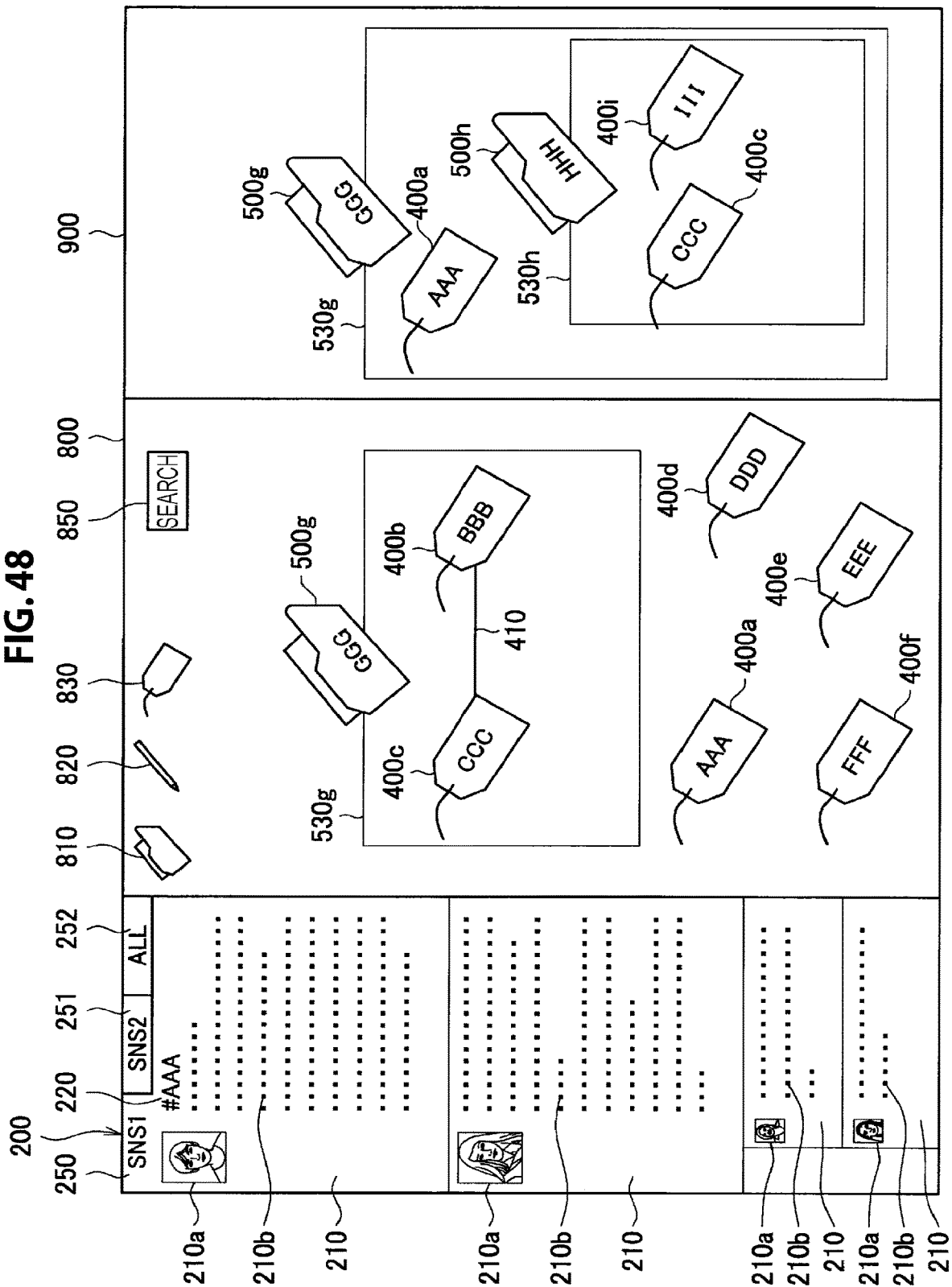
FIG. 48 is an explanatory diagram illustrating an example of a screen displayed on a user terminal.

Then, the control unit 10c outputs the personal tag relevance information to the communication unit 10b. The communication unit 10b transmits the personal tag relevance information to the tag management server 10 and the user terminal 40 corresponding to the personal tag relevance information. The tag management server 20 stores the personal tag relevance information to be associated with the user ID. The communication unit 40d of the user terminal 40 receives the personal tag relevance information, and outputs the personal tag relevance information to the control unit 40e. The control unit 40e causes the tag information to be displayed in the personal tag relevance information display area 800 based on the personal tag relevance information. FIG. 48 illustrates a display example. In this example, the tag information 400a is newly added to the tag information 400b to 400f and the tag folder 500g of FIG. 47. The control unit 40e can arbitrarily set the display positions of each piece of tag information and the tag folder. The control unit 40e can arbitrarily change the display positions of the tag information and the tag folder based on the drag and drop operation performed by the user.

In step S90, the control unit 10c aggregates the personal tag relevance information to generate the global tag relevance information. Specifically, the control unit 10c acquires the tag aggregation information from the tag management server 20. FIG. 45 illustrates an example of the tag aggregation information. The tag aggregation information includes a tag ID field, a tag content/number-of-cases field, a tag relevance/number-of-cases field, and a layer/number-of-cases field. An ID of the tag information is stored in the tag ID field. In the example illustrated in FIG. 45, a first letter of the tag ID is G in order to indicate that the tag aggregation information corresponds to the global tag relevance information. Tag content and the number of cases are associated and stored in the tag content/number-of-cases field. The tag ID and the number of cases are associated and stored in the tag relevance/number-of-cases field. The tag ID and the number of cases are associated and stored in the layer/number-of-cases field as well.

The control unit 10c acquires the personal tag relevance information from the tag management server 20 line by line, and updates the aggregation information through the following process. First, the control unit 10c determines whether or not the tag content of the personal tag relevance information is stored in the tag aggregation information (that is, the same tag content as the tag content of the tag relevance information exists in the tag aggregation information). Here, the control unit 10c determines whether or not pieces of tag content are identical using sub names as well when the sub name is included in the tag content. In other words, when the sub names are different, the control unit 10c determines that the tag relevance information is different from the tag aggregation information when the sub name of the tag relevance information is different from the sub name of the tag aggregation information. The control unit 10c determines that the tag information and the tag folder are different tag content.

As a result, when the tag content of the tag relevance information is stored in the tag aggregation information, the control unit 10c sets a line corresponding to the tag content among the tag aggregation information as a processing target line. On the other hand, when the tag content of the tag relevance information is not stored in the tag aggregation information, the control unit 10c creates a new line in the tag aggregation information, and causes a new tag ID to be stored in the tag ID field of the line. The control unit 10c causes the other fields to be blank. The control unit 10c sets this line as a processing target.

The control unit 10c increases the number of cases of the tag content stored in the tag content field of the personal tag relevance information among the tag content stored in the tag content field of the processing target line by one. Similarly, the control unit 10c increases the number of cases of the tag ID stored in the tag relevance field of the personal tag relevance information among the tag ID stored in the tag relevance field of the processing target line by one. Here, the control unit 10c may increase the number of cases by one or more when the highlighting information is assigned to the tag ID of the personal tag relevance information. Similarly, the control unit 10c increases the number of cases of the tag ID stored in the layer field of the personal tag relevance information among the tag IDs stored in the layer fields of the processing target line by one. The control unit 10c generates the tag aggregation information by performing the process on all personal tag processing information. The tag aggregation information is obtained by aggregating the personal tag relevance information according to the use situation of the tag information by each user. The control unit 10c causes the tag aggregation information to be stored in the tag management server 20.

Here, the control unit 10c may change the aggregation method for each user when the personal tag relevance information is aggregated. For example, when the global tag relevance information is provided to the user (the processing target user) serving as the generation target of the personal tag relevance information in step S80, the control unit 10c may aggregate only the personal tag relevance information of a user having a common characteristic with the user. More specifically, the control unit 10c may aggregate only the personal tag relevance information of a user who has created the same tag folder as the processing target user. For example, the tag folder 500g is created based on the personal tag relevance information of FIG. 41. The tag folder 500g is created based on the personal tag relevance information of FIGS. 42 and 44. Therefore, when the user corresponding to the personal tag relevance information of FIG. 41 is the processing target user, the control unit 10c may aggregate the personal tag relevance information of FIGS. 42 and 44. The user information (for example, a hobby of the user or the like) may be associated with the personal tag relevance information. In this case, the control unit 10c may aggregate only the personal tag relevance information having common user information with the processing target user. The control unit 10c may estimates the user who is using the same tag information as the processing target user based on, for example, the tag folder and the number of tag information stored in the tag folder. The control unit 10c may aggregate only the personal tag relevance information of the user who is using the same tag information. The control unit 10c may aggregate only the personal tag relevance information in which the number of tag information registrations in a certain period of time is a predetermined number or more.

The control unit 10c generates the global tag relevance information based on the tag aggregation information. The control unit 10c performs the following process on each line of the tag aggregation information. The control unit 10c causes the tag content in which the number of cases is a predetermined number (for example, 10) or more, and the number of cases is largest among the tag content stored in the tag content field to be stored in the tag content field. The control unit 10*c* may cause the tag content in which an increase rate in the number of cases in a predetermined period of time (for example, a period of time from a previous day to a current point in time) is largest and a predetermined value or more to be stored in the tag content field. The control unit 10*c* may cause the latest tag content to be stored in the tag content field. The control unit 10*c* deletes the line when there is no tag content that satisfies the above condition.

The control unit 10*c* causes the tag ID in which the number of cases is a predetermined number (for example, 5) or more among the tag IDs stored in the tag relevance field to be stored in the tag relevance field. The control unit 10*c* may cause the tag ID in which the increase rate in the number of cases in a predetermined period of time is largest and a predetermined value or more to be stored in the tag relevance field. The control unit 10*c* may cause the latest tag ID to be stored in the tag relevance field.

The control unit 10*c* causes the tag ID in which the number of cases is a predetermined number (for example, 10) or more and the number of cases is largest among the tag IDs stored in the layer field to be stored in the layer field. The control unit 10*c* may cause the tag ID in which the increase rate in the number of cases in a predetermined period of time is largest and a predetermined value or more to be stored in the layer field. The control unit 10*c* may cause the latest tag ID to be stored in the layer field. The control unit 10*c* generates the global tag relevance information by performing the above process. FIG. 46 illustrates an example of the global tag relevance information.

The control unit 10*c* outputs the global tag relevance information to the communication unit 10*b*. The communication unit 10*b* transmits the global tag relevance information to the user terminals 40 and the tag management server 20. The communication unit 10*b* may transmit the global tag relevance information to the user terminal 40 of the processing target user and the tag management server 20. The tag management server 20 stores the global tag relevance information. The communication unit 40*d* of the user terminal 40 receives the global tag relevance information, and outputs the global tag relevance information to the control unit 40*e*. The control unit 40*e* causes the tag information to be displayed in the global tag relevance information display area 900 based on the global tag relevance information. Here, the global tag relevance information may include a large number of tag information. In this regard, the control unit 40*e* may cause only the tag folder displayed in the personal tag relevance information display area 800 to be displayed in the global tag relevance information display area 900 among the tag folders indicated by the global tag relevance information. As a result, the control unit 40*e* cause the hierarchization candidate to be displayed. FIG. 47 illustrates a display example. In the example illustrated in FIG. 47, the same tag folder 500*g* as that in the personal tag relevance information display area 800 is displayed in the global tag relevance information display area 900. As a result, the user can understand the tag information and the tag folder that are stored in the tag folder 500*g* by another user. The user can perform the maintenance of the content of the personal tag relevance information display area 800 with reference to the content of the global tag relevance information display area 900. For example, the user can move the tag information 400*a* outside the tag folder 500*g* into the tag folder 500*g*. The control unit 40*e* may highlight the connection information 410 according to the number of cases in the tag aggregation information (the number of cases of the relevance field). For example, the control unit 40*e* may increase the thickness of the connection information 410 as the number of cases in the tag aggregation information increases. In this case, the tag ID and the number of cases are stored in the relevance field of the global tag relevance information.

2-8. Maintenance Process

The information processing system 1 can perform the maintenance of the personal tag relevance information based on the maintenance request information input from the user. In other words, in the second embodiment, the information processing system 1 performs the maintenance of the personal tag relevance information for each user.

Figure 40:
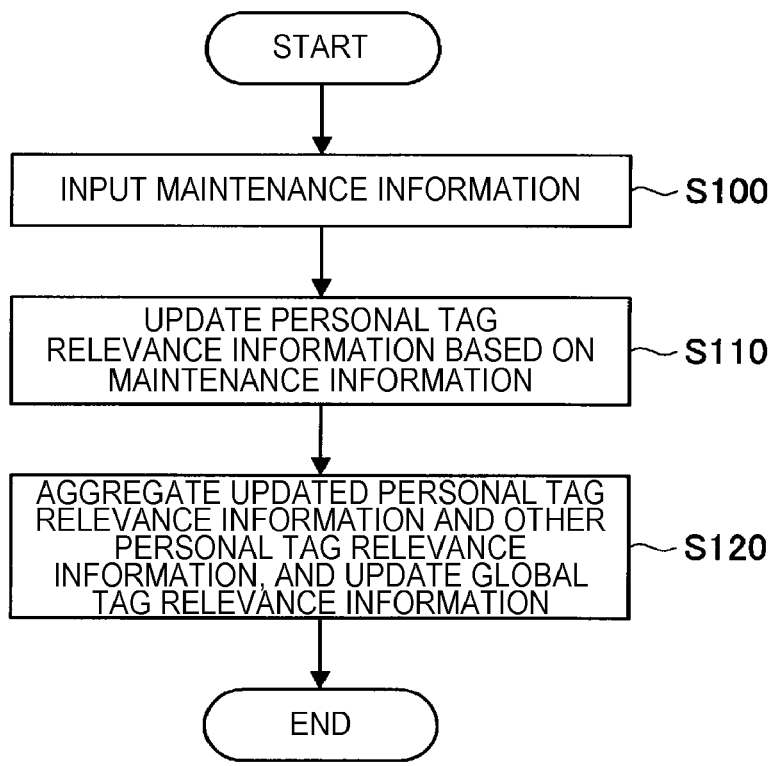
FIG. 40 is a flowchart illustrating a procedure of a process performed in an information processing system.

In this regard, first, an overview of the maintenance process will be described with reference to a flowchart illustrated in FIG. 40. In step S100, the user performs an input operation indicating that the maintenance is requested. Accordingly, the control unit 40*e* generates maintenance request information, and outputs the maintenance request information to the communication unit 40*d*. The maintenance request information includes content of the maintenance requested by the user and the user ID. The communication unit 40*d* transmits the maintenance request information to the tag processing server 10. The communication unit 10*b* of the tag processing server 10 receives the maintenance request information, and outputs the maintenance request information to the control unit 10*c*.

Figure 49:
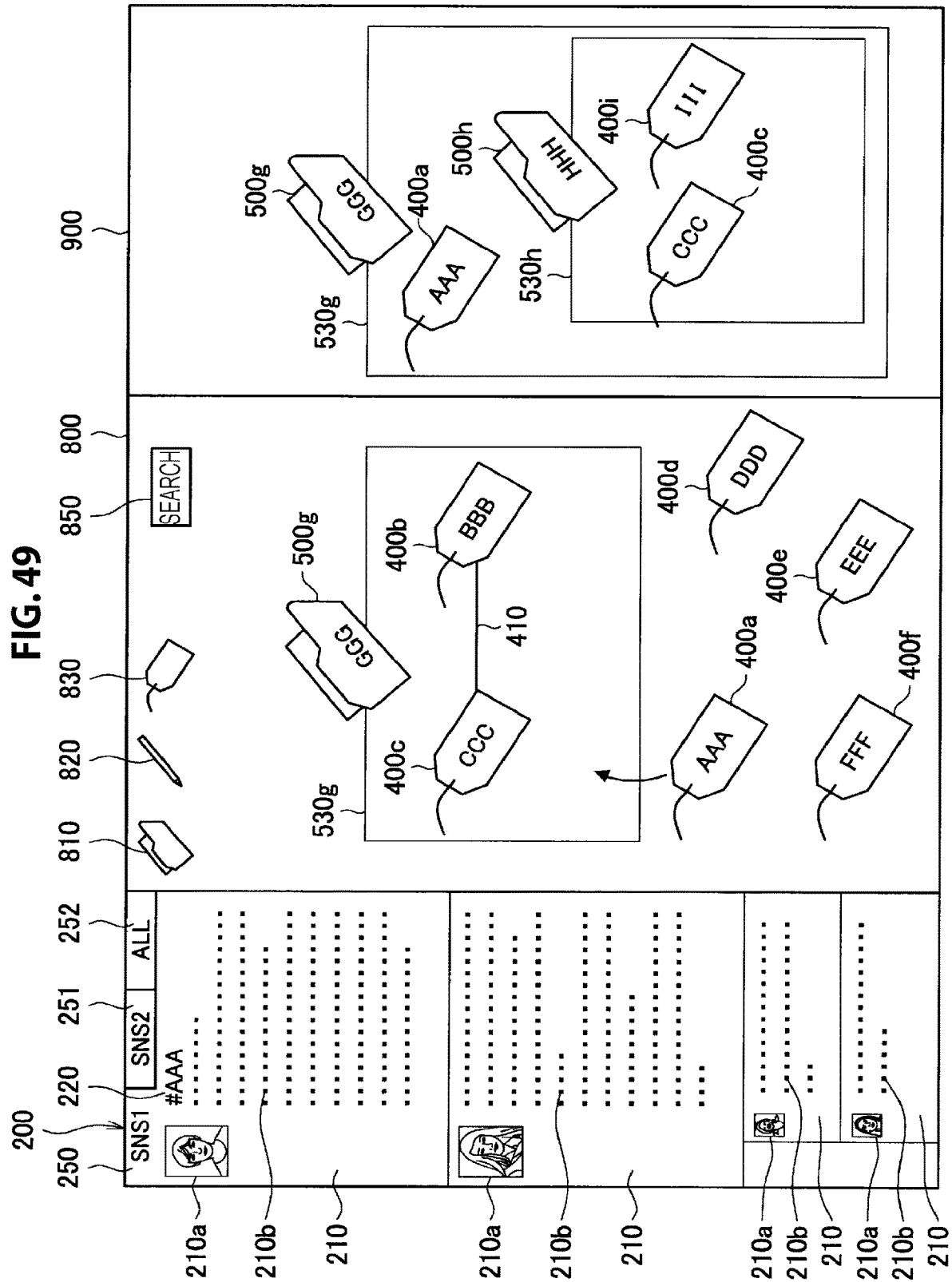
FIG. 49 is an explanatory diagram illustrating an example of a screen displayed on a user terminal.
Figure 50:
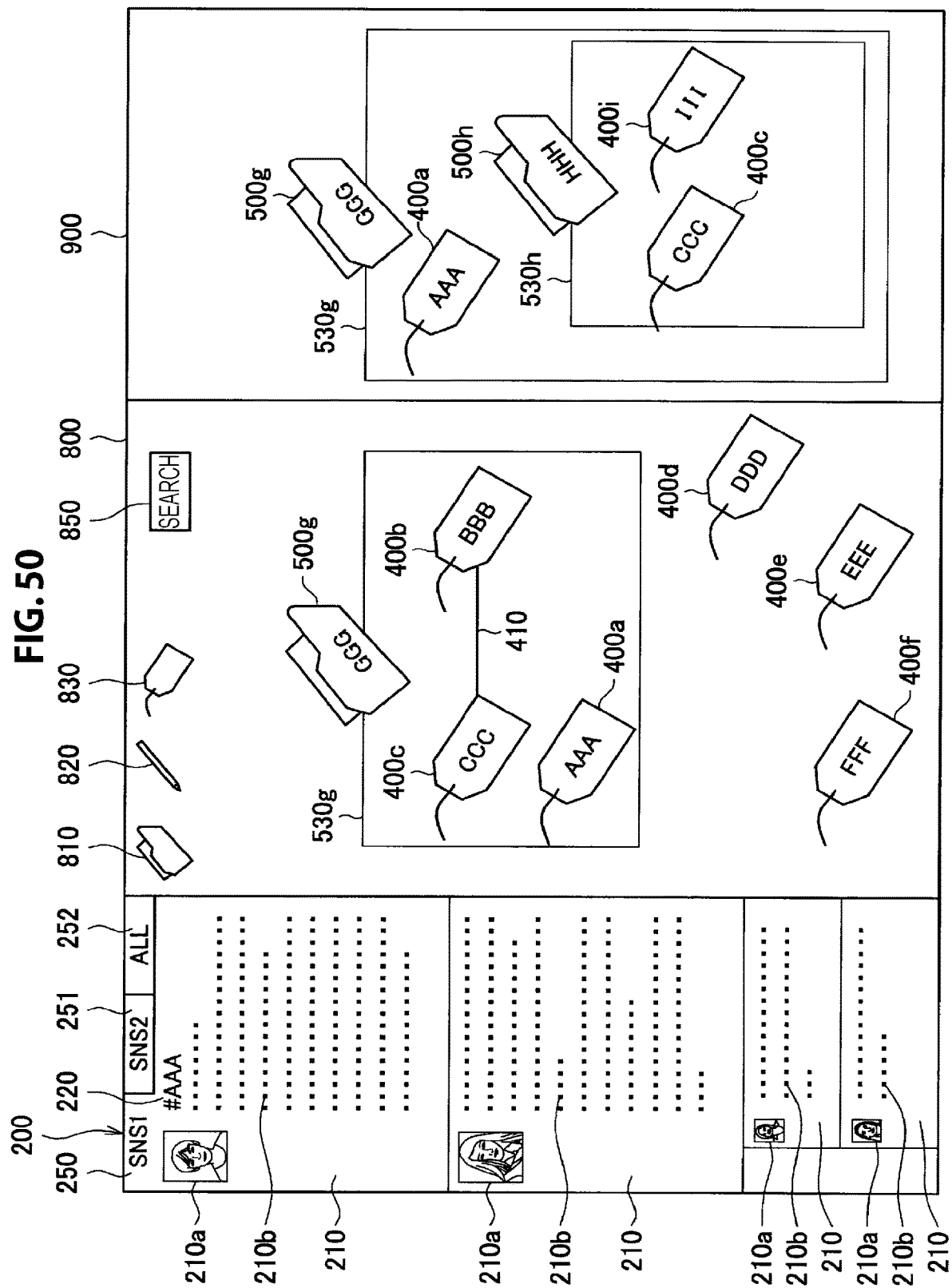
FIG. 50 is an explanatory diagram illustrating an example of a screen displayed on a user terminal.

In step S110, the control unit 10*c* acquires the personal tag relevance information corresponding to the user ID from the tag management server 20, and updates the personal tag relevance information based on the maintenance request information. Then, the control unit 10*c* outputs the updated personal tag relevance information to the communication unit 10*b*. The communication unit 10*b* transmits the personal tag relevance information to the tag management server 20 and the user terminal 40 that has requested the maintenance. The tag management server 20 stores the personal tag relevance information. On the other hand, the user terminal 40 causes the tag information to be displayed in the personal tag relevance information display area 800 based on the updated personal tag relevance information. FIG. 50 illustrates a display example. In this example, the tag information 400*a* is stored in the tag folder 500*g* illustrated in FIG. 49.

In the second embodiment, the same maintenance process as in the first embodiment can be performed. However, in the first embodiment, the target of the maintenance process is the tag relevance information shared by all the users, but in the second embodiment, the target of the maintenance process is the personal tag relevance information prepared for each user.

Figure 51:
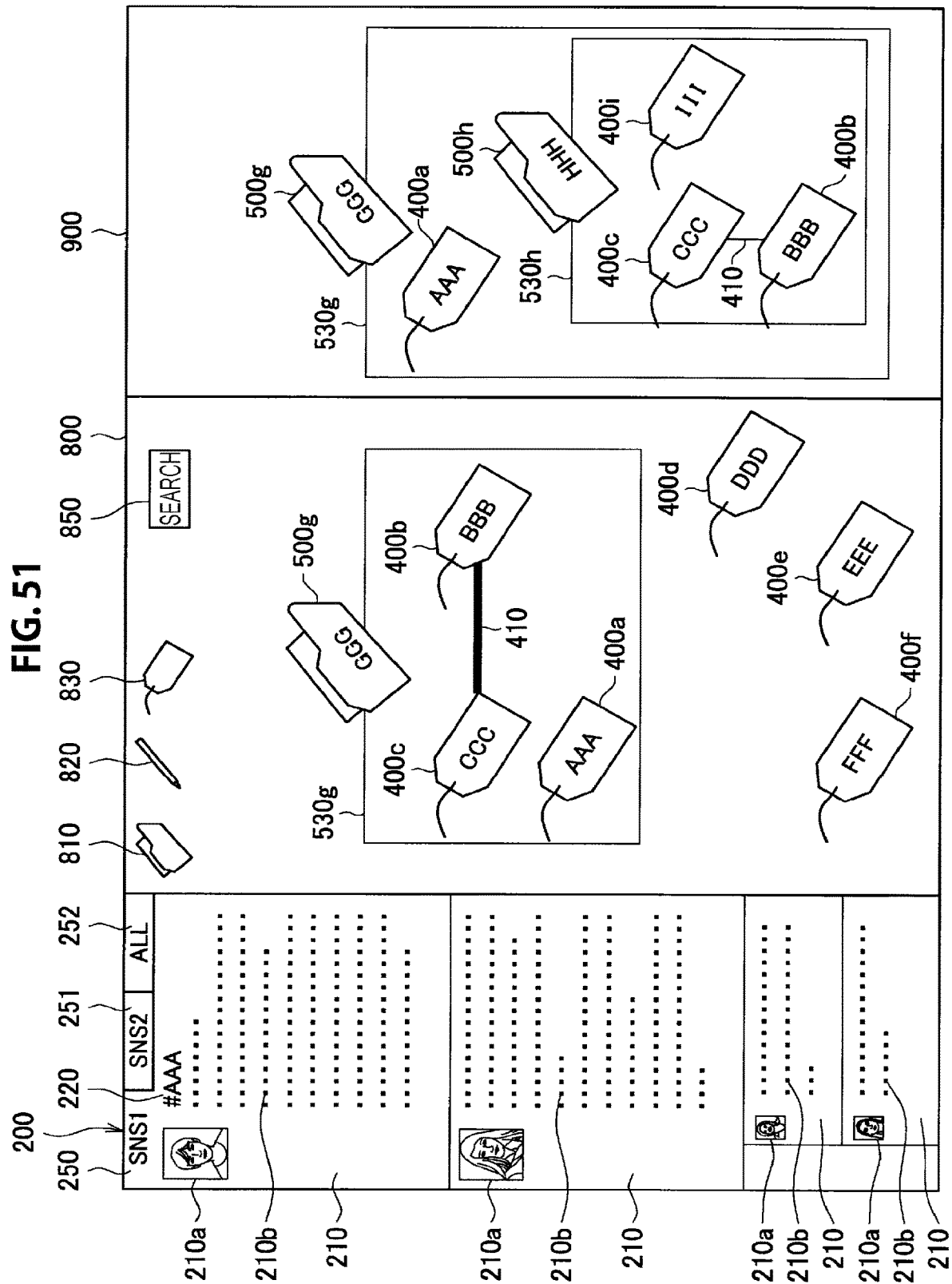
FIG. 51 is an explanatory diagram illustrating an example of a screen displayed on a user terminal.

The control unit 40*e* may change the thickness of the connection information 410 based on content of the global tag relevance information when the tag association process serving as an example of the maintenance process is performed. In other words, the control unit 40*e* may highlight the connection information 410 when the same relevance as the relevance indicated by the connection information 410 is displayed in the global tag relevance information display area 900. The control unit 40*e* may perform the same process even when the tag information connected through the connection information 410 is stored in the same tag folder in the global tag relevance information display area 900. FIG. 51 illustrates a specific example. In this example, in the personal tag relevance information display area 800, the user connects the tag information 400b with the tag information 400c. On the other hand, in the global tag relevance information display area 900, the tag information 400b is connected with the tag information 400c. For this reason, the control unit 40e may highlights the connection information 410 that connects the tag information 400b with the tag information 400c (it is displayed with a heavy line in this example). The user may drag the tag information and the tag folder in the global tag relevance information display area 900 and drop it in the personal tag relevance information display area 800.

In step S120, the control unit 10c updates the global tag relevance information based on the updated personal tag relevance information and another personal tag relevance information. Specifically, the control unit 10c acquires the updated personal tag relevance information line by line and acquires the tag aggregation information. The control unit 10c performs the same process as step S90. As a result, the control unit 10c updates the global tag relevance information.

Then, the control unit 10c outputs the global tag relevance information to the communication unit 10b. The communication unit 10b transmits the global tag relevance information to the user terminals 40 and the tag management server 20. The communication unit 10b may transmit the global tag relevance information to the user terminal 40 of the processing target user (the user who has requested the maintenance) and the tag management server 20. The tag management server 20 stores the global tag relevance information. The communication unit 40d of the user terminal 40 receives the global tag relevance information, and outputs the global tag relevance information to the control unit 40e. The control unit 40e causes the tag information to be displayed in the global tag relevance information display area 900 based on the global tag relevance information. The display method is the same as in step S90. FIG. 50 illustrates a display example.

In the second embodiment, the search process may be perform, similarly to the first embodiment. In this case, the control unit 40e may set the tag information and the tag folder in the personal tag relevance information display area 800 as the search word but may set the tag information and the tag folder in the global tag relevance information display area 900 as the search word. The search of the SNS information based on the search word is performed by the SNS processing server 50. There are cases in which some users do not desire to perform the maintenance of the tag information. For such users, the personal tag relevance information display area 800 may be omitted.

2-9. Other Processes

In the second embodiment, it is possible to create a tag using the maintenance icon 830, and it is also possible to prepare the maintenance-specialized user. In the second embodiment, it is possible to provide the following service to a company that provides an advertisement on an SNS. In other words, the control unit 10c of the tag processing server 10 can associate the tag information related to business of the company with desired tag information of the company when the global tag relevance information is generated. The service may be provided to a company under a condition that a certain amount of consideration (for example, a consideration per one piece of connection information) is paid.

2-10. Modified Examples

Figure 52:
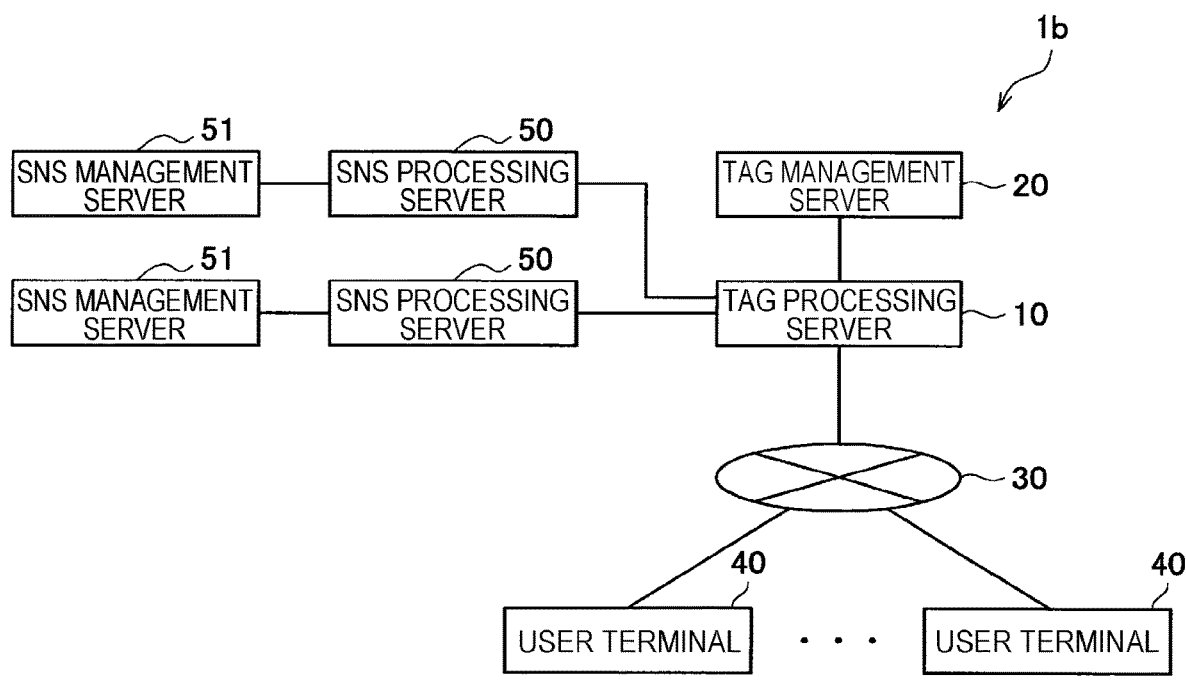
FIG. 52 is a block diagram illustrating a modified example of an information processing system.
Figure 53:
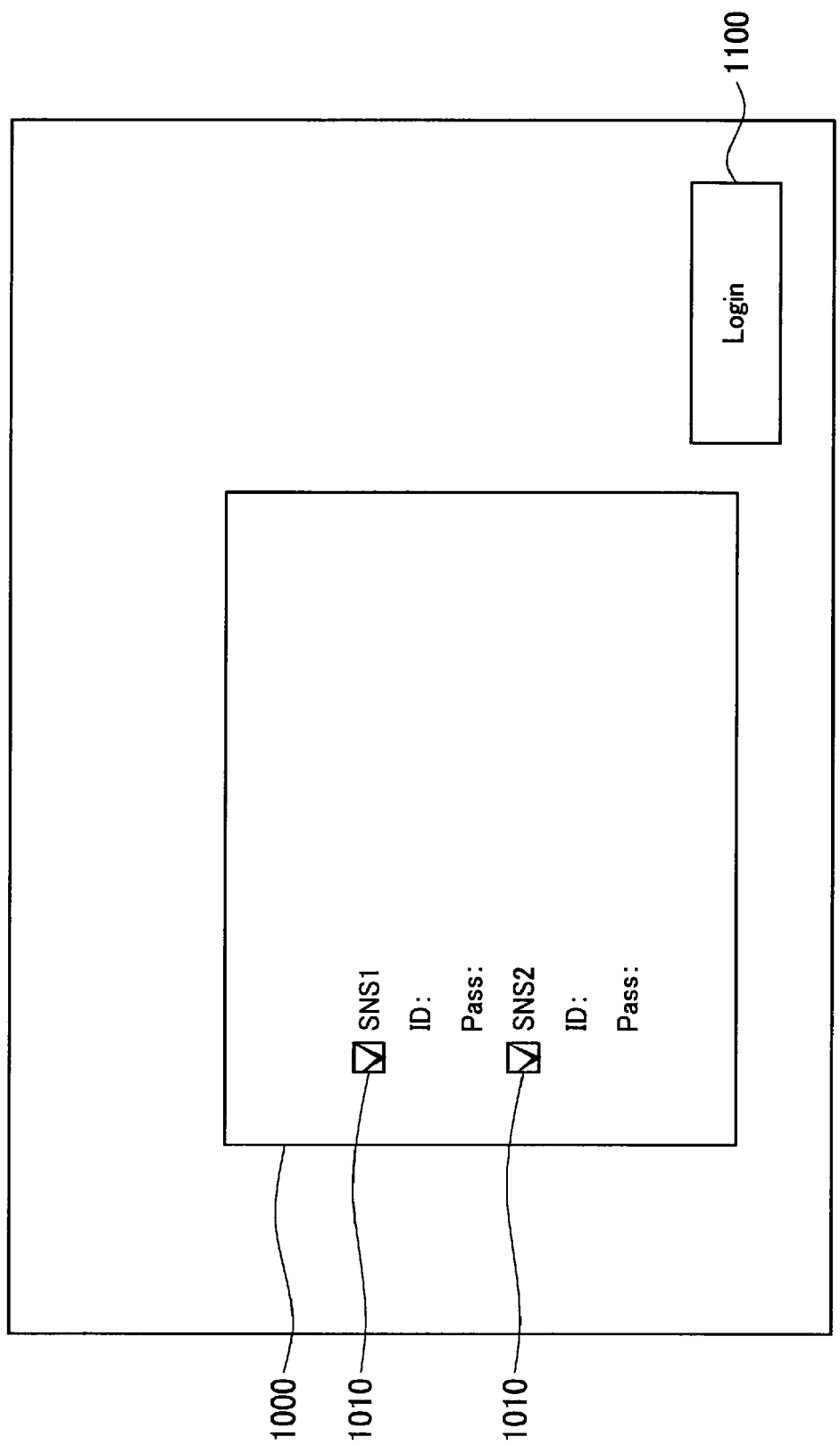
FIG. 53 is an explanatory diagram illustrating an example of a screen displayed on a user terminal.

Next, a modified example of the second embodiment will be described with reference to FIG. 52. As illustrated in FIG. 52, in an information processing system 1b according to the modified example, the SNS processing server 50 is connected to the tag processing server 10. Therefore, information communicated between the SNS processing server 50 and the user terminal 40 passes through the tag processing server 10. For example, the SNS information passes through the tag processing server 10. Therefore, according to this modified example, the SNS processing server 50 need not separately transmit information communicated with the user terminal 40 to the tag processing server 10. In the modified example, the user logs in each of the SNS processing servers 50 through the tag processing server 10. Therefore, the control unit 40e of the user terminal 40 may cause login image information 1000 and a login button 1100 illustrated in FIG. 53 to be displayed. A checkbox 1010, an ID input field, and a password input field are displayed on the login image information 1000 for each SNS. The user inputs a check to the checkbox 1010 corresponding to a desired SNS and inputs an ID and a password. The user taps the login button 1100. Accordingly, the control unit 40e performs a login process with the control unit 50c of the SNS processing server 50.

According to the first and second embodiments, in the information processing systems 1 to 1b, it is possible to associate a plurality of pieces of tag information assigned to the object information existing on the SNS. Particularly, in the first embodiment, each user can view the associations performed by the other users. As a result, each user may have a new idea.

In the information processing systems 1 to 1b, the tag information is associated with the tag folder by arranging the tag information (first tag information) on a layer lower than the tag folder (second tag information). As a result, since one or more pieces of tag information can be stored in the tag folder, the user can more easily understand the relevance.

In the information processing systems 1 to 1b, the tag information that is associated with each other is arranged on the same layer. In other words, in the information processing systems 1 to 1b, the tag information that is associated with each other can be stored in the same tag folder. As a result, the user can easily understand the relevance between the tag information.

In the information processing systems 1 to 1b, the tag information having the same meaning is arranged on the same layer. In other words, in the information processing systems 1 to 1b, the tag information having the same meaning and different notations can be stored in the same tag folder. As a result, the user can easily understand that the tag information has the same meaning.

In the information processing systems 1 to 1b, the tag information in the tag folder and the tag folder are associated and displayed. For example, in the information processing systems 1 to 1b, the tag information 430a to 430c in the tag folder 500a is displayed in the tag folder display area 530a as illustrated in FIG. 24. As a result, the user can more easily understand the relevance between the tag folder and the tag information.

In the information processing system 1, the hierarchization candidate (the candidate of the tag folder) is generated based on relevance among a plurality of pieces of tag information, and control is performed such that the hierarchization candidate is displayed. As a result, the user can easily understand the relevance between the tag information and gets tag folder creation guidelines.

In the information processing systems 1 to 1b, the connection information connecting the tag information that is associated with each other is displayed. Thus, the user can easily understand the relevance between the tag information.

In the information processing systems 1 to 1b, the display state of the connection information is adjusted based on a degree of relevance between the tag information. Therefore, the user can easily understand a degree of relevance between the tag information.

In the information processing systems 1 to 1b, when there is the tag information (third tag information) that is associated with the tag information in the tag folder and arranged on the same layer as the tag folder, the tag folder is associated with the third tag information. Therefore, the user can easily understand the relevance between the tag folder and the third tag information even in the state in which the tag folder is closed.

In the information processing system 1, the browsing restriction is set in the tag folder, and the association between the tag information in the tag folder and the third tag information is displayed for the user who gets a permission for browsing the tag folder. Further, in the information processing system 1, the association between the tag folder and the third tag information is displayed for the user who does not get a permission for browsing the tag folder. Therefore, the user who gets a permission for browsing can easily understand the relevance between content of the tag folder and the third tag information. On the other hand, even for the user who does not get a permission for browsing, it is possible to understand at least that the tag folder is associated with the third tag information.

In the information processing system 1a to 1b, the personal tag relevance information is generated for each user, and a plurality of pieces of personal tag relevance information are aggregated to generate the global tag relevance information. As a result, the user can easily understand how the other users associate the tag information by comparing the personal tag relevance information with the global tag relevance information.

In the information processing system 1a to 1b, the global tag relevance information is generated according to the use situation of the tag information of the users, and thus the global tag relevance information can be generated with a high degree of accuracy.

In the information processing system 1a to 1b, the personal tag relevance information having a common characteristic is aggregated to generate the global tag relevance information, and thus the global tag relevance information can be generated with a high degree of accuracy.

In the information processing system 1a to 1b, the personal tag relevance information having a common tag folder is aggregated to generate the global tag relevance information. In other words, in the information processing system 1a to 1b, when the processing target user creates a certain tag folder, only the personal tag relevance information of the users who have created the same tag folder as the tag folder can be aggregated. Further, in the information processing system 1a to 1b, the global tag relevance information can be provided to the processing target user. Thus, in the information processing system 1a to 1b, the global tag relevance information can be provided according to the need of the processing target user.

In the information processing system 1a to 1b, the global tag relevance information can be generated by aggregating the personal tag relevance information having the common user information. In other words, in the information processing system 1a to 1b, only the personal tag relevance information having the common user information with the processing target user can be aggregated. Further, in the information processing system 1a to 1b, the global tag relevance information can be provided to the processing target user. Thus, in the information processing system 1a to 1b, the global tag relevance information can be provided according to the need of the processing target user.

In the information processing system 1a to 1b, the hierarchization candidate (the candidate of the tag folder) is generated based on the global tag relevance information, and the hierarchization candidate is displayed. As a result, the user can easily understand how the other users associates and get tag folder creation guidelines.

In the information processing system 1a to 1b, the connection information connecting the tag information that is associated with each other is displayed, and the display state of the connection information is adjusted based on the global tag relevance information. Therefore, the user can easily understand how the other users associates.

In the information processing system 1a to 1b, when the user selects the tag folder as the search word, the tag folder and the tag information in the tag folder is set as the search word. Further, in the information processing systems 1 to 1b, the object information including the search word is searched for. For example, in the information processing system 1a to 1b, for example, the tag information that is associated with each other and the tag information having the same meaning but different notations can be collectively set as the search word. As a result, the accuracy of the search is improved.

In the information processing system 1 to 1b, any tag information in the tag folder is excluded from the search word based on the input operation performed by the user. As a result, the search (closer to the need of the user) can be performed with a high degree of accuracy.

Note that the effects described above are not necessarily limitative. With or in the place of the above effects, there may be achieved any one of the effects described in this specification or other effects that may be grasped from this specification.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An information processing device, including:

a control unit configured to associate a plurality of pieces of tag information assigned to object information existing on a social network.

(2)

The information processing device according to (1), wherein the control unit associates first tag information with second tag information by arranging the first tag information on a layer lower than the second tag information.

(3)

The information processing device according to (2), wherein the control unit arranges pieces of tag information that are associated with each other on a same layer.

(4)

The information processing device according to (3), wherein the control unit arranges pieces of tag information having a same meaning on a same layer.

(5)
The information processing device according to any one of (2) to (4),
wherein the control unit performs control in a manner that the first tag information and the second tag information are associated and displayed.
(6)
The information processing device according to (5),
wherein the control unit performs control in a manner that a hierarchization candidate is created based on relevance among a plurality of pieces of tag information, and the hierarchization candidate is displayed.
(7)
The information processing device according to any one of (2) to (6),
wherein, when there is third tag information that is associated with the first tag information and arranged on the same layer as the second tag information, the control unit associates the second tag information with the third tag information.
(8)
The information processing device according to (7),
wherein the control unit performs control in a manner that a browsing restriction is set on the second tag information, an association between the first tag information and the third tag information is displayed for a user who has a permission for browsing the second tag information, and an association between the second tag information and the third tag information is displayed for a user who does not have a permission for browsing the second tag information.
(9)
The information processing device according to any one of (1) to (8),
wherein the control unit generates a plurality of pieces of personal tag relevance information indicating relevance among the plurality of pieces of tag information used by users for the users, and generates global tag relevance information by aggregating the plurality of pieces of personal tag relevance information.
(10)
The information processing device according to (9),
wherein the control unit generates the global tag relevance information based on a use situation of the tag information by each user.
(11)
The information processing device according to (9) or (10),
wherein the control unit generates the global tag relevance information by aggregating pieces of personal tag relevance information having a common characteristic.
(12)
The information processing device according to any one of (9) to (11),
wherein the personal tag relevance information includes second tag information and first tag information arranged on a layer lower than the second tag information, and
the control unit generates the global tag relevance information by aggregating pieces of personal tag relevance information having the common second tag information.
(13)
The information processing device according to any one of (9) to (12),
wherein user information is associated with the personal tag relevance information, and
the control unit generates the global tag relevance information by aggregating pieces of personal tag relevance information having common user information.
(14)
The information processing device according to any one of (9) to (13),
wherein the personal tag relevance information includes second tag information and first tag information arranged on a layer lower than the second tag information, and
the control unit performs control in a manner that a hierarchization candidate is created based on the global tag relevance information, and the hierarchization candidate is displayed.
(15)
The information processing device according to any one of (9) to (14),
wherein the control unit causes connection information connecting pieces of tag information that are associated with each other to be displayed and adjusts a display state of the connection information based on the global tag relevance information.
(16)
The information processing device according to (2),
wherein, when the user selects the second tag information as a search word, the control unit sets the first tag information and the second tag information as search words, and searches for object information including the search words.
(17)
The information processing device according to (16),
wherein the control unit excludes any piece of first tag information from the search words based on an input operation performed by a user.
(18)
The information processing device according to any one of (1) to (17),
wherein the control unit causes connection information connecting pieces of tag information that are associated with each other to be displayed.
(19)
The information processing device according to (18),
wherein the control unit adjusts a display state of the connection information based on a degree of relevance among pieces of tag information.
(20)
An information processing method, including:
associating a plurality of pieces of tag information assigned to object information existing on a social network.

REFERENCE SIGNS LIST 1, 1a, 1b information processing system
10 tag processing server
10a storage unit
10b communication unit
10c control unit
20 tag management server
40 user terminal
40a storage unit
40b input unit
40c display unit
40d communication unit
40e control unit
50 SNS processing server
51 SNS management server

The invention claimed is:
1. An information processing device, comprising:
processing circuitry configured to:
associate first tag information and second tag information of a plurality of pieces of tag information by arranging the first tag information on a layer lower than the second tag information, each of the plurality of pieces of tag information being assigned to each object information existing on a social network;

associate the second tag information and third tag information of the plurality of pieces of tag information, the second tag information and the third tag information being arranged on a same layer;

control the first tag information and the second tag information to be displayed in a manner that the first tag information and the second tag information are associated to indicate that the first tag information is on the layer lower than the second tag information; and control the second tag information and the third tag information to be displayed together with an association line connecting the second tag information and the third tag information to indicate that the second tag information and the third tag information are associated, wherein in a case where a browsing restriction is set on the second tag information, an association between the first tag information and the third tag information is displayed for only a user who has a permission for browsing the second tag information, and an association between the second tag information and the third tag information is displayed for a user who does not have a permission for browsing the second tag information.

2. The information processing device according to claim 1, wherein the processing circuitry arranges pieces of tag information that are associated with each other on a same layer.

3. The information processing device according to claim 2, wherein the processing circuitry arranges pieces of tag information having a same meaning on a same layer.

4. The information processing device according to claim 1, wherein the processing circuitry performs control in a manner that a hierarchization candidate is created based on relevance among a plurality of pieces of tag information, and the hierarchization candidate is displayed.

5. The information processing device according to claim 1, wherein the processing circuitry generates a plurality of pieces of personal tag relevance information indicating relevance among the plurality of pieces of tag information used by users for the users, and generates global tag relevance information by aggregating the plurality of pieces of personal tag relevance information.

6. The information processing device according to claim 5, wherein the processing circuitry generates the global tag relevance information based on a use situation of the tag information by each user.

7. The information processing device according to claim 5, wherein the processing circuitry generates the global tag relevance information by aggregating pieces of personal tag relevance information having a common characteristic.

8. The information processing device according to claim 5, wherein the personal tag relevance information includes second tag information and first tag information arranged on a layer lower than the second tag information, and the processing circuitry generates the global tag relevance information by aggregating pieces of personal tag relevance information having the common second tag information.

9. The information processing device according to claim 5, wherein user information is associated with the personal tag relevance information, and the processing circuitry generates the global tag relevance information by aggregating pieces of personal tag relevance information having common user information.

10. The information processing device according to claim 5, wherein the personal tag relevance information includes second tag information and first tag information arranged on a layer lower than the second tag information, and the processing circuitry performs control in a manner that a hierarchization candidate is created based on the global tag relevance information, and the hierarchization candidate is displayed.

11. The information processing device according to claim 5, wherein the processing circuitry causes connection information connecting pieces of tag information that are associated with each other to be displayed and adjusts a display state of the connection information based on the global tag relevance information.

12. The information processing device according to claim 1, wherein, when the user selects the second tag information as a search word, the processing circuitry sets the first tag information and the second tag information as search words, and searches for object information including the search words.

13. The information processing device according to claim 12, wherein the processing circuitry excludes any piece of first tag information from the search words based on an input operation performed by a user.

14. The information processing device according to claim 1, wherein the processing circuitry causes connection information connecting pieces of tag information that are associated with each other to be displayed.

15. The information processing device according to claim 14, wherein the processing circuitry adjusts a display state of the connection information based on a degree of relevance among pieces of tag information.

16. The information processing device according to claim 1, wherein the first tag information is displayed as a tag having a shape of a tag.

17. The information processing device according to claim 1, wherein the second tag information is displayed as a folder having a shape of a folder.

18. The information processing device according to claim 1,
wherein the association line is displayed as a solid line connecting the second tag information and the third tag information.

19. An information processing method, comprising:
associating, using processing circuitry, first tag information and second tag information of a plurality of pieces of tag information by arranging the first tag information on a layer lower than the second tag information, each of the plurality of pieces of tag information being assigned to each object information existing on a social network;
associating, using the processing circuitry, the second tag information and third tag information of the plurality of pieces of tag information, the second tag information and the third tag information being arranged on a same layer;
controlling, using the processing circuitry, the first tag information and the second tag information to be displayed in a manner that the first tag information and the second tag information are associated to indicate that the first tag information is on the layer lower than the second tag information; and
controlling, using the processing circuitry, the second tag information and the third tag information to be displayed together with an association line connecting the second tag information and the third tag information to indicate that the second tag information and the third tag information are associated, wherein
in a case where a browsing restriction is set on the second tag information, an association between the first tag information and the third tag information is displayed for only a user who has a permission for browsing the second tag information, and an association between the second tag information and the third tag information is displayed for a user who does not have a permission for browsing the second tag information.

* * * * *